United States Patent
Bodine et al.

(10) Patent No.: US 11,434,594 B2
(45) Date of Patent: Sep. 6, 2022

(54) LAUNDRY APPLIANCE

(71) Applicant: WHIRLPOOL CORPORATION, Benton Harbor, MI (US)

(72) Inventors: Darryl C. Bodine, St. Joseph, MI (US); Donald Erickson, Stevensville, MI (US); Gregg P. Fitzgerald, Eau Claire, MI (US); Andrew C. Kubasiak, St. Joseph, MI (US); Patrick A. McCormick, Clarendon Hills, IL (US); Stephen D. Ostdiek, St. Joseph, MI (US); Anna C. Schelling, Stevensville, MI (US); Robert J. Schneider, Fennville, MI (US); Mohaideen Abdul Khadaar Sikkandar Batcha, Tamil Nadu (IN); Todd J. Tunzi, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 134 days.

(21) Appl. No.: 15/931,003

(22) Filed: May 13, 2020

(65) Prior Publication Data

US 2020/0370222 A1 Nov. 26, 2020

Related U.S. Application Data

(60) Provisional application No. 62/851,938, filed on May 23, 2019.

(51) Int. Cl.
*D06F 34/28* (2020.01)
*D06F 34/26* (2020.01)
(Continued)

(52) U.S. Cl.
CPC .............. *D06F 34/28* (2020.02); *D06F 34/24* (2020.02); *D06F 34/26* (2020.02); *D06F 37/04* (2013.01);
(Continued)

(58) Field of Classification Search
CPC ...................................................... D06F 34/28
See application file for complete search history.

(56) References Cited

U.S. PATENT DOCUMENTS 2,941,390 A 6/1960 Frey
3,498,089 A 3/1970 Miller et al.
(Continued)

FOREIGN PATENT DOCUMENTS

AU 752305 9/2002
CN 103911812 A 7/2014
(Continued)

*Primary Examiner* — Jason Y Ko
(74) *Attorney, Agent, or Firm* — Price Heneveld LLP

(57) ABSTRACT

A laundry appliance includes a cabinet defining a front opening in a front panel. The front opening is defined by a lip having a curved edge. The lip defines a plurality of apertures spaced-apart around the front opening. A tub is disposed within the cabinet. The tub defines an access opening aligned with the front opening. A drum is disposed within the tub. A bellows assembly extends between the cabinet and the tub. The bellows assembly includes a projection coupled to the curved edge of the cabinet. A deflector has a rim and a chute wherein the chute extends toward the drum. The rim is configured to snap-fit over the projection of the bellows assembly. The rim includes a plurality of hooks where each hook is configured to extend through an aperture and interlock with the cabinet.

10 Claims, 49 Drawing Sheets

(51) Int. Cl.
*D06F 34/24* (2020.01)
*D06F 39/08* (2006.01)
*G10L 15/22* (2006.01)
*D06F 37/04* (2006.01)
*D06F 37/26* (2006.01)
*D06F 39/06* (2006.01)
*D06F 39/14* (2006.01)
*D06F 103/66* (2020.01)
*D06F 33/00* (2020.01)

(52) U.S. Cl.
CPC ............ *D06F 37/266* (2013.01); *D06F 39/06* (2013.01); *D06F 39/083* (2013.01); *D06F 39/14* (2013.01); *G10L 15/22* (2013.01); *D06F 33/00* (2013.01); *D06F 2103/66* (2020.02)

(56) References Cited

U.S. PATENT DOCUMENTS

| | | |
|---|---|---|
| 4,520,575 A | 6/1985 | Holmes et al. |
| 5,022,419 A | 6/1991 | Thompson et al. |
| 6,792,777 B2 | 9/2004 | Shaw et al. |
| 7,254,970 B2 | 8/2007 | Buss et al. |
| 7,357,006 B2 | 4/2008 | Kim et al. |
| 7,398,662 B2 | 7/2008 | Kim et al. |
| 7,490,495 B2 | 2/2009 | Kim |
| 7,490,496 B2 | 2/2009 | Kim et al. |
| 7,614,263 B2 | 11/2009 | Kim et al. |
| 7,712,338 B2 | 5/2010 | Tanaka et al. |
| 8,033,145 B2 | 10/2011 | Komori |
| 8,261,582 B2 | 9/2012 | Graute et al. |
| 8,464,560 B2 | 6/2013 | Kim et al. |
| 8,464,561 B2 | 6/2013 | Brinkmann |
| 8,528,223 B2 | 9/2013 | Alisch et al. |
| 8,661,707 B2 | 3/2014 | Dittmer et al. |
| 8,701,309 B2 | 4/2014 | Park et al. |
| 8,875,416 B2 | 11/2014 | Anderson et al. |
| 9,028,615 B2 | 5/2015 | Egimeier et al. |
| 9,045,853 B2 | 6/2015 | Kim et al. |
| 9,051,679 B2 | 6/2015 | Kwon et al. |
| 9,121,128 B2 | 9/2015 | Hong et al. |
| 9,637,855 B2 | 5/2017 | Buso et al. |
| 9,708,749 B2 | 7/2017 | Woo et al. |
| 9,816,223 B2 | 11/2017 | Bae et al. |
| 9,822,475 B2 | 11/2017 | Thorpe |
| 9,869,048 B2 | 1/2018 | Burgess et al. |
| 9,903,059 B2 | 2/2018 | Anderson et al. |
| 10,105,032 B2 | 10/2018 | Wilson |
| 10,113,263 B2 | 10/2018 | Ashrafzadeh et al. |
| 10,167,588 B2 | 1/2019 | Kim et al. |
| 10,301,760 B2 | 5/2019 | Kim et al. |
| 10,373,770 B2 | 8/2019 | Bodine et al. |
| 10,422,064 B2 | 9/2019 | Seong et al. |
| 10,465,332 B2 | 11/2019 | Simon et al. |
| 10,585,407 B2 | 3/2020 | Bodine et al. |
| 10,599,392 B2 | 3/2020 | Jeon et al. |
| 2005/0015892 A1 | 1/2005 | Park et al. |
| 2006/0174663 A1 | 8/2006 | Cimetta et al. |
| 2007/0240456 A1 | 10/2007 | Byun et al. |
| 2007/0295037 A1 | 12/2007 | Blomberg et al. |
| 2008/0037275 A1 | 2/2008 | Edlenkamp et al. |
| 2008/0289369 A1 | 11/2008 | Noguchi |
| 2010/0129366 A1 | 6/2010 | Krausch |
| 2013/0160215 A1 | 6/2013 | Anderson et al. |
| 2013/0276322 A1 | 10/2013 | Anderson et al. |
| 2014/0083145 A1 | 3/2014 | Bondi |
| 2015/0345065 A1 | 12/2015 | Yang et al. |
| 2016/0145790 A1 | 5/2016 | Burgess et al. |
| 2017/0051446 A1 | 2/2017 | Lee et al. |
| 2018/0038040 A1 | 2/2018 | Kim et al. |
| 2018/0092507 A1 | 4/2018 | Wilson |
| 2019/0177905 A1 | 6/2019 | Ayers et al. |
| 2019/0198021 A1 | 6/2019 | Lee et al. |
| 2019/0211439 A1 | 7/2019 | An et al. |
| 2019/0214009 A1 | 7/2019 | An et al. |
| 2020/0010996 A1 | 1/2020 | Tong et al. |
| 2020/0020336 A1 | 1/2020 | Lee |

FOREIGN PATENT DOCUMENTS

| | | |
|---|---|---|
| CN | 105002698 A | 10/2015 |
| CN | 106149316 A | 11/2016 |
| CN | 107401030 A | 11/2017 |
| CN | 2017193607 U | 4/2018 |
| CN | 108729149 A | 11/2018 |
| CN | 208266517 U | 12/2018 |
| CN | 109137408 A | 1/2019 |
| CN | 110699926 A | 1/2020 |
| DE | 3843386 A1 | 6/1989 |
| DE | 4126966 A1 | 2/1993 |
| DE | 19706283 A1 | 8/1998 |
| EP | 1321558 A1 | 6/2003 |
| EP | 1367169 A1 | 12/2003 |
| EP | 1522623 A1 | 4/2005 |
| EP | 1595992 A1 | 11/2005 |
| EP | 1650339 A1 | 4/2006 |
| EP | 1408150 B1 | 9/2008 |
| EP | 2078777 A1 | 7/2009 |
| EP | 2145993 B1 | 1/2010 |
| EP | 1961856 B1 | 6/2010 |
| EP | 2604741 B1 | 12/2011 |
| EP | 2527517 A1 | 11/2012 |
| EP | 2107152 B1 | 6/2014 |
| EP | 2824231 A1 | 1/2015 |
| EP | 3290572 A1 | 3/2018 |
| JP | 2007202741 A | 8/2007 |
| JP | 20091189118948 A | 5/2009 |
| JP | 2016014484 A | 1/2016 |
| KR | 19990041832 A | 9/1999 |
| KR | 20140095779 A | 8/2014 |
| WO | 2007017726 A1 | 2/2007 |
| WO | 2014037840 A1 | 3/2014 |

LAUNDRY APPLIANCE

CROSS-REFERENCE TO RELATED APPLICATIONS

This application claims priority to U.S. 62/851,938, filed on May 23, 2019, entitled "LAUNDRY APPLIANCE," the disclosure of which is hereby incorporated herein by reference in its entirety.

FIELD OF THE DISCLOSURE

The present disclosure generally relates to a laundry appliance, and more specifically, to a laundry appliance having a bellows wash assembly.

BACKGROUND OF THE DISCLOSURE

Washers generally include bellows disposed between a cabinet and a tub positioned within the cabinet. The bellows allows the tub to move independently of the cabinet. Additionally, washers typically have doors rotatably coupled to the cabinet. The doors are operable between a closed position, sealing the front opening, and an opened position for accessing the drum.

SUMMARY OF THE DISCLOSURE

According to one aspect of the present disclosure, a laundry appliance includes a cabinet that defines a front opening in a front panel. The front opening is defined by a lip having a curved edge. The lip defines a plurality of apertures spaced-apart around the front opening. A tub is disposed within the cabinet. The tub defines an access opening aligned with the front opening. A drum is disposed within the tub. A bellows assembly extends between the cabinet and the tub. The bellows assembly includes a projection coupled to the curved edge of the cabinet. A deflector has a rim and a chute. The chute extends toward the drum. The rim is configured to snap-fit over the projection of the bellows assembly. The rim includes a plurality of hooks. Each hook is configured to extend through an aperture and interlock with the cabinet.

According to another aspect of the present disclosure, a laundry appliance includes a cabinet having a front panel. The front panel defines a track and the front panel defines a front opening. A sealing gasket is coupled to the cabinet proximate the front opening. A tub is disposed within the cabinet. The tub defines an access opening that aligns with the front opening. A bellows assembly extends between the cabinet and the tub. A panel door is configured to translate vertically along a front surface of the front panel between an opened position and a closed position. The panel door includes a guide feature configured to engage the track. The track guides the door vertically and towards the drum to contact the sealing gasket coupled to the cabinet when in the closed position.

According to yet another aspect of the present disclosure, a laundry appliance includes a cabinet that defines a front opening in a front panel thereof. A door is configured to slide vertically between an opened position and a closed position. A motor assembly is operably coupled to the door and configured to move the door between the opened and closed positions. A sound sensor is configured to receive a voice command. A controller is in communication with the sound sensor and the motor assembly. The controller is configured to activate the motor assembly in response to a voice command received by the sound sensor.

These and other features, advantages, and objects of the present disclosure will be further understood and appreciated by those skilled in the art by reference to the following specification, claims, and appended drawings.

Figure 1:
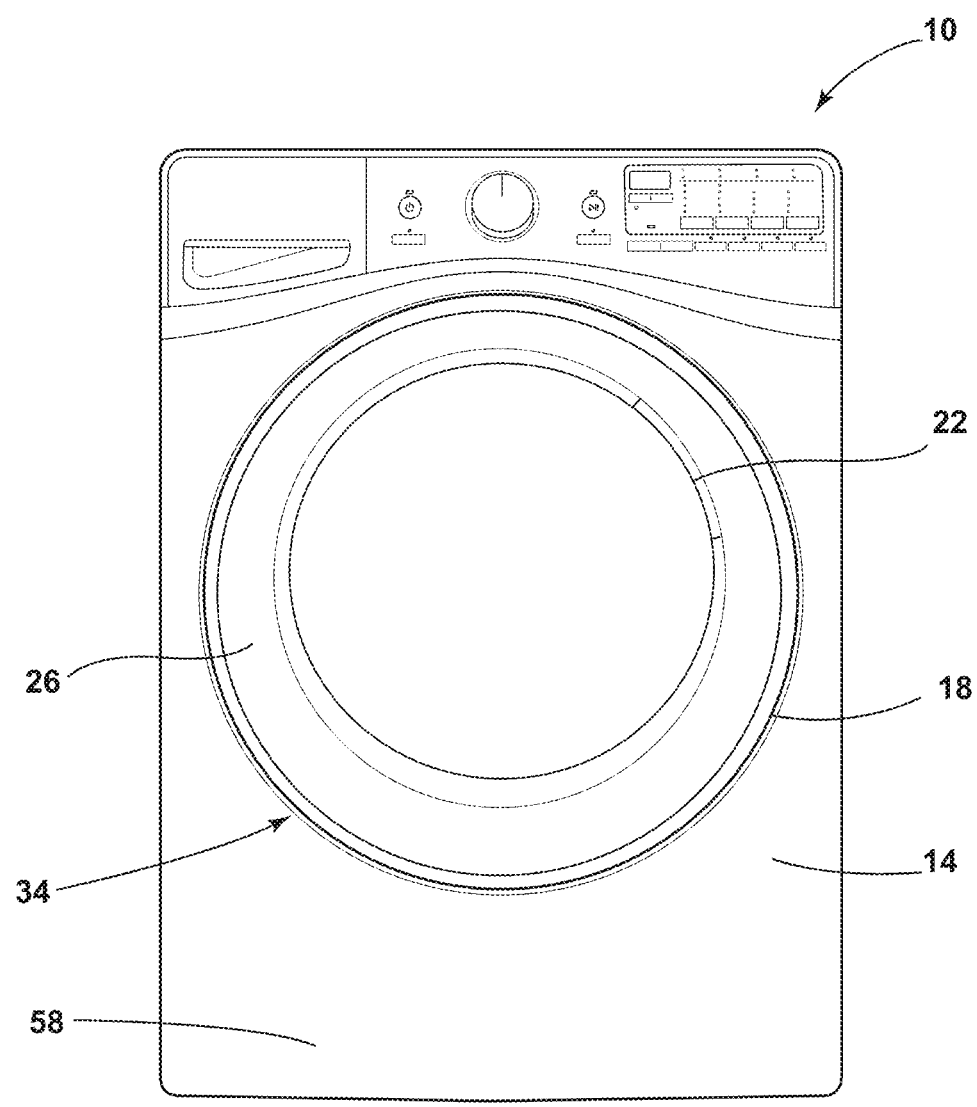
FIG. 1 is a front elevational view of a laundry appliance with a door in a closed position, according to one example.

The components in the figures are not necessarily to scale, emphasis instead being placed upon illustrating the principles described herein.

DETAILED DESCRIPTION

The present illustrated embodiments reside primarily in combinations of method steps and apparatus components related to a laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front"

shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 59:
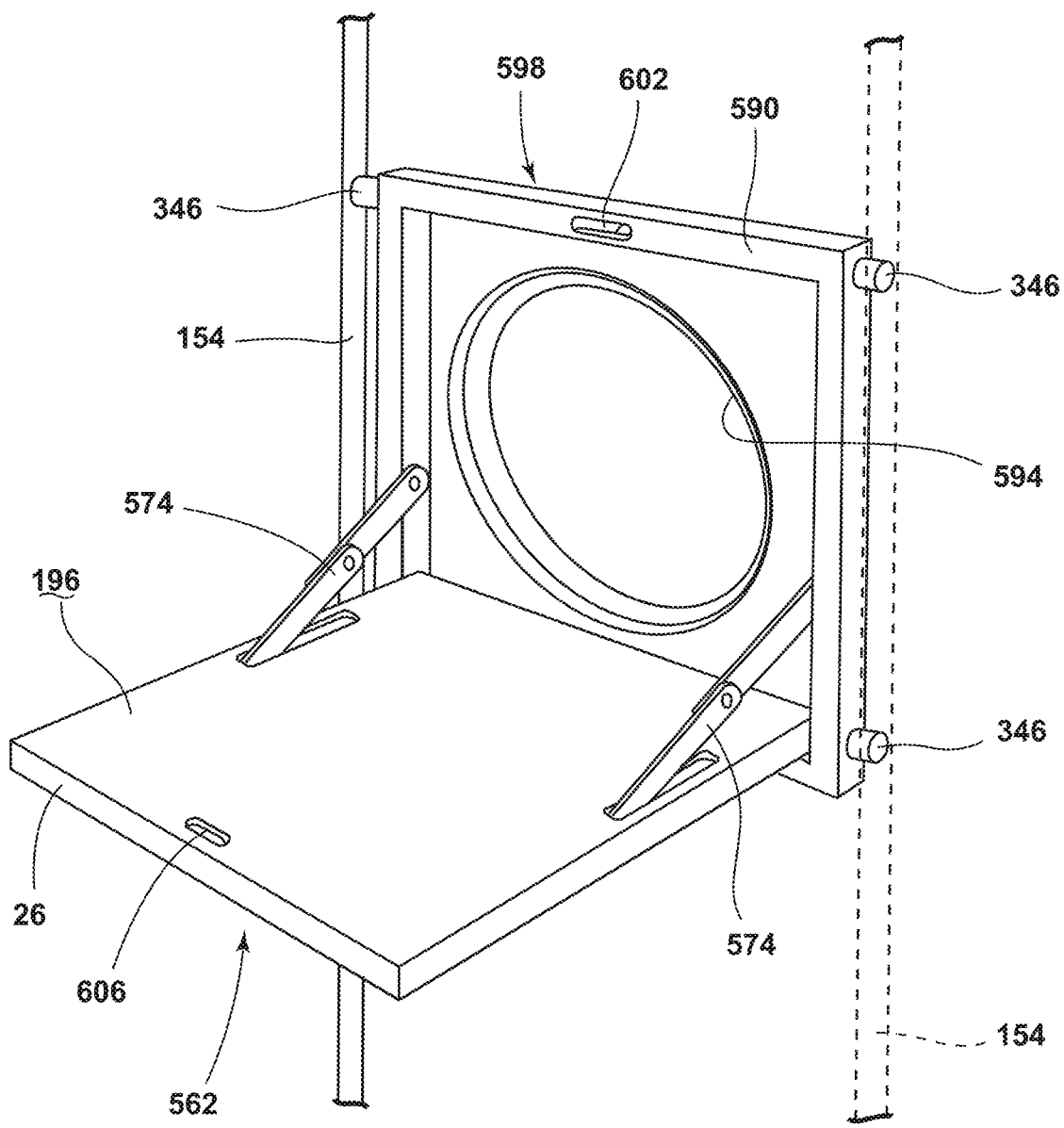
FIG. 59 is a front perspective view of a door of a laundry appliance with a cabinet removed, showing the door in a deployed position, according to one example.

Referring to FIGS. 1-59, reference numeral 10 generally designates a laundry appliance that includes a cabinet 14 defining a front opening 18. A tub 20 is positioned within the cabinet 14. A drum 22 is positioned within the tub 20 and is accessible via the front opening 18. A door 26 is operably coupled to the cabinet 14 and operable between an opened position 30 and a closed position 34. The door 26 is configured to seal the front opening 18 when in the closed position 34. A bellows assembly 42 is disposed proximate the front opening 18 between the cabinet 14 and the tub 20. A bellows wash assembly 46 is disposed proximate an upper portion 50 of the bellows assembly 42 for dispensing water along an interior surface 54 of the bellows assembly 42.

Figure 2:
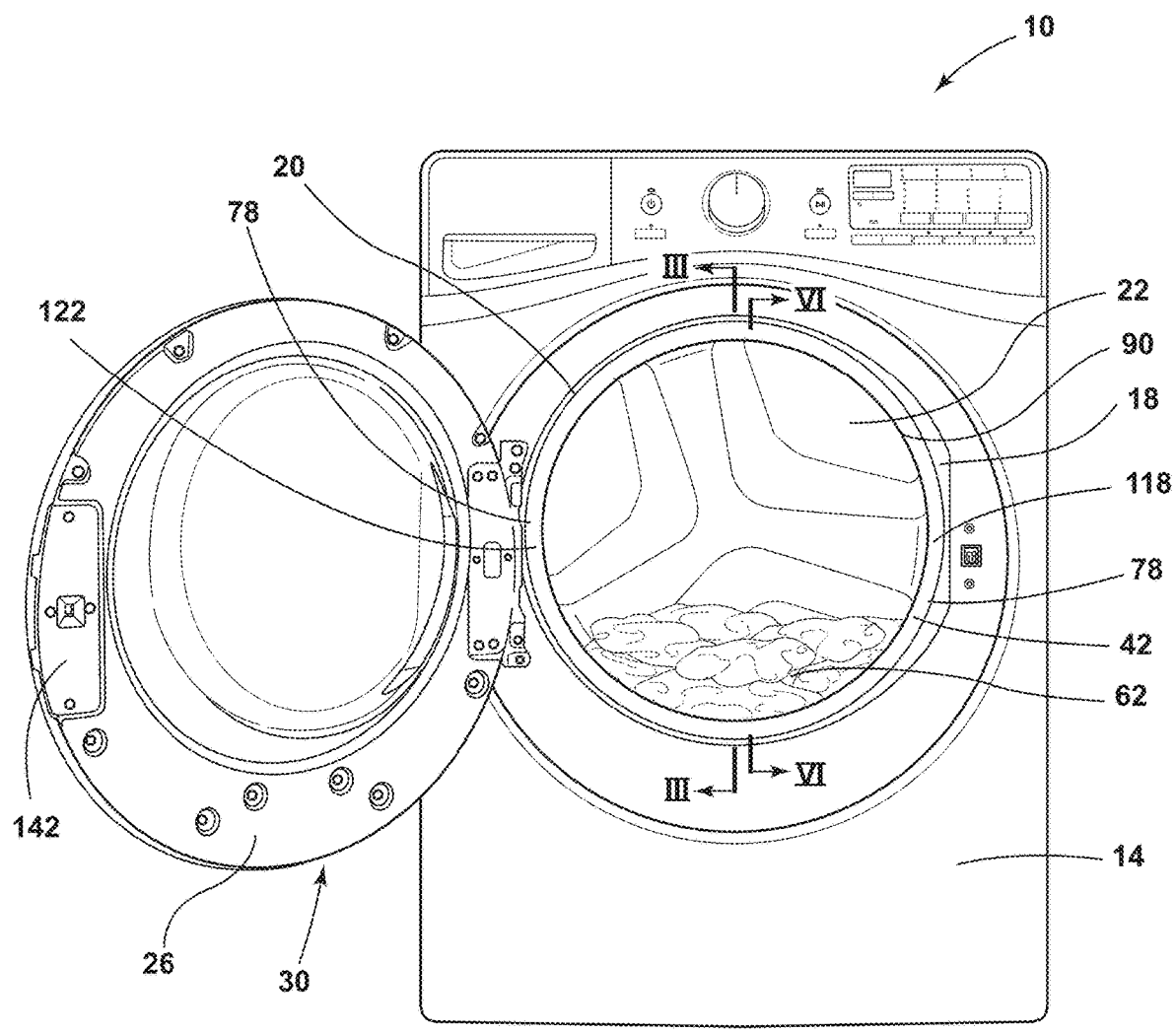
FIG. 2 is a front elevational view of the laundry appliance of FIG. 1 with the door in an opened position.

Referring to FIGS. 1 and 2, the laundry appliance 10 includes the cabinet 14 defining the front opening 18 in a front panel 58 thereof. The tub 20 is disposed within the cabinet 14 and defines an access opening 62, which is generally aligned with the front opening 18 of the cabinet 14. Accordingly, the tub 20 is typically accessed by a user via the front opening 18 and the access opening 62, respectively.

The laundry appliance 10 is illustrated as a front-load washer, however, the laundry appliance 10 may also be a top-load washer, a dryer, a combination washer/dryer, or another laundry appliance 10. The door 26 is operably coupled to the cabinet 14 for sealing the front opening 18 when in the closed position 34 and allowing access to the tub 20 and the drum 22 when in the opened position 30. As illustrated in FIGS. 1 and 2, the door 26 is a swing or hinged door rotatably coupled to the cabinet 14. In such examples, the door 26 can be a flat panel hinged door or a fishbowl-style hinged door. It is also contemplated that the door 26 can be a sliding door 26, as exemplified in FIGS. 8-22, which can move horizontally and/or vertically, without departing from the teachings herein.

Figure 3:
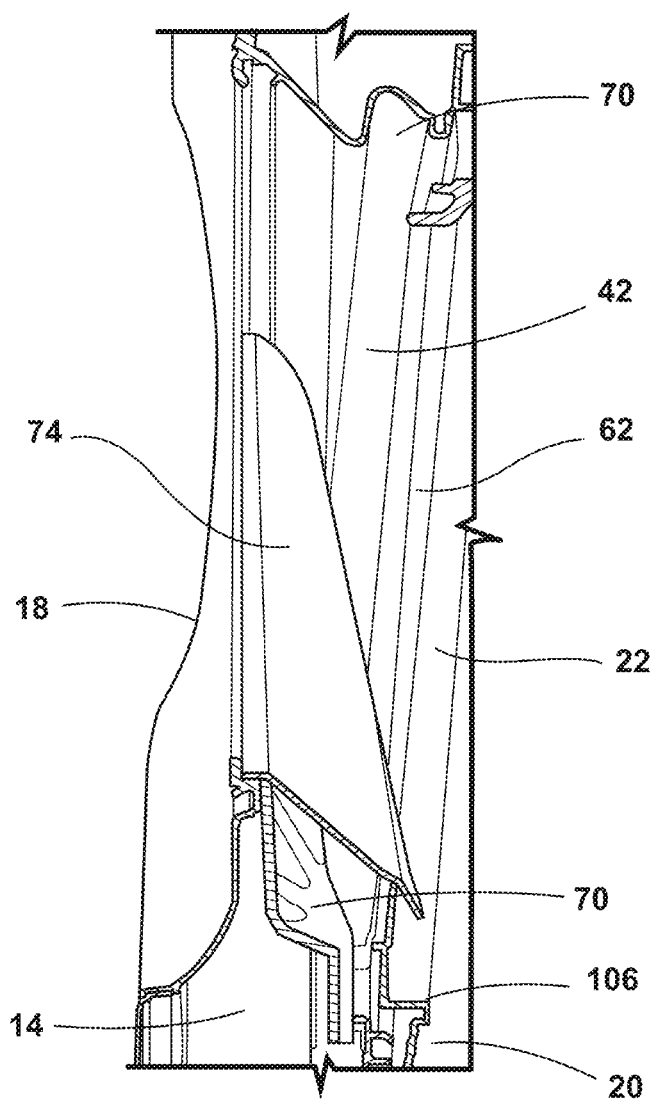
FIG. 3 is a partial cross-sectional view of a bellows assembly and a deflector in the laundry appliance of FIG. 2 taken at line III-III.
Figure 4:
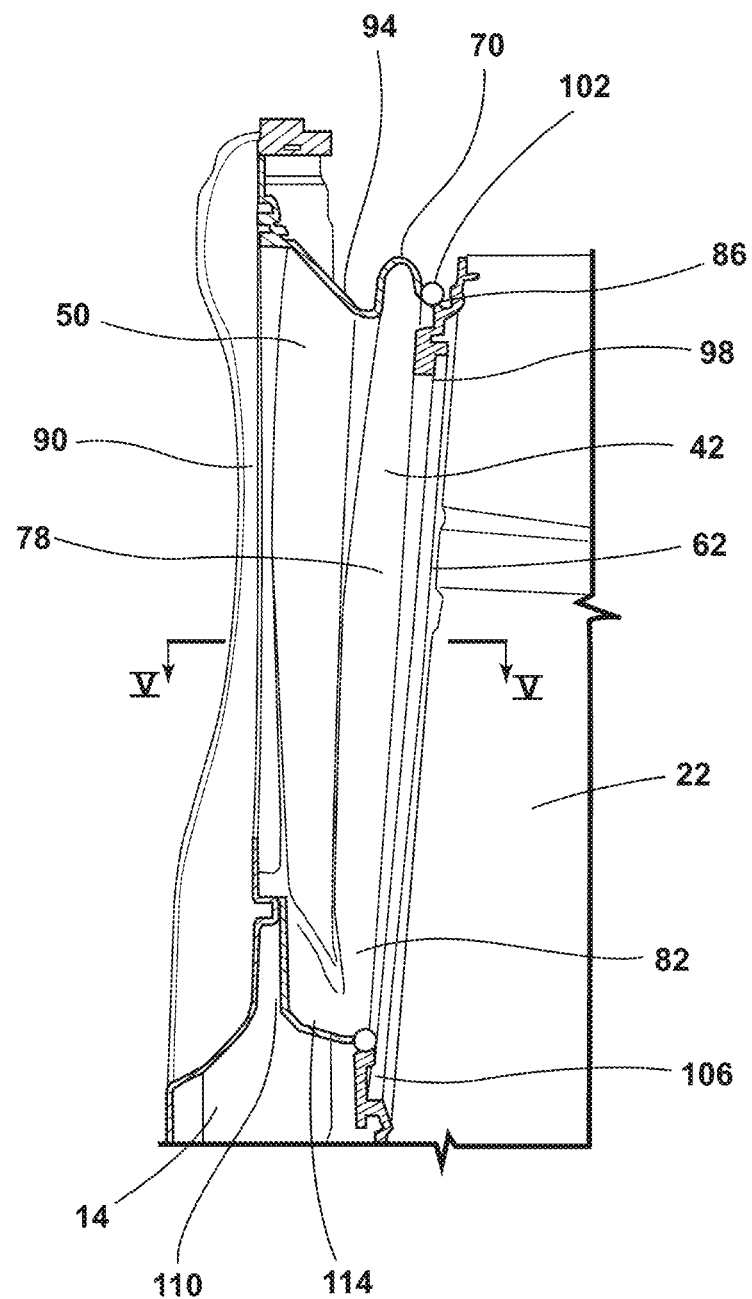
FIG. 4 is a partial cross-sectional view of the bellows assembly in the laundry appliance of FIG. 3 with the deflector removed.
Figure 5:
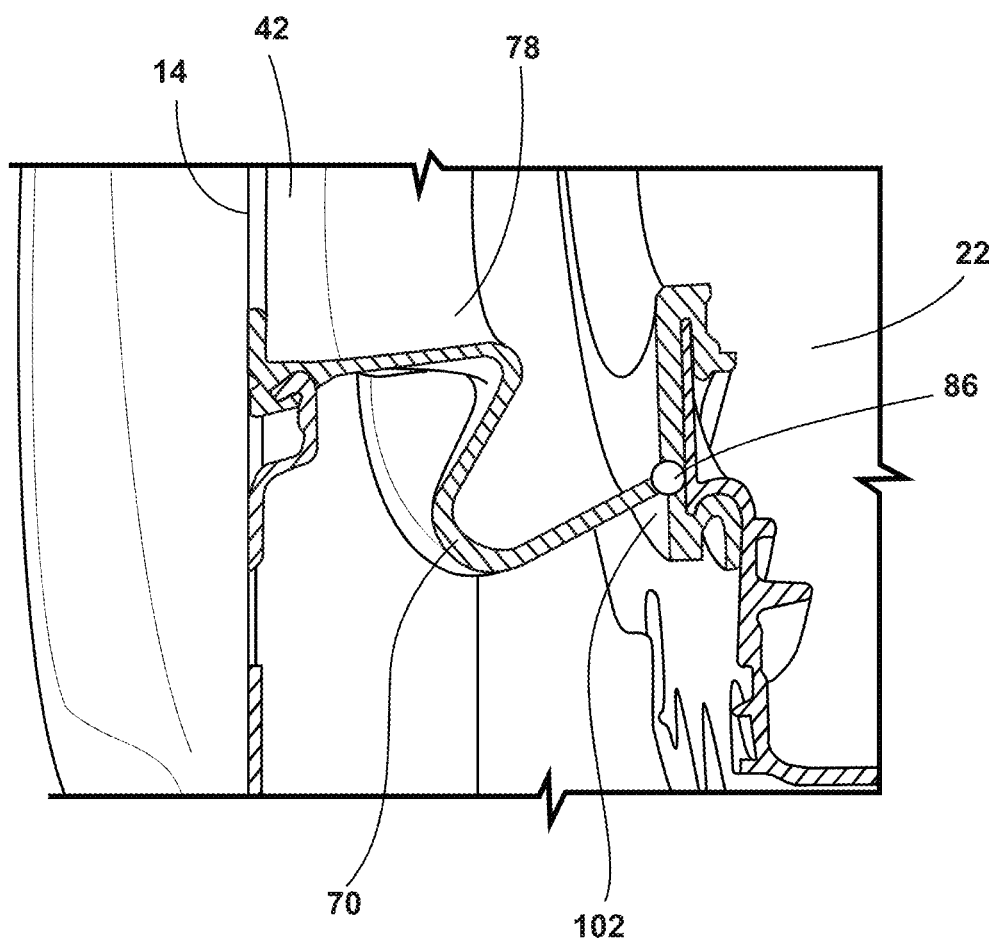
FIG. 5 is a partial cross-sectional view of the bellows assembly of FIG. 4 taken along line V-V.

Referring to FIGS. 2 and 3, the bellows assembly 42 is disposed adjacent to the front opening 18 of the cabinet 14. The bellows assembly 42 is typically coupled to the cabinet 14 along a perimeter of the front opening 18. Further, the bellows assembly 42 is also coupled to the tub 20 along a perimeter of the access opening 62. Accordingly, the bellows assembly 42 extends between the cabinet 14 and the tub 20. Typically, the bellows assembly 42 extends around the entire perimeter of the front opening 18 and the access opening 62. However, it is contemplated that the bellows assembly 42 can extend partially around the perimeter of at least one of the front opening 18 and the access opening 62.

In various examples, the tub 20 and the drum 22 may be positioned at an angle within the cabinet 14. As such, the access opening 62 can be offset from the front opening 18. Accordingly, the bellows assembly 42 can be an obliquely-oriented bellows. The bellows assembly 42 can be configured to form an oblique cylinder or frusto-conical shape that defines a downward angle between the front opening 18 and the access opening 62 of the offset tub 20. The bellows assembly 42 is advantageous for retaining laundry within the tub 20 during a laundry cycle. In such configurations, the bellows assembly 42 can form a sloped surface to direct water into the drum 22. The bellows assembly 42 is typically configured as a flexible gasket having a plurality of folds 70. The flexibility of the bellows assembly 42 and the folds 70 permit the tub 20 to move substantially independent of the cabinet 14.

Referring to FIGS. 2 and 3, the laundry appliance 10 can include a deflector 74 disposed proximate the bellows assembly 42. In examples having the deflector 74, the deflector 74 extends at least partially around the perimeter of the front opening 18 of the cabinet 14, however the deflector 74 can also extend around the entire perimeter. The deflector 74 is coupled to the cabinet 14 and extends over the bellows assembly 42, partially through the access opening 62, and into the drum 22. The deflector 74 is advantageous for deflecting laundry away from the bellows assembly 42 and into the drum 22. The deflector 74 is also advantageous for protecting the bellows assembly 42 from laundry contacting the bellows assembly 42, which can result in premature wear of the bellows assembly 42. The deflector 74 can be utilized in conjunction with a sliding-type door 26 and/or a hinged-type door 26 to deflect laundry away from the bellows assembly 42.

Referring to FIGS. 2-5, as previously explained, the bellows assembly 42 typically includes the folds 70, such that the tub 20 can move separately from the cabinet 14. The folds 70 can be substantially the same around the bellows assembly 42 or may be different in size, shape, number, or other aspects based on the configuration and positioning of the tub 20 relative to the cabinet 14. In various examples, the folds 70 can be substantially sinusoidal-shaped, obliquely sinusoidal-shaped, or other sinusoidal shape proximate at least one of the upper portion 50, side portions 78, and lower portion 82 of the bellows assembly 42. The sinusoidal-shaped folds 70 can include a first fold portion extending a first direction and a second fold portion extending a second opposing direction. The sinusoidal-shaped folds 70 are advantageous for minimizing and/or avoiding self-contact by the bellows assembly 42 when in motion. Reducing self-contact by the bellows assembly 42 reduces friction and surface wear of the bellows assembly 42 that can result therefrom.

The bellows assembly 42 typically has a rear profile that is substantially concentric with the access opening 62. Further, the upper portion 50 of the bellows assembly 42 is generally coupled to the tub 20 at an attachment portion 86 that is spaced-apart from the access opening 62. Accordingly, the bellows assembly 42 is typically offset from the access opening 62 of the tub 20. Further, a clear access aperture 90 defined by the bellows assembly 42 is typically larger than the access opening 62 defined by the tub 20.

For example, a 12 o'clock position 94 of the bellows assembly 42 can be coupled to the tub 20 at the attachment portion 86 and can be spaced-apart from a top portion 98 of the access opening 62. In such examples, the upper portion 50 of the bellows assembly 42 is coupled to the tub 20 in a manner to increase a gap 102 between the folds 70 and the tub 20. Increasing the gap 102 between the bellows assembly 42 and the tub 20 is advantageous for minimizing contact between the bellows assembly 42 and the tub 20 when either is in motion, which reduces surface wear of the bellows assembly 42 as a result.

The lower portion 82 of the bellows assembly 42 can generally align with a bottom portion 106 of the access opening 62 of the tub 20. The folds 70 proximate the lower portion 82 of the bellows assembly 42 are also typically substantially sinusoidal-shaped. The folds 70 proximate the lower portion 82 of the bellows assembly 42 are advantageous for increasing a space 110 between the bellows assembly 42 and the front panel 58 of the cabinet 14. Increasing the space 110 is advantageous for minimizing contact between the cabinet 14 and the bellows assembly 42 when the bellows assembly 42 is in motion, which reduces surface wear of the bellows assembly 42.

In various examples, a 6 o'clock position 114 of the bellows assembly 42 can be disposed adjacent to the bottom portion 106 of the access opening 62 to maintain a watershed feature 116 of the bellows assembly 42. The watershed feature 116 of the bellows assembly 42 allows water that contacts the bellows assembly 42 to drain from the bellows assembly 42 into the tub 20 and/or the drum 22. The lower portion 82 can form a sloping surface to direct liquid into the tub 20 and/or the drum 22 to provide the watershed feature 116. The watershed feature 116 can reduce and/or eliminate other types of drains in the laundry appliance 10 that remove water or other liquid or items from the bellows assembly 42.

Referring still to FIGS. 2-5, the side portions 78 of the bellows assembly 42 can include folds 70. The attachment portions 86, where the side portions 78 of the bellows assembly 42 are coupled to the tub 20, are spaced outside of the access opening 62 to increase the gap 102 between the folds 70 of the bellows assembly 42 and the tub 20. For example, a 3 o'clock position 118 and a 9 o'clock position 122 of the bellows assembly 42 are coupled to the tub 20, such that the bellows assembly 42 is concentrically larger than the access opening 62. Accordingly, the clear access aperture 90 defined by the bellows assembly 42 is typically wider than the access opening 62. The increased gap 102 proximate the folds 70 in the side portions 78 of the bellows assembly 42 reduces contact between the bellows assembly 42 and the tub 20 when either or both of the bellows assembly 42 and the tub 20 are in motion to reduce surface wear of the bellows assembly 42. The bellows assembly 42, as described herein, may be utilized with a hinged-type door 26, as illustrated in FIG. 2, and/or with a sliding-type door 26 as illustrated in FIGS. 8-22. The sinusoidal bellows assembly 42 is configured to reduce self-contact of the bellows assembly 42, as well as reduce contact with the tub 20 and the cabinet 14.

Figure 6:
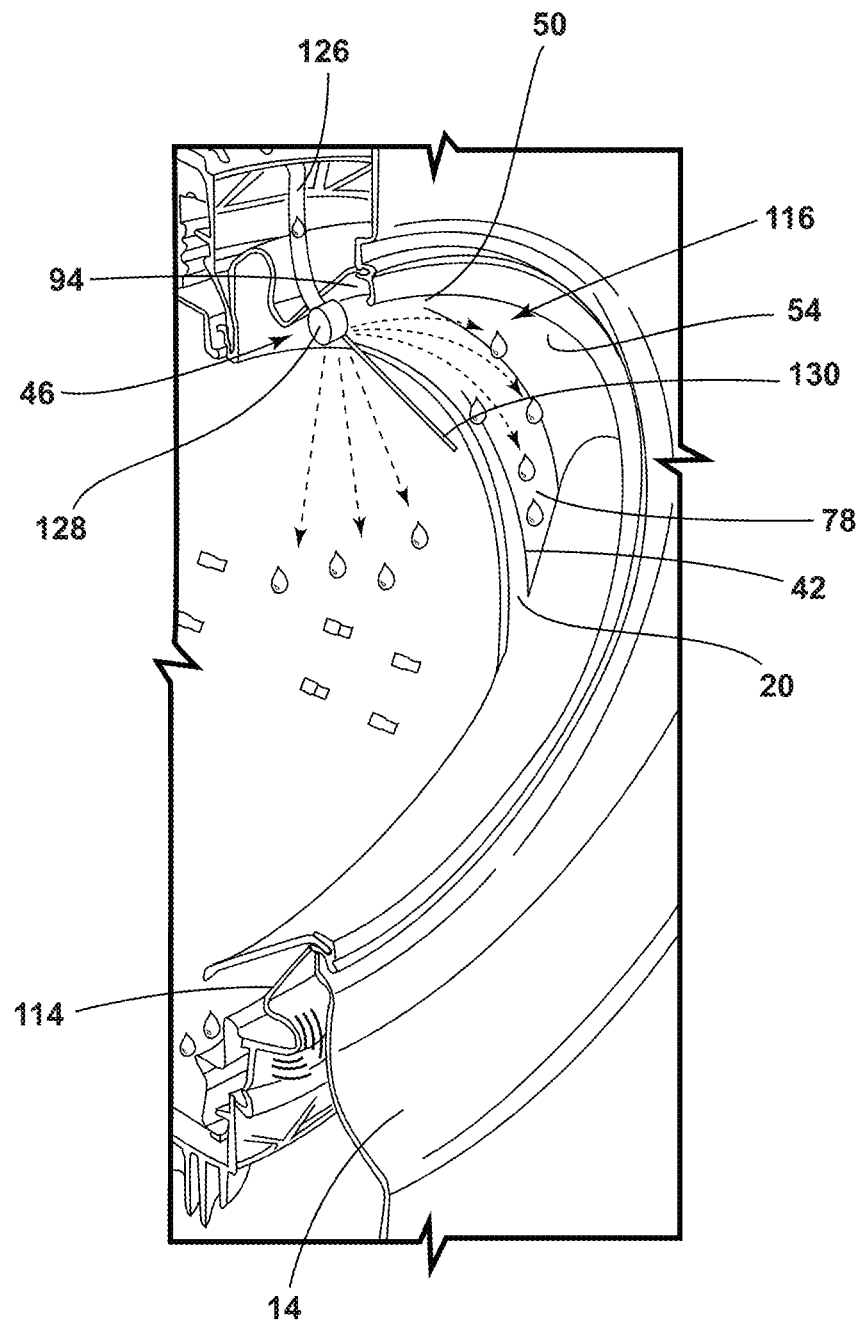
FIG. 6 is a schematic partial cross-sectional perspective view of the laundry appliance of FIG. 2 taken along line VI-VI.
Figure 7:
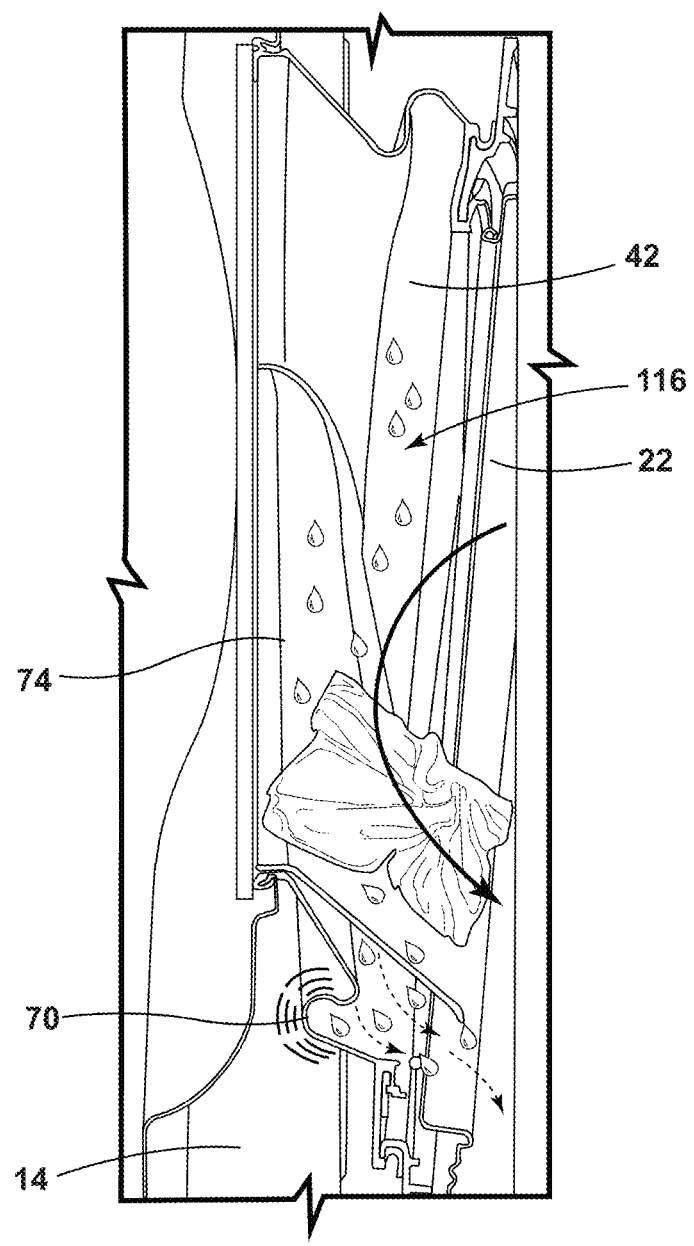
FIG. 7 is a schematic cross-sectional view of the bellows assembly of FIG. 3 showing operation of the bellows wash assembly.

Referring to FIGS. 1, 6, and 7, the laundry appliance 10 may include the bellows wash assembly 46. The bellows wash assembly 46 typically includes at least one inlet 126 for inserting liquid, such as water or cleaning agents, into the tub 20, the drum 22, and/or onto the interior surface 54 of the bellows assembly 42. The inlet 126 can be the primary water inlet of the laundry appliance 10 (e.g., a washer) for providing water to the tub 20, and possibly the drum 22, to wash the laundry. The bellows wash assembly 46 can include one or more diverters 130 to direct the liquid from the inlet 126 into different directions. For example, the bellows wash assembly 46 can include two diverters 130 to separate the liquid into two or more streams. For example, the liquid can be provided directly to the tub 20 to wash the laundry and can also be provided to each side portion 78 of the bellows assembly 42. In other words, the liquid can be divided into a central stream and two side streams of water. Other configurations of directing the liquid from the bellows wash assembly 46 are contemplated without departing from the teachings herein.

The bellows wash assembly 46 may include one inlet 126 and one diverter 130 to divide the liquid into at least two streams of liquid flowing down the opposing side portions 78 of the bellows assembly 42. Additionally or alternatively, the bellows wash assembly 46 can include at least one additional inlet 126 (e.g., at least two inlets 126). In such examples, the bellows wash assembly 46 can include two inlets 126, each configured to direct liquid down one corresponding side portion 78 of the bellows assembly 42, respectively. Moreover, separated inlets 126 can dispense different types of liquid (e.g., one for water and one for a cleaning agent).

According to various aspects, the bellows wash assembly 46 can include at least one spray nozzle 128 for directing liquid to the tub 20 and/or to the bellows assembly 42. In various examples, the spray nozzle 128 can operate in conjunction with the diverters 130 to divide the water into streams for the bellows assembly 42 and the tub 20. It is contemplated that the bellows wash assembly 46 can include multiple spray nozzles 128, each configured to direct liquid at a corresponding portion of the bellows assembly 42 and into the tub 20, respectively.

The bellows wash assembly 46 is typically configured to direct liquid in a repeatable pattern over the interior surface 54 of the bellows assembly 42. The inlet 126 is often disposed proximate the upper portion 50 of the bellows assembly 42; however, the one or more inlets 126 may also be disposed elsewhere without departing from the teachings herein. In certain aspects, the inlet 126 is disposed at the upper portion 50, such as proximate the 12 o'clock position 94, of the bellows assembly 42. The inlet 126 and/or the spray nozzle 128 typically direct the liquid over the interior surface 54 of both side portions 78 of the bellows assembly 42 and to the lower portion 82 of the bellows assembly 42. Accordingly, the bellows wash assembly 46 can direct liquid over the interior surface 54 of the bellows assembly 42 from approximately the 12 o'clock position 94 toward approximately the 6 o'clock position 114 where the watershed feature 116 is typically positioned. The liquid may diverge proximate the inlet 126 to flow down both side portions 78 of the bellows assembly 42 and then converge proximate the lower portion 82 of the bellows assembly 42. Accordingly, each stream of liquid can travel approximately 180° around the bellows assembly 42. With the watershed feature 116, the bellows assembly 42 may then direct the liquid into the tub 20 or the drum 22. The liquid typically flows in a continuous pattern that can be repeated when the liquid is dispensed from the inlet 126 of the bellows wash assembly 46. In examples where the laundry appliance 10 includes the deflector 74, the liquid from the bellows wash assembly 46 may flow under the deflector 74 along the lower portion 82 with the watershed feature 116 of the bellows assembly 42. Additional diverters 130 can be included to direct liquid onto a top surface of the deflector 74.

The flow of liquid stays on the bellows assembly 42 by surface adhesion of the liquid, the shape of the bellows assembly 42, the folds 70, and/or centrifugal force. The bellows wash assembly 46 is advantageous for washing the bellows assembly 42. More specifically, the bellows wash assembly 46 is advantageous for washing the folds 70 of the bellows assembly 42. The bellows wash assembly 46 can clear laundry materials from the interior surface 54 of the bellows assembly 42. The laundry materials may include lint, dirt, moisture, pooled water, residual laundry chemistry, and/or small items.

Referring still to FIGS. 1, 6, and 7, movement of the tub 20 and/or the cabinet 14 can assist the bellows wash assembly 46 in washing the bellows assembly 42. For example, vibrations of the cabinet 14 during a laundry cycle often cause movement and/or vibrations of the bellows assembly 42. Additionally or alternatively, movement of the tub 20 during a laundry cycle typically causes movement of the bellows assembly 42. The movement and/or vibrations of the bellows assembly 42 generally promote movement of the laundry materials from the bellows assembly 42 into the tub 20 and/or the drum 22. Accordingly, the bellows wash assembly 46, the shape of the bellows assembly 42, and the movement of the bellows assembly 42 can cooperate to provide a wash system for the bellows assembly 42. Additionally, the wash system can be ongoing and automatic and may operate in conjunction with, or independently from, a laundry cycle. The bellows wash assembly 46 can be used in conjunction with the sinusoidal bellows assembly 42. Additionally or alternatively, the bellows wash assembly 46 can be used with a variety of doors 26 that can be included in the laundry appliance 10. For example, the bellows wash assembly 46 can be used with a hinged-type door, a sliding-type door, and/or a sliding and rotating-type door.

Figure 8:
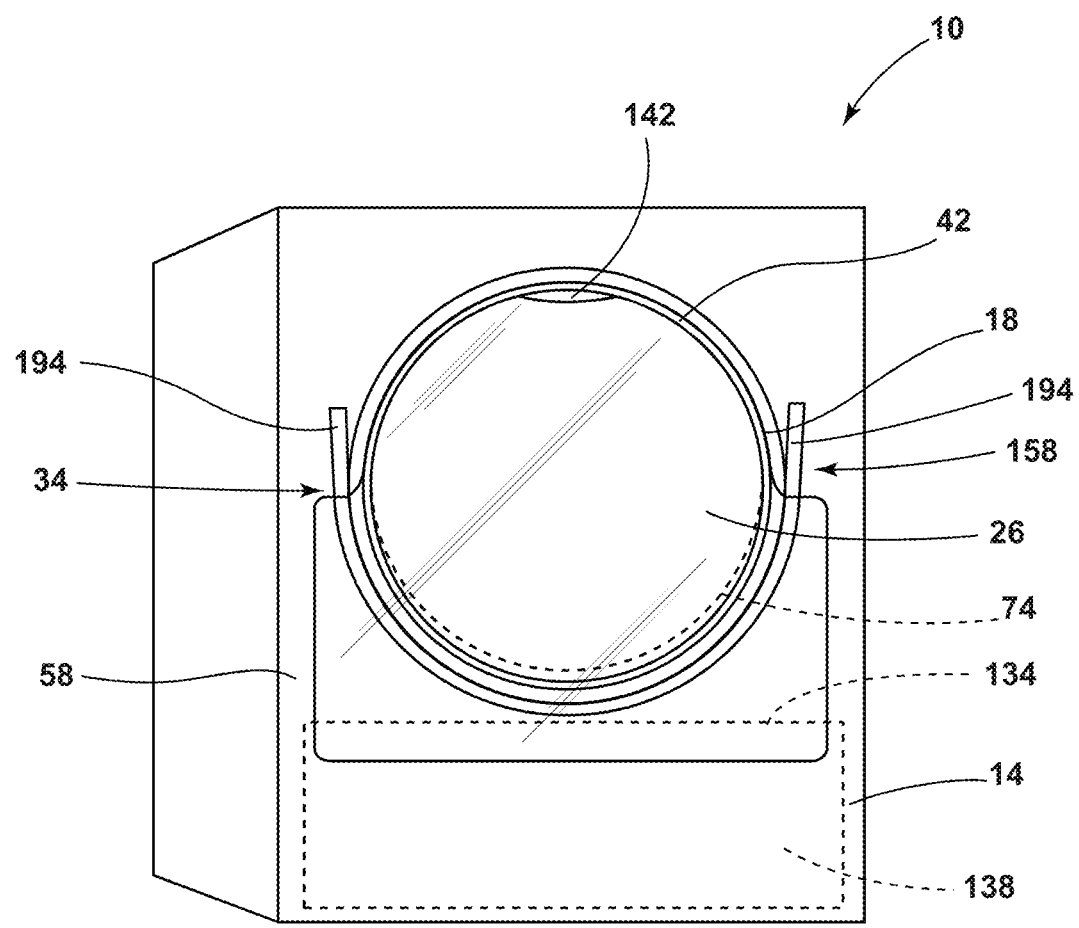
FIG. 8 is a schematic front perspective view of the laundry appliance having a sliding door, according to one example.
Figure 9:
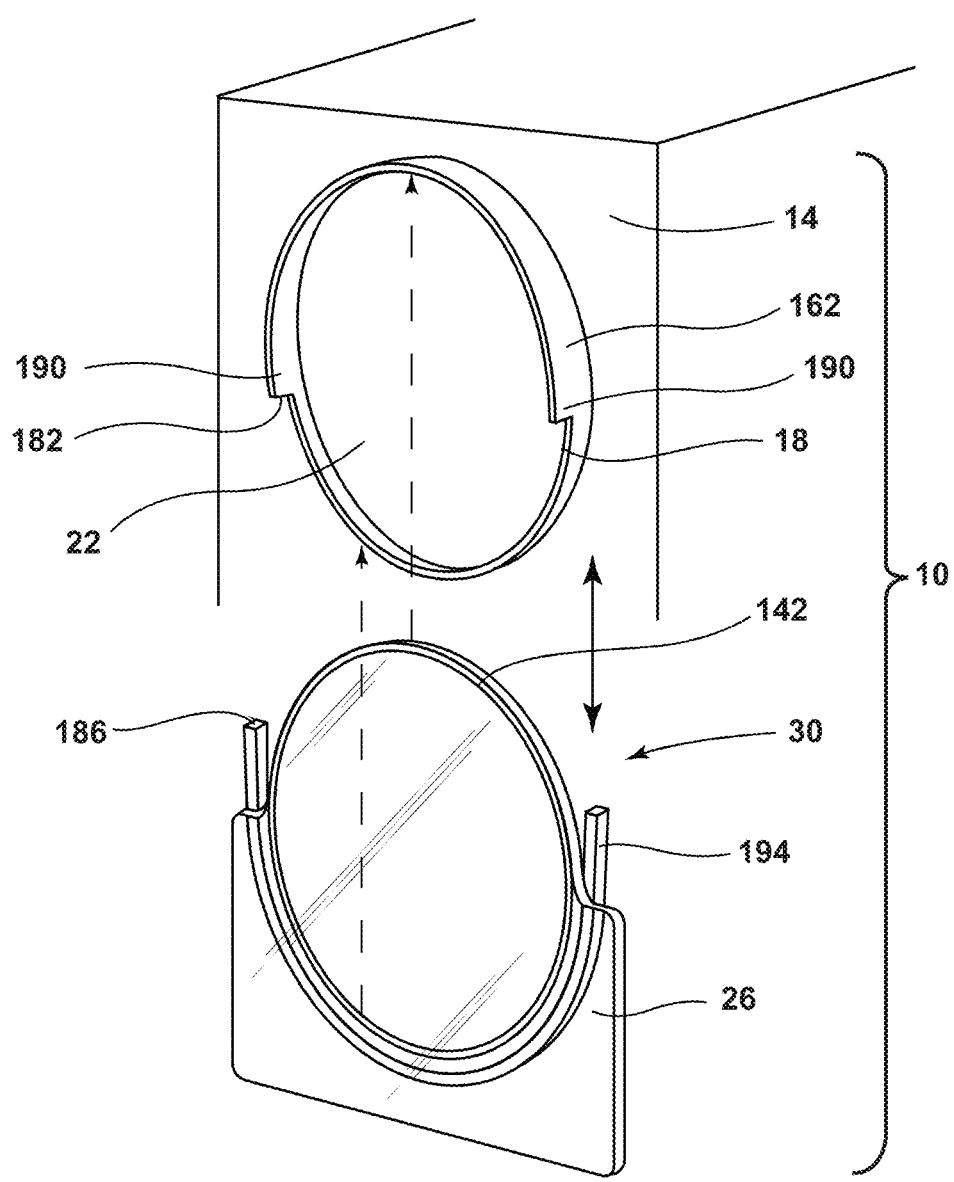
FIG. 9 is a partial schematic exploded view of the laundry appliance of FIG. 8.
Figure 10:
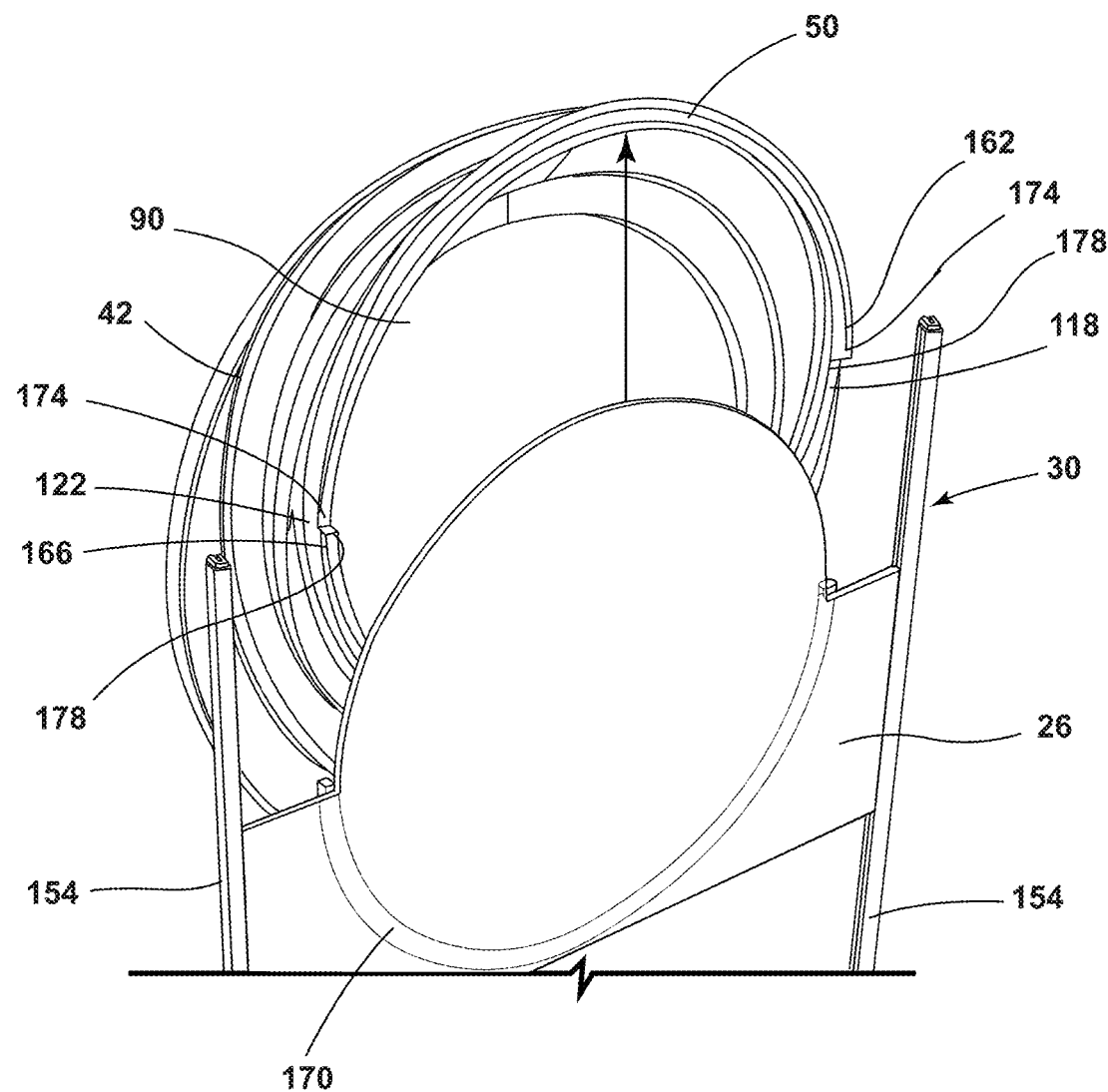
FIG. 10 is a side perspective view of the bellows assembly and the sliding door in the opened position removed from the laundry appliance, according to one example.

Referring to FIGS. 8 and 9, the door 26 of the laundry appliance 10 can be slidably coupled with the cabinet 14. In such examples, the door 26 is typically a substantially flat panel. The door 26 is generally configured to slide from the closed position 34 covering the front opening 18 to a downward location within the cabinet 14 of the laundry appliance 10 (e.g., the opened position 30). In such examples, the cabinet 14 of the laundry appliance 10 typically defines a slot 134 for accessing a chamber 138 positioned proximate to the front panel 58 of the cabinet 14. The door 26 can move through the slot 134 into the chamber 138 when moving to the closed position 34.

The door 26 includes a handle 142 that allows the user to move the door 26 over the front opening 18 and/or into the chamber 138. As illustrated, the closed position 34 (e.g., when the door 26 is positioned over the front opening 18 of the cabinet 14) is a raised position. In such examples, the opened position 30 of the door 26, which provides access to the drum 22, is a lowered position relative to the closed position 34. When the door 26 is in the opened position 30, the door 26 is disposed in the chamber 138 defined by the cabinet 14. As illustrated, the chamber 138 is disposed below the front opening 18, such that a user, or an operating mechanism, can manipulate the door 26 upwards to the closed position 34 over the front opening 18. However, it is contemplated that the chamber 138 can be positioned in another location proximate the front opening 18 and the door 26 can be configured to move sideways and/or downwards to be positioned over the front opening 18. Additionally, the use of the deflector 74 in the laundry appliance 10 can allow for the use of the slidably engaged panel door 26 while providing a function to deflect laundry away from the bellows assembly 42.

As discussed later herein, the door 26 can be motorized. In such examples, a user can activate a motor to operate the door 26. A control for the motor and/or a motorized door 26 can be incorporated into the laundry appliance 10 or can be a separate or remote control unit.

Referring to FIGS. 8-12, the laundry appliance 10 can include rails 154 for sliding the door 26 between the opened and closed positions 30, 34. The rails 154 are typically disposed within the cabinet 14 on opposing sides of the front opening 18. It is contemplated that the laundry appliance 10 can have a single rail 154 or another method for slidably engaging the door 26 with the cabinet 14. The door 26 generally defines any cross-sectional shape that engages the rails 154, or another coupling device, and can seal the front opening 18 of the cabinet 14 while allowing translational movement of the door 26 along the rails 154.

In various examples, the laundry appliance 10 includes a sealing assembly 158 for sealing the front opening 18 with the door 26. The sealing assembly 158 can have a variety of configurations based on the configuration of the door 26 and/or the laundry appliance 10. For example, the sealing assembly 158 typically includes a first seal 162, a second seal 166, and a gasket 170. The first seal 162 can be coupled to at least one of the bellows assembly 42 and the cabinet 14 proximate the front opening 18. The first seal 162 often corresponds with the upper portion 50 of the bellows assembly 42. Additionally or alternatively, the first seal 162 may extend between approximately the 9 o'clock position 122 and approximately the 3 o'clock position 118 of the bellows assembly 42.

The second seal 166 typically corresponds with the lower portion 82 of the bellows assembly 42. The second seal 166 can be coupled to at least one of the bellows assembly 42 and the cabinet 14 proximate the front opening 18. The second seal 166 generally extends between approximately the 3 o'clock position 118 and approximately the 9 o'clock position 122 of the bellows assembly 42.

Accordingly, the first and second seals 162, 166 can both be substantially U-shaped seals. Further, the first and second seals 162, 166 align to form a substantially circular or oblong seal around the clear access aperture 90 defined by the bellows assembly 42. In various examples, first seal ends 174 may be spaced-apart or offset from second seal ends 178. Alternatively, the first seal ends 174 and the second seal ends 178 can mate to provide a continuous seal around the front opening 18. In a non-limiting example, the first seal ends 174 and the second seal ends 178 may overlap or abut one another. Moreover, the first seal ends 174 typically define first mating interfaces 182 configured to align and abut second mating interfaces 186 defined by the gasket 170.

In various examples, as illustrated in FIGS. 8 and 9, the sealing assembly 158 includes the gasket 170 as a separate component coupled to the door 26. The gasket 170 can be configured to form a watertight seal with the first seal 162. The first seal 162 can extend around the entire front opening 18 of the cabinet 14, such that the sealing assembly 158 may be free of the second seal 166. The first seal 162 can define notches 190 having the first mating interface 182 configured to abut the second mating interfaces 186 of the gasket 170. The gasket 170 can engage the first seal 162, the bellows assembly 42, and/or the cabinet 14 to form a watertight seal around the front opening 18.

Referring still to FIGS. 8-12, an inner surface 196 of the door 26 may include the gasket 170. In examples without the second seal 166, the gasket 170 is configured to align with a bottom half of the first seal 162 and/or the lower portion 82 of the bellows assembly 42. In examples having both the first and second seals 162, 166, the gasket 170 is configured to align with the second seal 166 and abut the first seal 162. The gasket 170 can abut the second seal 166 to form a watertight seal therebetween. In various examples, the gasket 170 is substantially U-shaped. The U-shaped gasket 170 is typically disposed substantially on the door 26.

The gasket 170 can include opposing gasket ends 194 that extend beyond opposing outer edges 198 of the door 26. The gasket ends 194 extend from the inner surface 196 of the door 26 and can extend into the cabinet 14 adjacent to the drum 22. The extended gasket ends 194 are advantageous for collecting any liquid that may travel through the first and second seals 162, 166 proximate the side portions 78 of the bellows assembly 42. The liquid can then be guided to a storage or a recirculation system of the laundry appliance 10. The gasket 170 is typically formed similarly to the first and second seals 162, 166. Additionally or alternatively, the gasket 170 may be a surface texture applied to the door 26 and/or may be a material applied to the door 26. In various examples, the gasket 170 defines the second mating interface 186 at, or proximate, each of the gasket ends 194. The first and second mating interfaces 182, 186 can abut one another and/or interlock to form a substantially watertight seal around the front opening 18 of the cabinet 14. Additionally, the sealing assembly 158 having the various seal components can form a non-contact seal, which is advantageous for reducing friction and, as a result, reducing wear on the sealing assembly 158. Each of the first and second seals 162, 166 and the gasket 170 typically includes rubber materials or other similar resiliently and/or elastically compressible materials.

Figure 12:
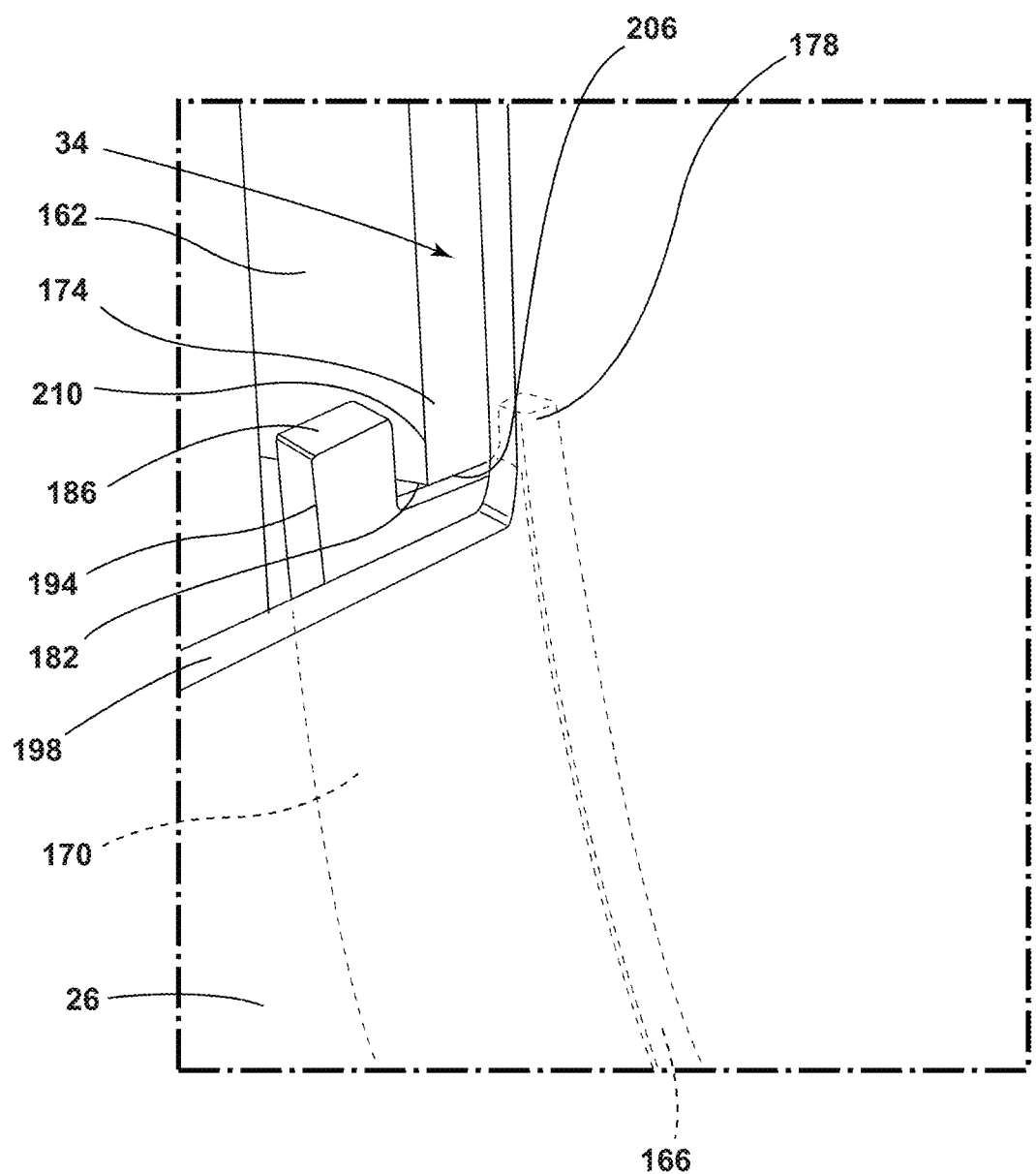
FIG. 12 is an enlarged view of a sealing assembly, taken at area XII of FIG. 11.

Referring to FIG. 12, the second seal 166 is often disposed interior of the first seal 162. The gasket 170 can be disposed outwardly of the second seal 166 and align with the first seal 162. The gasket 170 can also extend outwardly from the first seal 162. Accordingly, the gasket 170 may contact at least one surface of the first seal 162. As illustrated, the gasket 170 contacts at least two surfaces, a bottom surface 206 and a side surface 210, of the first seal 162. The second mating interface 186 defined by the gasket 170 can define any shape configured to correspond with the first mating interface 182 defined by the first seal 162 to form a watertight seal. Accordingly, the gasket 170 generally aligns with the second seal 166 to form a watertight seal along a lower portion of the access opening 62, and can abut the first seal 162 to form a continuous watertight seal around the perimeter of the access opening 62 (FIG. 8).

Figure 11:
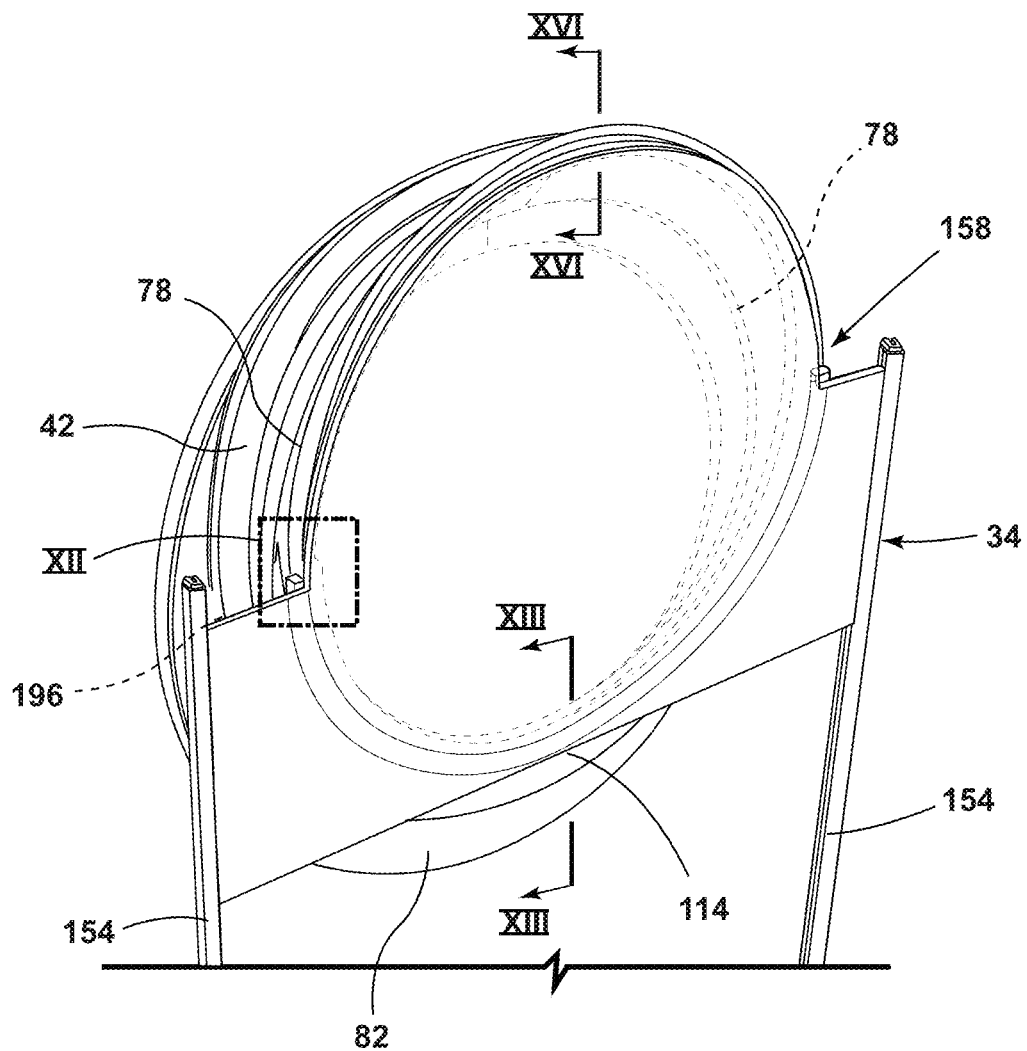
FIG. 11 is a side perspective view of the bellows assembly and the sliding door in the closed position removed from the laundry appliance, according to one example.
Figure 13:
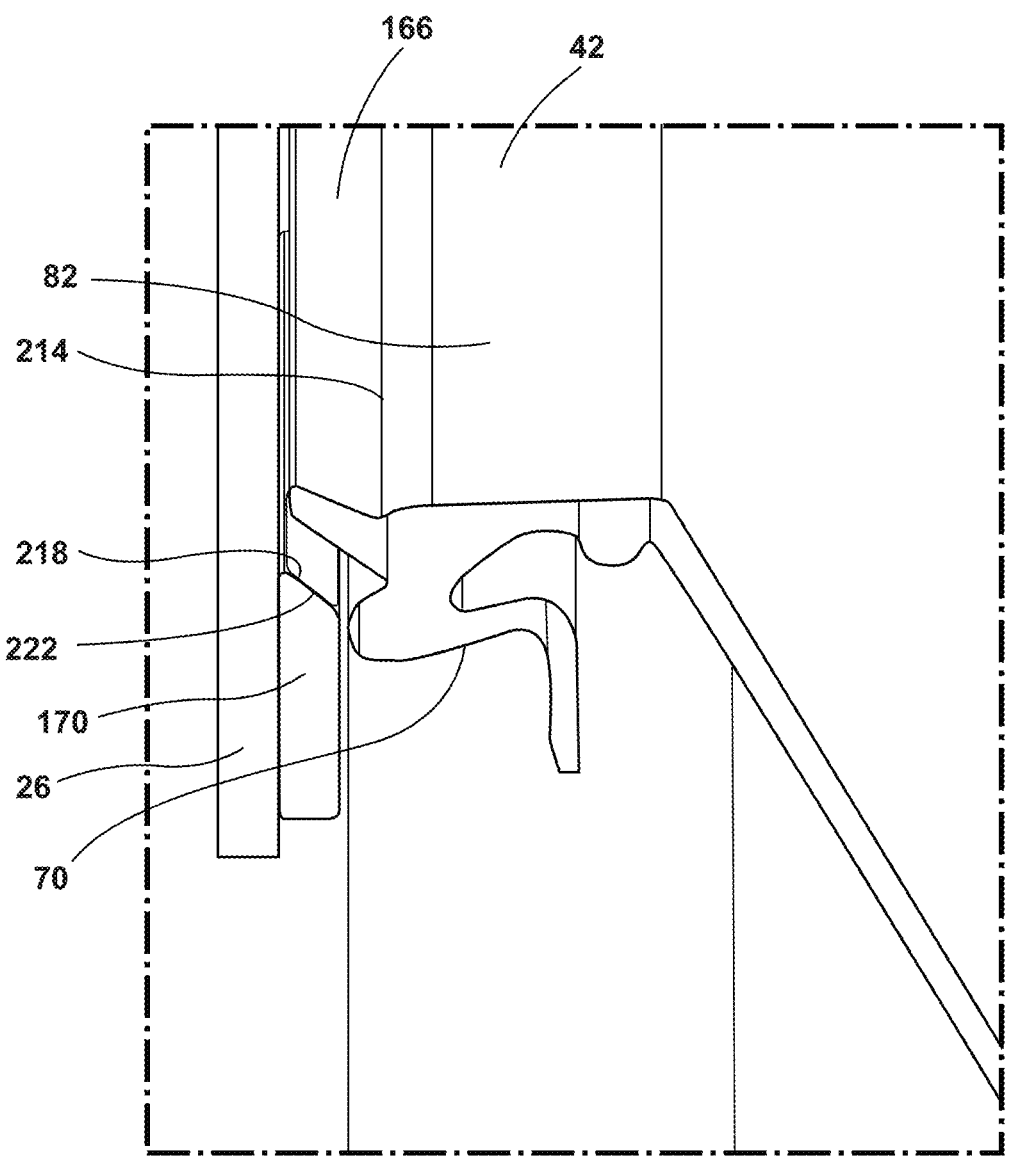
FIG. 13 is a partial cross-sectional view of the bellows assembly and the door of FIG. 11 taken along line XIII-XIII.

Referring to FIGS. 11 and 13, in non-limiting examples, the second seal 166 may be coupled to a front surface 214 of the bellows assembly 42. The bellows assembly 42 can define the folds 70 when the second seal 166 is coupled to the bellows assembly 42. The second seal 166 and the gasket 170 can form first and second mating surfaces 218, 222 proximate the lower portion 82 of the bellows assembly 42. For example, proximate the 6 o'clock position 114 of the bellows assembly 42, the second seal 166 can define the first mating surface 218 and the gasket 170 can define the second mating surface 222. The first and second mating surfaces 218, 222 typically correspond to one another to form a watertight seal when the door 26 is in the closed position 34.

Figure 14:
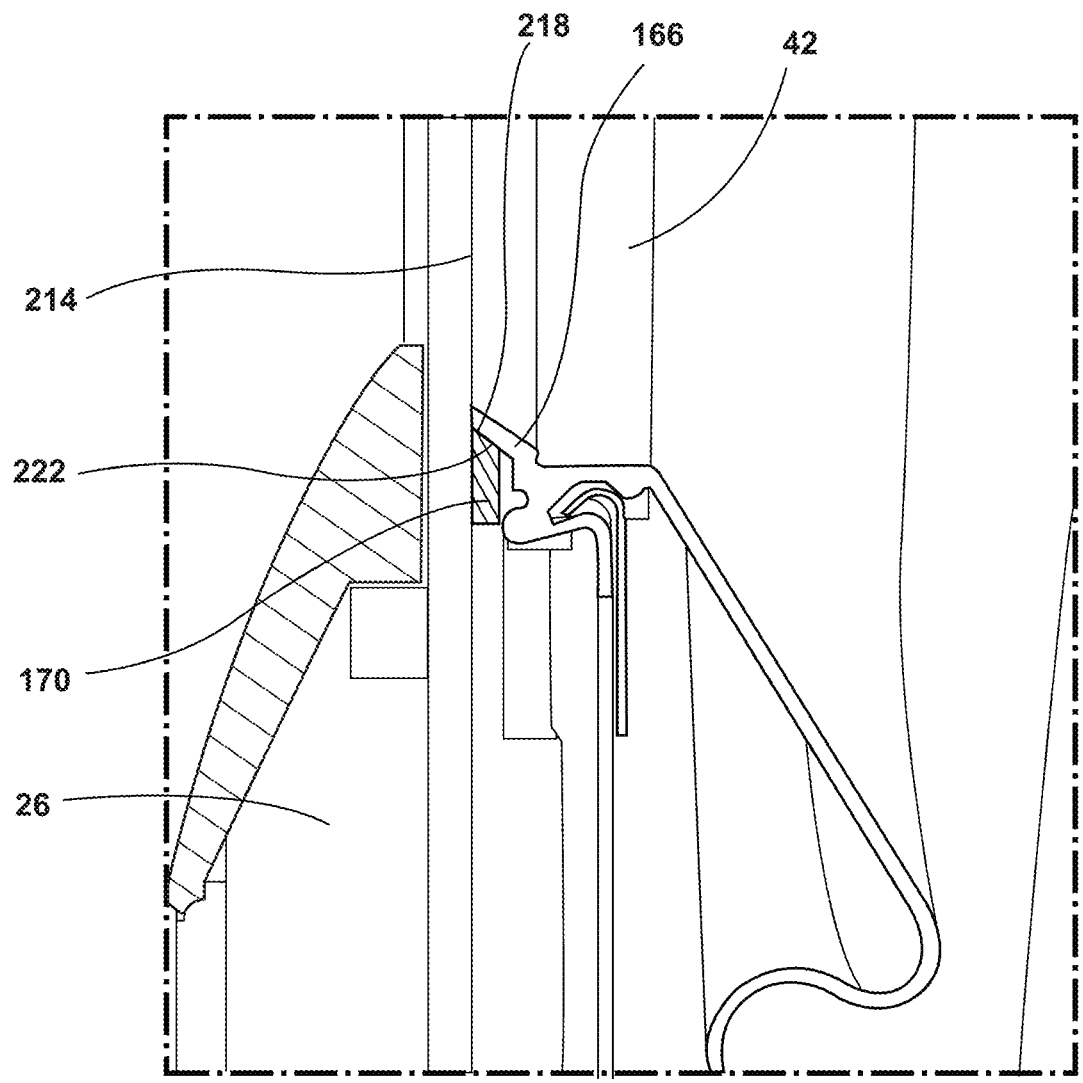
FIG. 14 is a partial cross-sectional view of the bellows assembly and the door of FIG. 13 with a seal of a sealing assembly integrally formed with the bellows assembly.
Figure 15:
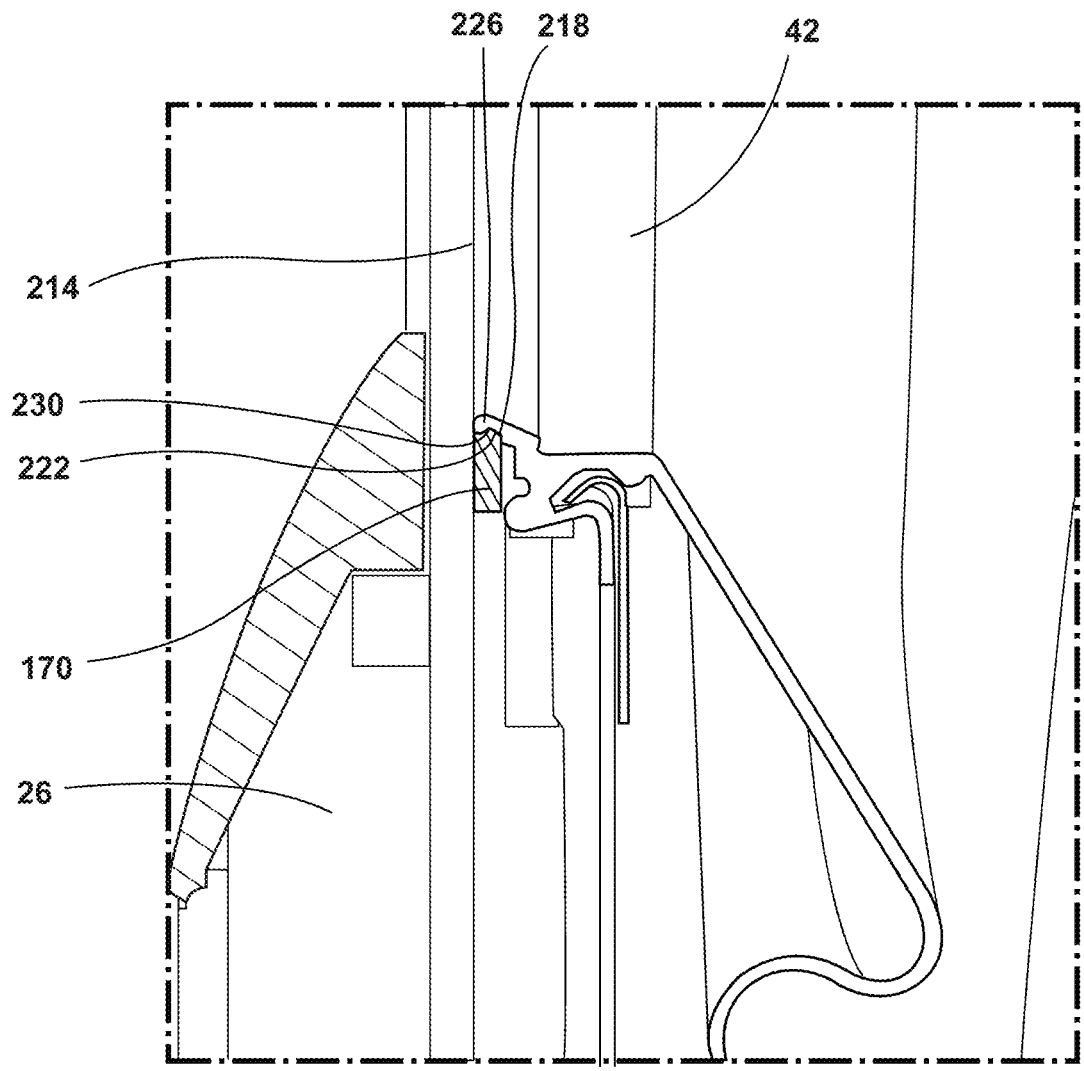
FIG. 15 is a partial cross-sectional view of the bellows assembly and the door of FIG. 14 with the seal having a hook to interlock with a gasket on the door.

Referring to FIGS. 11, 14, and 15, in another non-limiting example, the second seal 166 may be integrally formed with the bellows assembly 42. In such examples, the front surface 214 of the bellows assembly 42 defines the second seal 166. Accordingly, the bellows assembly 42 defines the second seal 166 and also defines the first mating surface 218. The first mating surface 218 of the bellows assembly 42 and the second mating surface 222 of the gasket 170 correspond to form the watertight seal proximate the lower portion 82 of the bellows assembly 42 (e.g., proximate at least the 6 o'clock position 114).

In various examples, the first and second mating surfaces 218, 222 can be angled surfaces, as illustrated in FIG. 14. In additional examples, the first mating surface 218 can define a hook feature 226 configured to interlock and/or mate with an indent 230 defined by second mating surface 222, as illustrated in FIG. 15. However, it is contemplated that the first and second mating surfaces 218, 222 may be any shapes that correspond with one another to form a watertight seal.

Figure 16:
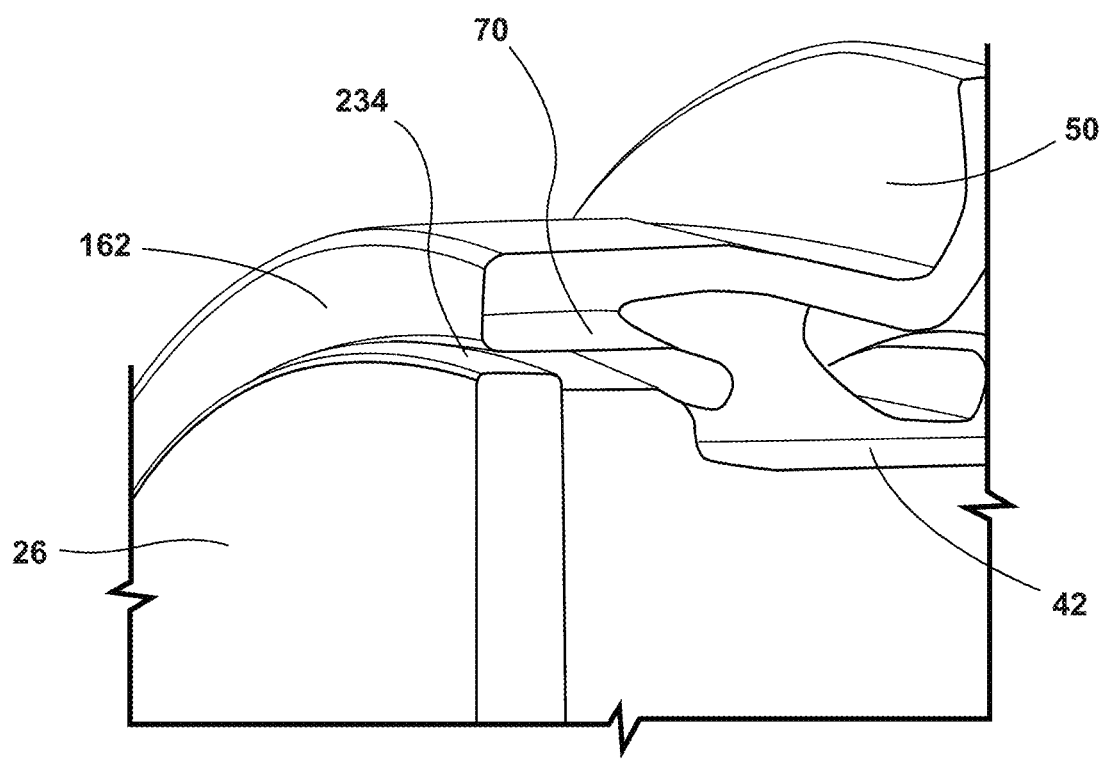
FIG. 16 is a partial cross-sectional view of a door abutting a seal of the bellows assembly, taken along line XVI-XVI of FIG. 11.

Referring to FIGS. 11 and 16, the first seal 162 may also be integrally formed with the bellows assembly 42. In such examples, the first seal 162 is defined by the upper portion 50 (e.g., proximate the 12 o'clock position 94) of the bellows assembly 42. A top edge 234 of the door 26 is typically configured to engage with the first seal 162 to form a watertight seal. In examples where the bellows assembly 42 defines the first seal 162, the bellows assembly 42 typically includes the sinusoidal-shaped folds 70 as discussed previously herein. Having the first and second seals 162, 166 integrally formed with the bellows assembly 42 is advantageous for reducing manufacturing and production costs.

Figure 17:
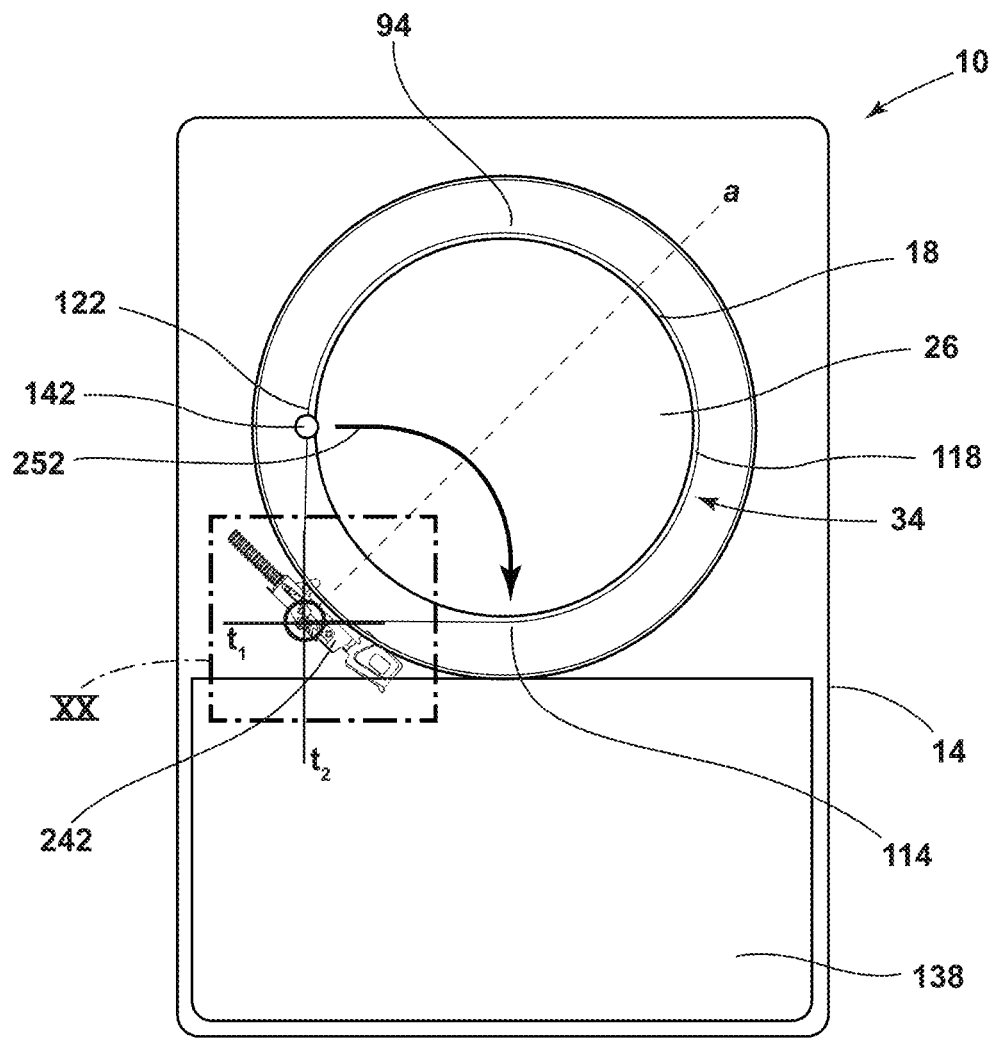
FIG. 17 is a schematic front view of a laundry appliance having a cabinet with a front panel removed and a door in a closed position, according to one example.
Figure 18:
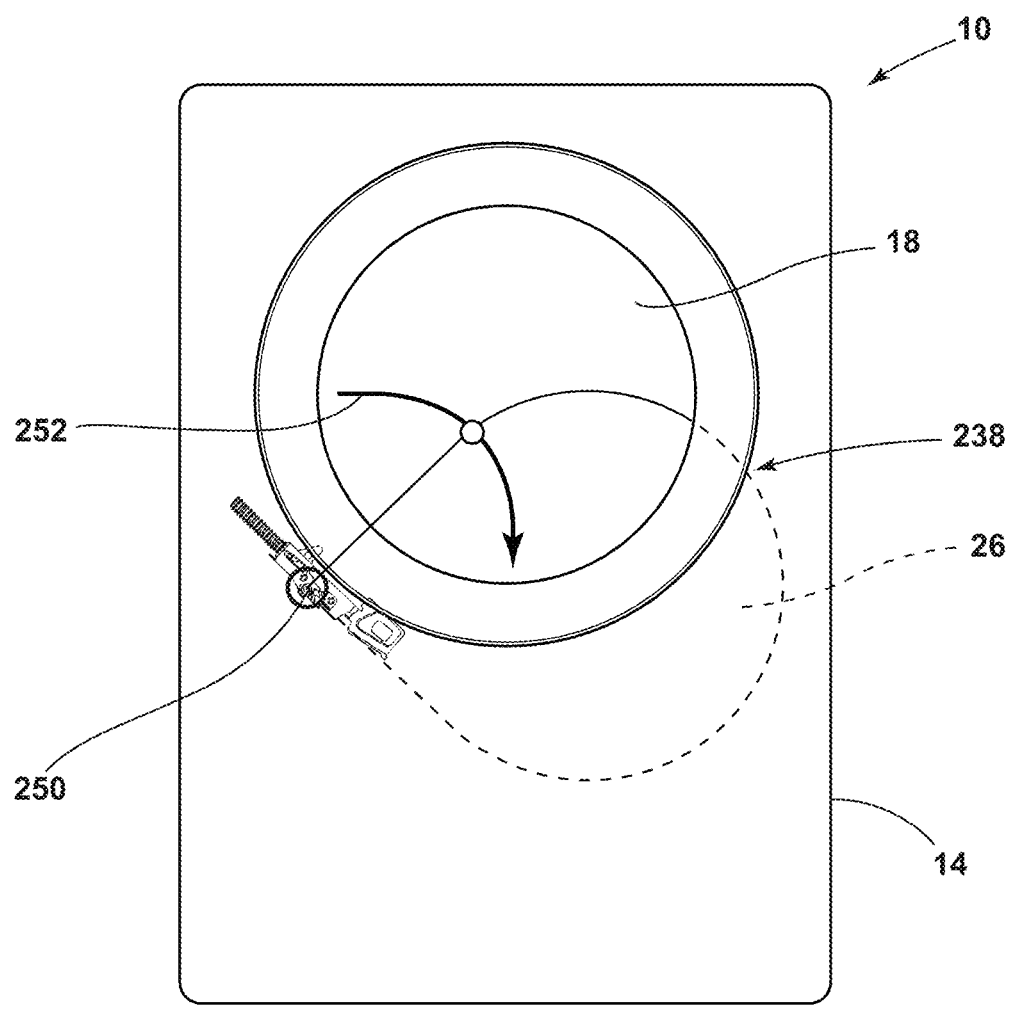
FIG. 18 is a schematic front view of the laundry appliance of FIG. 17 with the door in an intermediate position.
Figure 19:
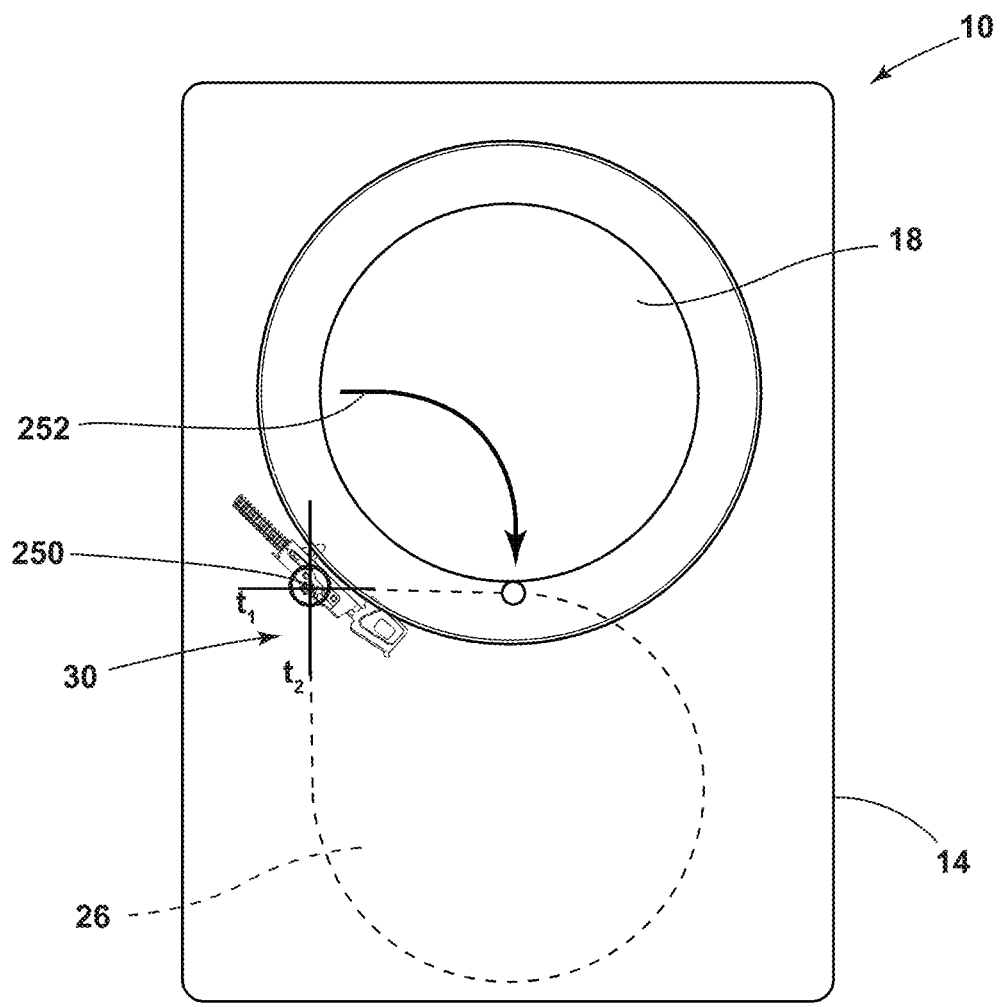
FIG. 19 is a schematic front view of the laundry appliance of FIG. 17 with the door in an opened position.
Figure 20:
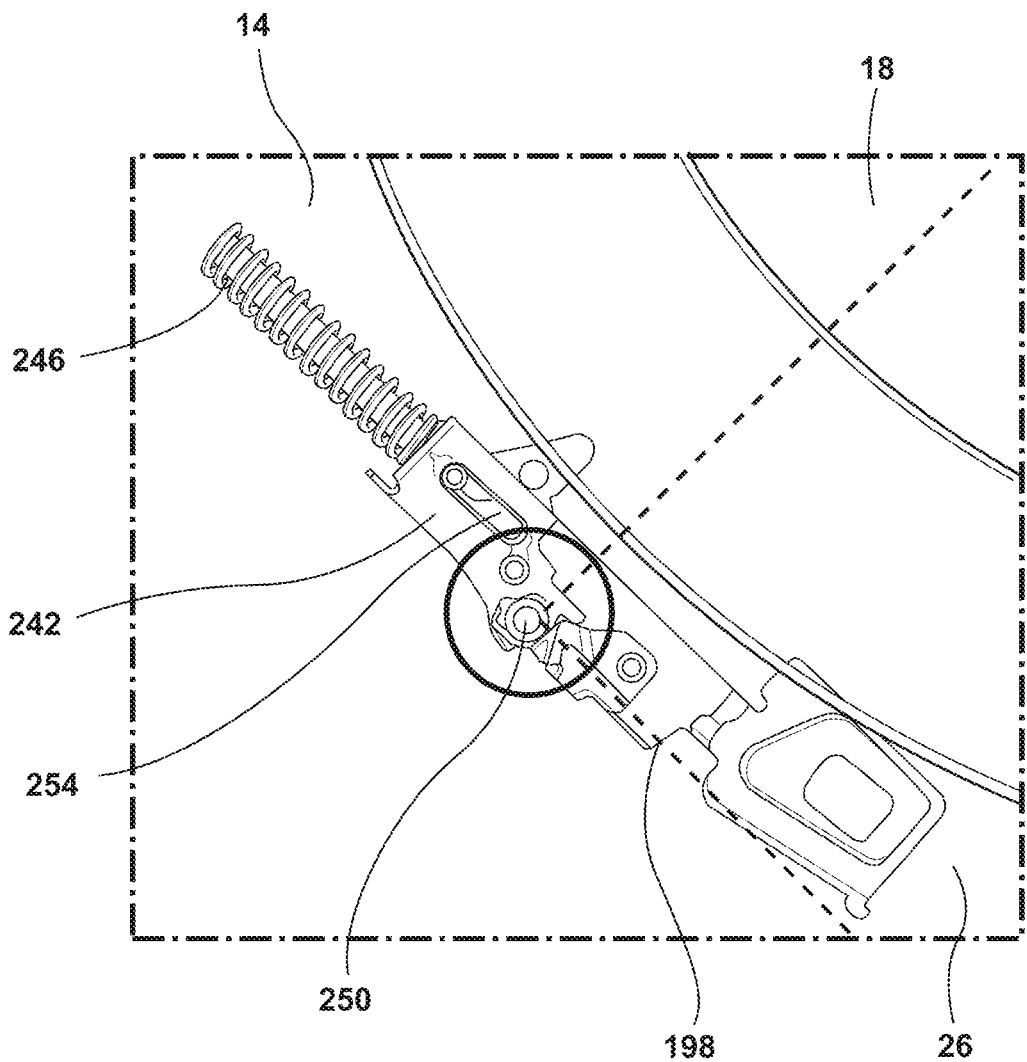
FIG. 20 is an enlarged view of a bracket with a pivot point for the door, taken at area XX of FIG. 17.

With reference to FIGS. 17-19, when configured as a sliding door 26, the door 26 may be operable between the opened and closed positions 30, 34 within the cabinet 14 of the laundry appliance 10. The door 26 can move vertically between the opened and closed positions 30, 34. In various examples, the door 26 can have a substantially circular, oblong, teardrop, or any similar other shapes that covers the front opening 18. Further, the door 26 has a shape that corresponds with a shape of the front opening 18 to cover and seal the front opening 18 when in the closed position 34.

As previously explained, the door 26 may be slidably engaged with the laundry appliance 10 to slide between and be retained in the closed position 34 (FIG. 17) and the opened position 30 (FIG. 19). The door 26 can also be retained in at least one intermediate position 238, as illustrated in FIG. 18, where the door 26 partially covers the front opening 18. The various intermediate positions 238 between the opened and closed positions 30, 34 are advantageous for venting the laundry appliance 10 when the laundry appliance 10 is not in use or when adding laundry mid-cycle.

Additionally or alternatively, the door 26 can be slidably and rotatably coupled with the laundry appliance 10 where the opened and closed positions 30, 34 are both within the cabinet 14 of the laundry appliance 10. As such, the door 26 is typically disposed within the chamber 138 proximate the front opening 18 or otherwise disposed within the cabinet 14 when in the opened position 30. Accordingly, the door 26 can be pivoted about an axis a to follow a circular or arced path 252 to move between the opened and closed positions 30, 34. The arced path 252 is typically oriented along a single vertical plane. The single vertical plane is typically substantially parallel.

Referring to FIGS. 17-20, in various examples, a bracket 242 is coupled to the outer edge 198 of the door 26. The bracket 242 is coupled to the cabinet 14 proximate the front opening 18. The bracket 242 is typically coupled to an inner surface of the cabinet 14 to be concealed from view. The bracket 242 can guide the rotation of the door 26. The bracket 242 typically includes a biasing member 246, which can bias the door 26 in a selected position (e.g., the opened, closed, or intermediate positions 30, 34, 238). Further, the biasing member 246 and the bracket 242 can provide a counter-balancing assembly to assist manual and/or powered movement of the door 26.

According to various aspects, the bracket 242 can include a locking member 254. The locking member 254 is typically configured to retain the door 26 in the opened, closed, and one or more of the intermediate positions 30, 34, 238. Further, the bracket 242 includes a pivot point 250 disposed thereon. The door 26 generally rotates about the pivot point 250 to move between the opened and closed positions 30, 34. Accordingly, the door 26 can be a sliding and rotating door 26.

Referring still to FIGS. 17-20, the bracket 242 is typically disposed between the 6 o'clock position 114 and the 9 o'clock position 122. It is also contemplated that the bracket 242 can be disposed between the 9 o'clock position 122 and the 12 o'clock position 94, the 12 o'clock position 94 and the 3 o'clock position 118, or the 3 o'clock position 118 and the 9 o'clock position 122 without departing from the teachings herein. The positioning of the bracket 242 can differ based on the selected arced path 252, the configuration of the laundry appliance 10, and/or the configuration of the door 26. The positioning of the bracket 242 provides a rotation axis a for the door 26 to fully cover the front opening 18 when in the closed position 34 and not cover the front opening 18 (e.g., be disposed at least partially within the cabinet 14) when in the opened position 30. In non-limiting examples, the door 26 may be entirely removed from the front opening 18 when in the opened position 30.

Figure 21:
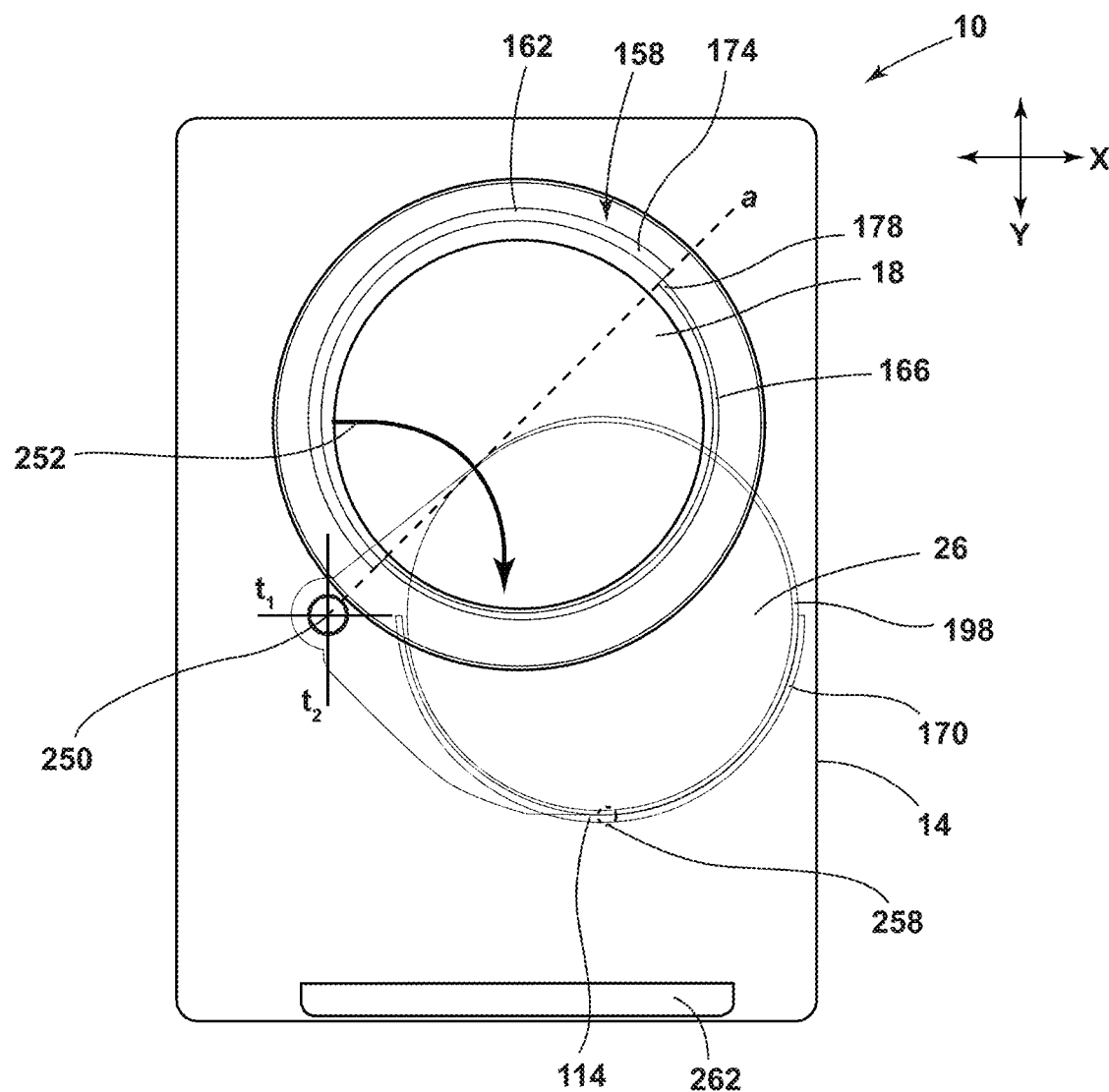
FIG. 21 is a schematic front view of the laundry appliance of FIG. 18 showing a sealing assembly.

Referring to FIGS. 17, 19, and 21, the pivot point 250 and axis a of rotation is typically defined by two intersecting perpendicular lines that are aligned with and/or defined by two tangent lines $t_1$, $t_2$ of the arced path 252 of the door 26 when the door 26 is in the opened and closed positions 30, 34, respectively. Stated differently, a first tangent line $t_1$ is tangent to the arced path 252 when the door 26 is pivoted about the axis a to the opened position 30. The tangent line $t_1$ is tangent to the outer edge 198 of the door 26 when the door 26 is in the raised position.

A second tangent line $t_2$ is tangent to the arced path 252 when the door 26 is pivoted about the axis a to the closed position 34. The tangent line $t_2$ is tangent to the outer edge 198 of the door 26 at the same point when the door 26 is in the lowered position. Each of the tangent lines $t_1$, $t_2$ can form an angle of approximately 45° with the axis a and an angle of approximately 90° with the other tangent line $t_1$, $t_2$. Further, the tangent lines $t_1$, $t_2$ generally extend along an x-axis and a y-axis relative to the front panel 58 of the cabinet 14 of the laundry appliance 10. The substantially perpendicular tangent lines $t_1$, $t_2$ defining the arced path 252 is advantageous for clearing the front opening 18 of the door 26 when the door 26 is in the opened position 30. Further, the perpendicular tangent lines $t_1$, $t_2$ defining the arced path 252 is also advantageous for minimizing the space needed for the chamber 138 defined by the cabinet 14 to house the door 26 when the door 26 is in the opened position 30.

In various examples, the handle 142 of the door 26 can be disposed proximate the outer edge 198 of the door 26. Additionally, the handle 142 is typically disposed in a position such that the handle 142 is accessible to the user when the door 26 is disposed in the chamber 138 in the closed position 34. Accordingly, as illustrated in FIG. 17, the handle 142 can be disposed proximate the 9 o'clock position 122 when the door 26 is in the closed position 34. Having the handle 142 in this position provides access to the handle 142 when the door 26 is in the opened position 30 and the closed position 34.

Referring to FIGS. 17, 19, and 21, the laundry appliance 10 including the slidable and rotatable door 26 can also include the sealing assembly 158 for creating a watertight seal about the front opening 18. In various examples, the sealing assembly 158 aligns with the axis a. In such examples, the first seal 162 is typically disposed on a first side of the axis a and the second seal 166 is typically disposed on a second opposing side of the axis a. Accordingly, the first and second seals 162, 166 are substantially mirror images of one another across the axis a. The gasket 170 can be configured to align and mate with the second seal 166. As such, the gasket 170 is typically disposed on the second side of the axis a when the door 26 is in the closed position 34 and configured to align with the second seal 166. Further, a portion of the door 26 may not include the gasket 170, and therefore the outer edge 198 of the door 26 can engage with the first seal 162 when the door 26 is in the closed position 34, as previously explained herein. Additionally, the first and second seals 162, 166 and the gasket 170 cooperate in a similar manner as discussed previously herein to provide a watertight seal for the laundry appliance 10.

Figure 22:
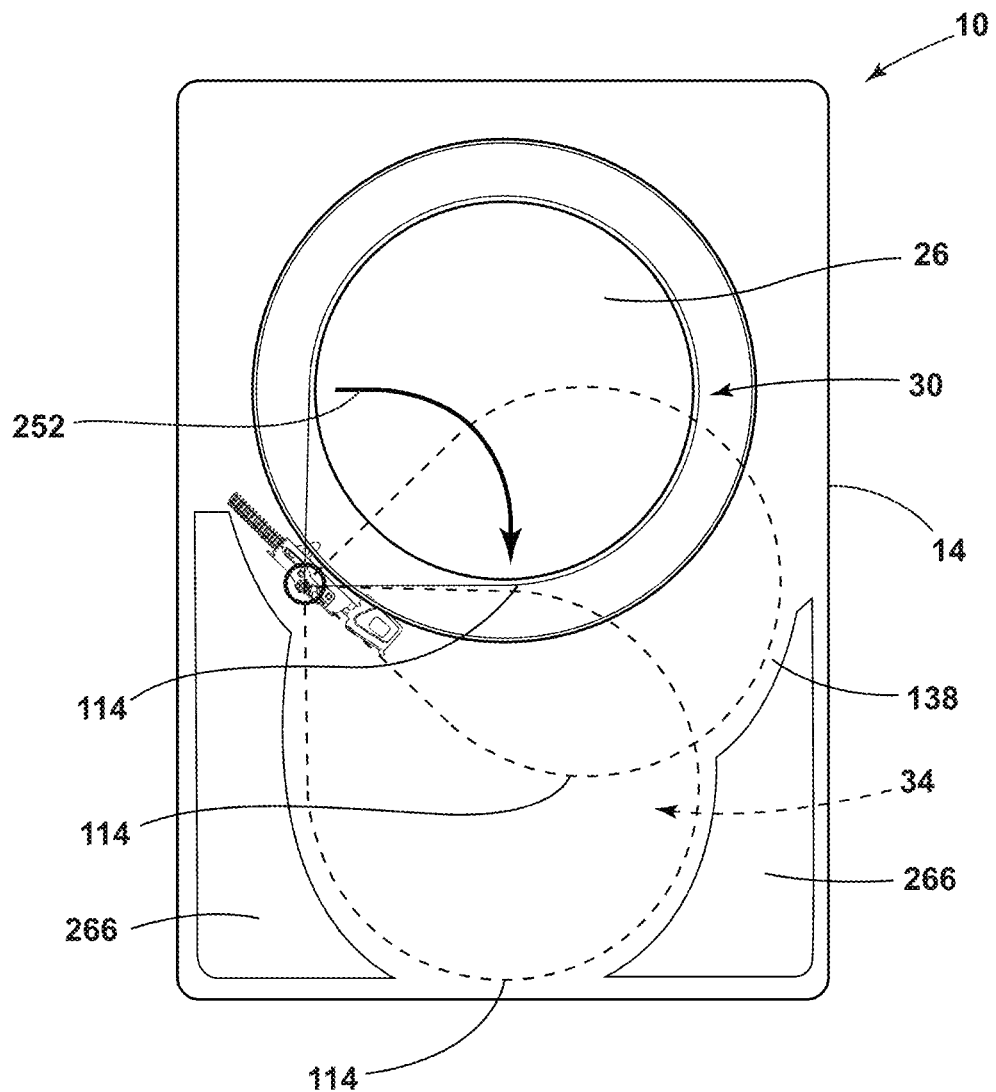
FIG. 22 is a schematic front view of the laundry appliance of FIG. 17 showing a path of movement of the door between the opened and closed positions.

Referring to FIGS. 21 and 22, when in the opened position 30, the door 26 is typically at least partially concealed by the cabinet 14 of the laundry appliance 10. The cabinet 14 often defines the chamber 138 for housing the door 26. Alternatively, the laundry appliance 10 may not include the chamber 138, and the door 26 can be disposed within the cabinet 14 when in the opened position 30. In various examples, the chamber 138 aligns with the arced path 252. Accordingly, storage areas 266 can be disposed within the cabinet 14 adjacent to the arced path 252. The storage areas 266 can house other machinery and/or mechanics of the laundry appliance 10. The size and/or shape of the storage areas 266 may be determined by the arced path 252. As illustrated in FIG. 21, one storage area 266 is disposed on each side of the arced path 252. However, it is contemplated that there can be a single storage area 266 disposed on a single side of the arced path 252, no storage areas 266, or any other practicable configuration.

Additionally or alternatively, the laundry appliance 10 can include a drip container 262 disposed within the chamber 138 or otherwise disposed below the door 26 and/or the arced path 252 of the door 26 within the cabinet 14. The geometry of the door 26 typically provides a liquid management feature for residual liquid. The door 26 includes a low point 258 where a liquid is directed from the door 26 into the drip container 262. The position of the low point 258 of the door 26 differs based on the position of the door 26. However, in relation to the front opening 18, the low point 258 may remain at approximately the 6 o'clock position 114. As the door 26 pivots, the position on the door 26 that corresponds with the 6 o'clock position 114 changes, resulting in the change of the low point 258 relative to the door 26.

Figure 23:
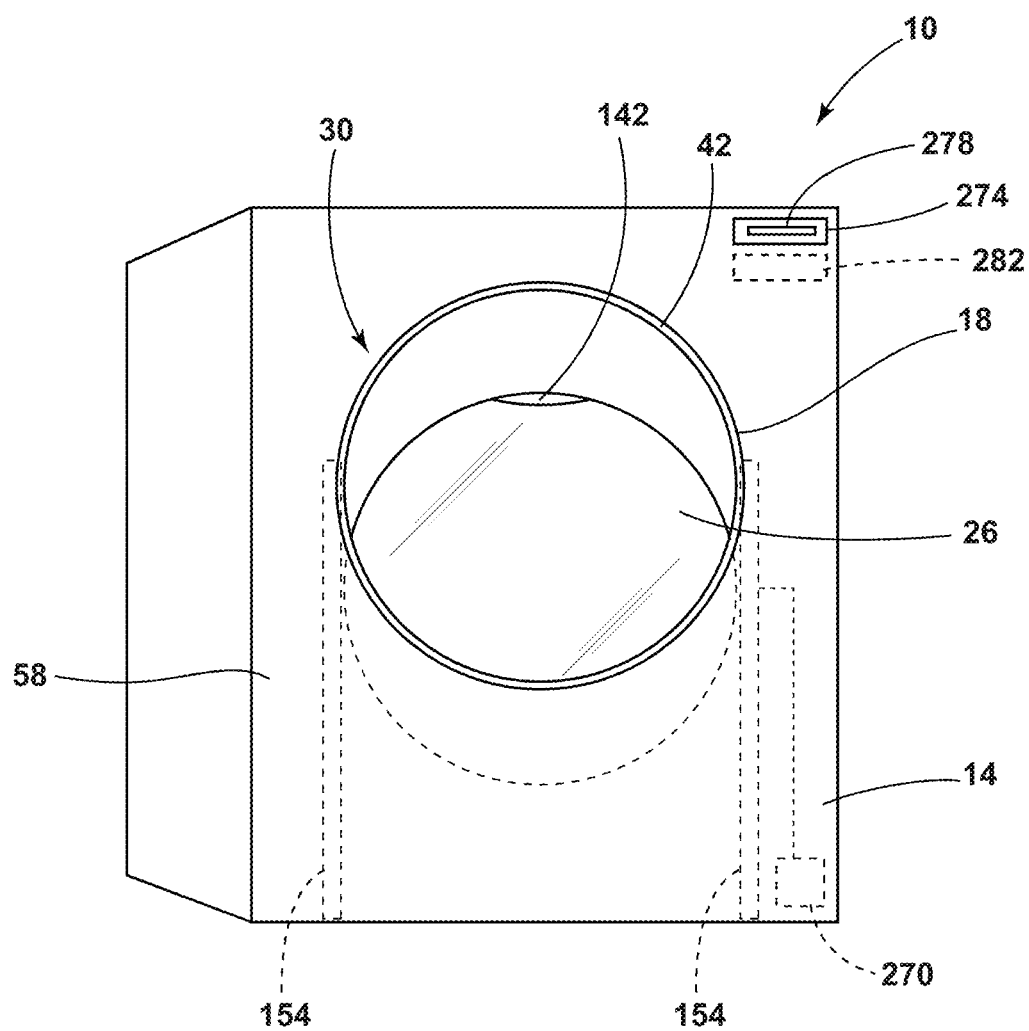
FIG. 23 is a front perspective view of the laundry appliance with a motorized sliding door, according to one example.
Figure 24:
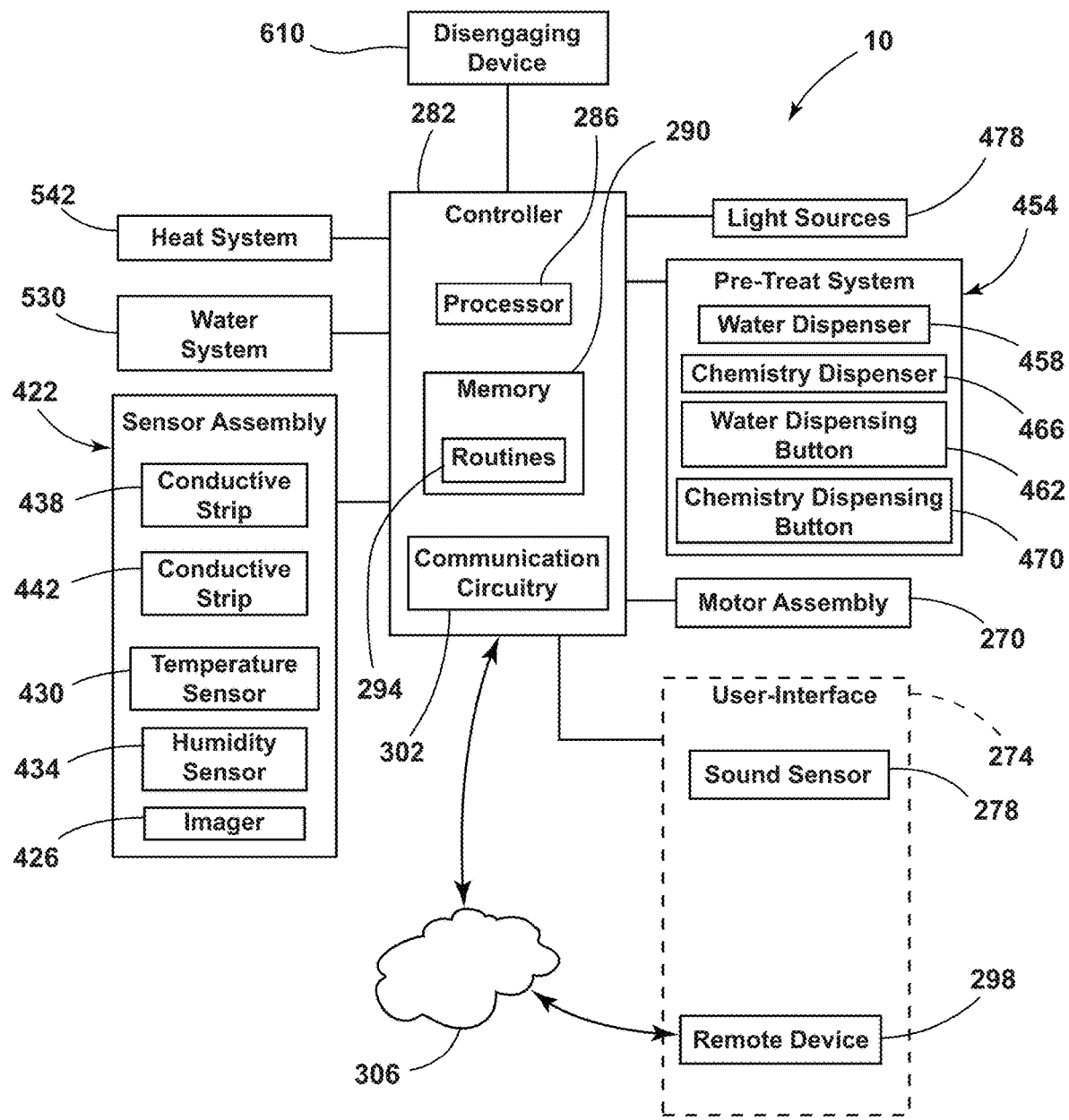
FIG. 24 is a box diagram of a laundry appliance, according to one example.

Referring to FIGS. 23 and 24, the laundry appliance 10 includes the door 26 configured as a sliding, flat panel door. As illustrated in FIG. 23, the door 26 is configured to translate vertically within the cabinet 14. The door 26 can be a motorized door. The laundry appliance 10 includes a motor assembly 270 in communication with the door 26. The motor assembly 270, when activated, translates the door 26 between the opened and closed positions 30, 34. The door 26 may move along the rails 154. The door 26 can include sliders, gears, pins, or other features configured to interact with the rails 154 to move the door 26.

The laundry appliance 10 typically includes a user-interface 274. The user-interface 274 may be coupled to the cabinet 14, be coupled to the door 26, be separate from the laundry appliance 10, or a combination thereof. The user-interface 274 is configured to receive a user command, which can relate to various aspects of the laundry assembly 10, including operation of the door 26. According to various aspects, the user-interface 274 includes a sound sensor 278 configured to receive a voice command. The sound sensor 278 may include one or more microphones or other audio sensors configured to receive a voice command and communicate the voice command to a controller 282.

Referring still to FIGS. 23 and 24, the controller 282 may be an overall controller configured to operate the laundry appliance 10, or alternatively, may be a designated controller relating to the operation of specific aspects of the laundry appliance 10 (e.g., the door 26). The controller 282 includes a processor 286, a memory 290, and other control circuitry. Instructions or routines 294 are stored within the memory 290 and executable by the processor 286. The controller 282 includes one or more routines 294 relating to the operation of the door 26. The controller 282 may also be used to operate other components of the laundry appliance 10 that are located proximate the door 26, such as the deflector 74 and operable components coupled thereto, as will be described more fully below.

In operation, the sound sensor 278 receives a voice command from a user. The sound sensor 278 communicates the voice command to the controller 282, which includes one or more routines 294 for processing the voice command. After processing the voice command, the controller 282 can send a signal to the motor assembly 270 to activate the motor assembly 270. The motor assembly 270 moves the door 26 to the selected position. Accordingly, the controller 282 includes one or more routines 294 related to positioning the door 26 in the selected position, including the opened position 30, the closed position 34, and any intermediate position 238 therebetween.

The voice command, as received by the sound sensor 278, can control the operation of the door 26. Additionally or alternatively, the voice command can control various operations of the laundry appliance 10. For example, the user can select a laundry cycle via voice command. The laundry cycle can relate to washing laundry, drying laundry, and more discrete laundry cycles (e.g., bleach, refresh, steam, soak, etc.), or selecting a specific type of laundry (e.g., colors, delicates, etc.). Further, the voice command can relate to starting the selected laundry cycle.

Referring again to FIG. 24, the user-interface 274 may include or can incorporate a remote device 298. The remote device 298 is configured to receive the user input relating to the operation of the door 26 and/or other aspects of the laundry appliance 10. In various examples, the remote device 298 may be a centralized voice receiving system in communication with the controller 282 of the laundry appliance 10. Accordingly, the remote device 298 can include the sound sensor 278. The remote device 298 provides an interface for communicating with the laundry appliance 10, as well as other appliances in communication with the remote device 298. The remote device 298 can be a portable device, such as a phone, a tablet, a computer, a virtual assistant device, or any other device configured to receive a user input.

The controller 282 includes communication circuitry 302 configured to communicate with the remote device 298. The controller 282 communicates with the remote device 298 and/or remote servers (e.g., cloud servers, Internet-connected databases, computers, etc.) via a communication interface 306. The communication interface 306 may be a network having one or more various wired or wireless communication mechanisms, including any combination of wired (e.g., cable and fiber) or wireless communications and any network topology or topologies.

Exemplary communication networks include wireless communications networks, such as, for example, a Bluetooth® transceiver, a ZigBee® transceiver, a Wi-Fi transceiver, and IrDA transceiver, an RFID transceiver, etc. The controller 282 and the remote device 298 typically include circuitry configured for bidirectional wireless communication. Additional exemplary communication networks include local area networks (LAN) and/or wide area networks (WAN), including the Internet and other data communication services. It is contemplated that the controller 282 and the remote device 298 can communicate by any suitable technology for exchanging data. Additionally, in examples using Bluetooth® transceivers, the remote device 298 can be linked or synchronized (e.g., synced) with one or more laundry appliances 10 and/or other appliances to create a centralized home system.

Figure 25A:
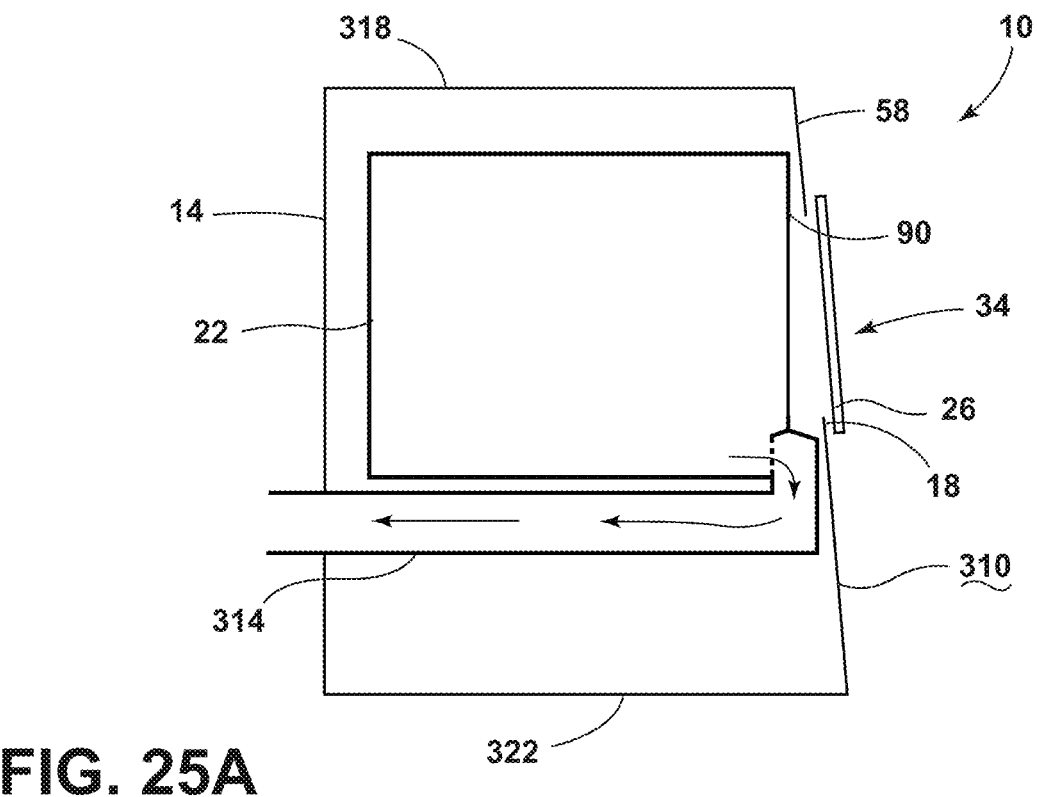
FIG. 25A is a schematic cross-sectional view of a laundry appliance with an angled front panel, according to one example.
Figure 25B:
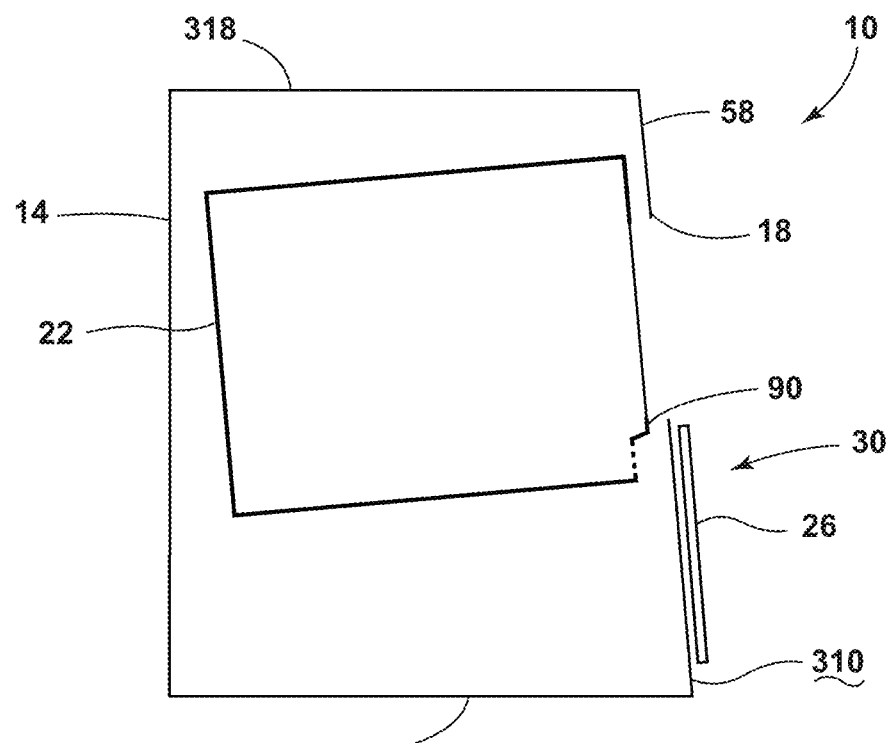
FIG. 25B is a schematic cross-sectional view of a laundry appliance with an angled front panel, according to one example.

Referring to FIGS. 25A and 25B, which exemplify different laundry appliance 10 configurations, the door 26 may be configured to slide along a front surface 310 of the front panel 58. When in the closed position 34, as illustrated in FIG. 25A, the door 26 is disposed over the front opening 18. In the opened position 30, as illustrated in FIG. 25B, the door 26 is disposed over the front surface 310 of the front panel 58 below the front opening 18.

The laundry appliance 10 illustrated in FIG. 25A is a dryer or a washer/dryer combination. The laundry appliance 10 includes a duct 314 to carry moist air from the drum 22. The duct 314 protrudes forwardly of the drum 22, taking additional space within the cabinet 14. The shape of the cabinet 14 may accommodate the duct 314. The front panel 58 can be disposed at an angle with respect to the drum 22. In this configuration, the angle between the drum 22 and the front panel 58 provides space for the duct 314 while minimizing a distance between the front panel 58 and the access aperture 90 of the drum 22 toward a top 318 of the laundry appliance 10. Accordingly, the laundry appliance 10 can have a depth at the top 318 of the cabinet 14 that is less than a depth of a bottom 322 of the cabinet 14. The angled front panel 58 minimizes the distance between the front panel 18 and the access aperture 90 of the drum 22 to provide more direct access to the interior of the drum 22 for the user.

The laundry appliance 10 illustrated in FIG. 25B is a washer with the drum 22 disposed at an angle within the cabinet 14. The angle of the front panel 58 may be substantially perpendicular to a rotational axis of the drum 22. The angled front panel 58 may minimize the distance a user reaches into the drum 22 by minimizing the distance between the front panel 58 and the access aperture 90. The angled front panel 58 illustrated in FIGS. 25A and 25B can provide more direct access to the drum 22. A top of the drum 22 and the top 318 of the cabinet 14 may be less of a barrier for the user reaching into the interior of the drum 22 with the front panel 58 disposed at the angled position.

Figure 26:
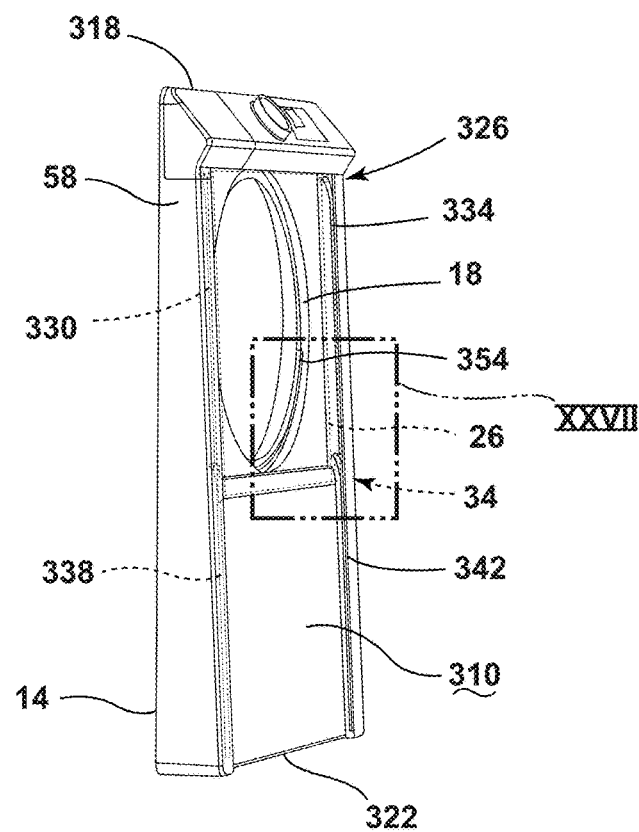
FIG. 26 is a side perspective view of the angled front panel of FIG. 25A.
Figure 27:
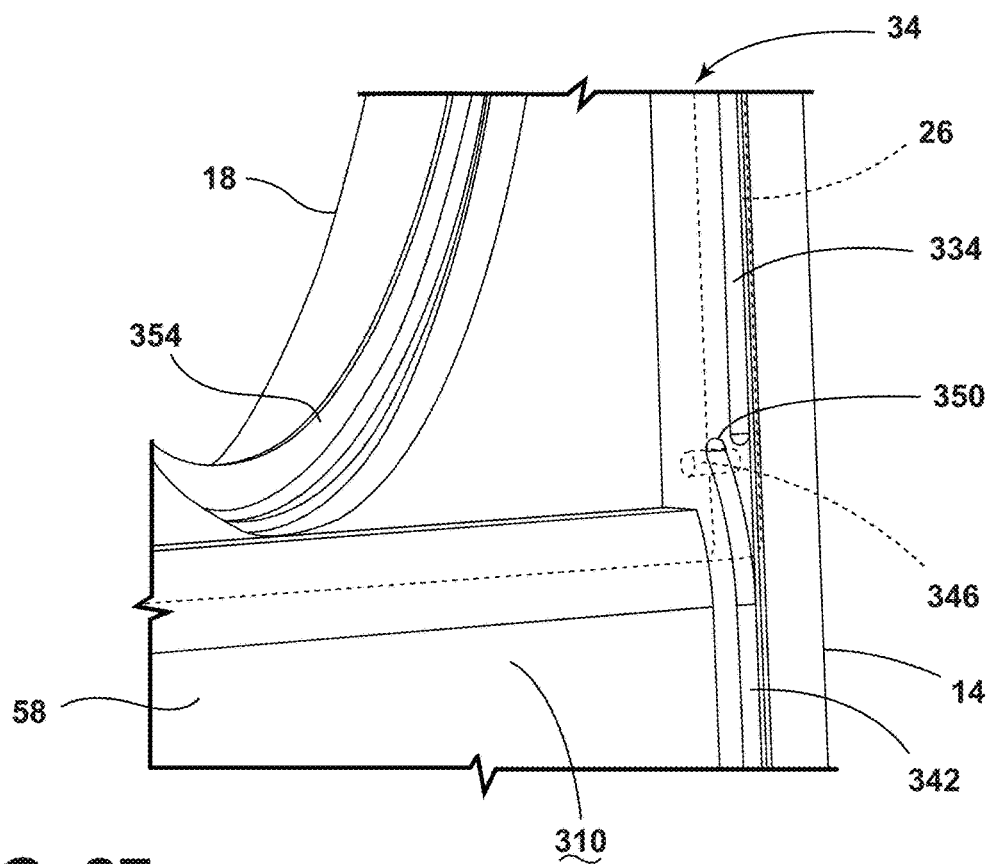
FIG. 27 is a partial enlarged view of the front panel of FIG. 26, taken at area XXVI and illustrating a track assembly.

Referring to FIGS. 23, 26 and 27, the front panel 58 may define a track assembly 326 for guiding the door 26 between the opened and closed positions 30, 34. The track assembly 326 typically includes upper track portions 330, 334 disposed on each side of the front opening 18, as well as lower track portions 338, 342. The lower track portion 338 is vertically aligned with the upper track portion 330 disposed proximate a first edge of the front panel 58, and the lower track portion 342 is vertically aligned with the upper track portion 334 proximate a second opposing edge of the front panel 58. The track assembly 326 extends from proximate the top 318 of the cabinet 14 to proximate the bottom 322 of the cabinet 14. This configuration allows the door 26 to fully cover the front opening 18 when the door 26 is in the closed position 34 and fully clear the front opening 18 when the door 26 is in the opened position 30.

The door 26 is configured to translate along the track assembly 326 on the front surface 310 of the front panel 58. The door 26 typically includes guide features 346 configured to engage the track assembly 326. In the illustrated example, the door 26 includes four guide features 346, with one guide feature 346 engaging each of the upper track portions 330, 334 and the lower track portions 338, 342, respectively. Each guide features 346 may be configured as a pin, a boss, or a similar feature defined within or extending from the door 26 to cooperatively engage the track assembly 326.

As best illustrated in FIG. 27, the lower track 342 includes a curved upper end 350. The curved upper end 350 curves inward toward the drum 22, bending to the inside of the upper track portion 334. It is contemplated that the lower track portion 338 and each of the upper track portions 330, 334 may have similar curved upper ends 350. The curved upper ends 350 guide the door 26 in a translating motion toward the front opening 18 as the door 26 is guided into the closed position 34. In this manner, the track assembly 326 guides the door 26 in a generally lateral and translating motion to move the door 26 toward the front panel 58 to provide a sealing engagement with the front panel 58. The cabinet 14 typically includes a sealing gasket 354 extending around the front opening 18. The sealing gasket 354 extends from the cabinet 14 into the space defined by the front opening 18. The curved upper ends 350 guide the door 26 toward and into contact with the sealing gasket 354. In the closed position 34, this engagement biases the door 26 against the front panel 58 and the sealing gasket 345 to define a watertight seal between the door 26 and the cabinet 14. Conversely, when the door 26 is moved away from the closed position 34, the curved upper ends 350 guide the door 26 in a lateral translation and away from the sealing gasket 354. This motion separates the sealing engagement and allows the door 26 to operate freely relative to the sealing gasket 254 and in a generally vertical direction. Once separated from the sealing gasket 234, the door 26 then can move vertically along the front surface 310 of the front panel 58 as the door 26 is guided to the opened position 30. Where each of the upper track portions 330, 334 and lower track portions 338, 342 include the curved upper ends 350, it is contemplated that the door 26 remains in a parallel configuration with respect to the front panel 58 and the front opening 18. It is also contemplated that the curved upper ends 350 can be sequenced to define a combined vertical motion and a rotation of the door 26 as it moves into and away from the closed position 34.

It is contemplated that the upper edge of the door 26 may be configured to disengage from the upper track portions 330, 334 when the door 26 is in the closed position 34 to rotate away from the cabinet 14, as will be described in more detail below. In such configurations, a release mechanism may be incorporated into one or both of the upper track portions 330, 334 of the track assembly 326. The release mechanism can disengage the upper end of the door 26 in response to a user input and/or automatically in response to a detected condition communicated to the controller 282.

As described herein, the laundry appliance 10 may include various different types of doors 26, including, a sliding door, a rotating door, a hinged door, and/or any combination thereof. Each type of door 26 disclosed herein may be manually operated by the user. Additionally or alternatively, each door 26 described herein may be in communication with the motor assembly 270, such that the door 26 is motorized and can operate automatically. The door 26 can operate in response to a voice command, a touch command, or any other type of input from the user.

Figure 28:
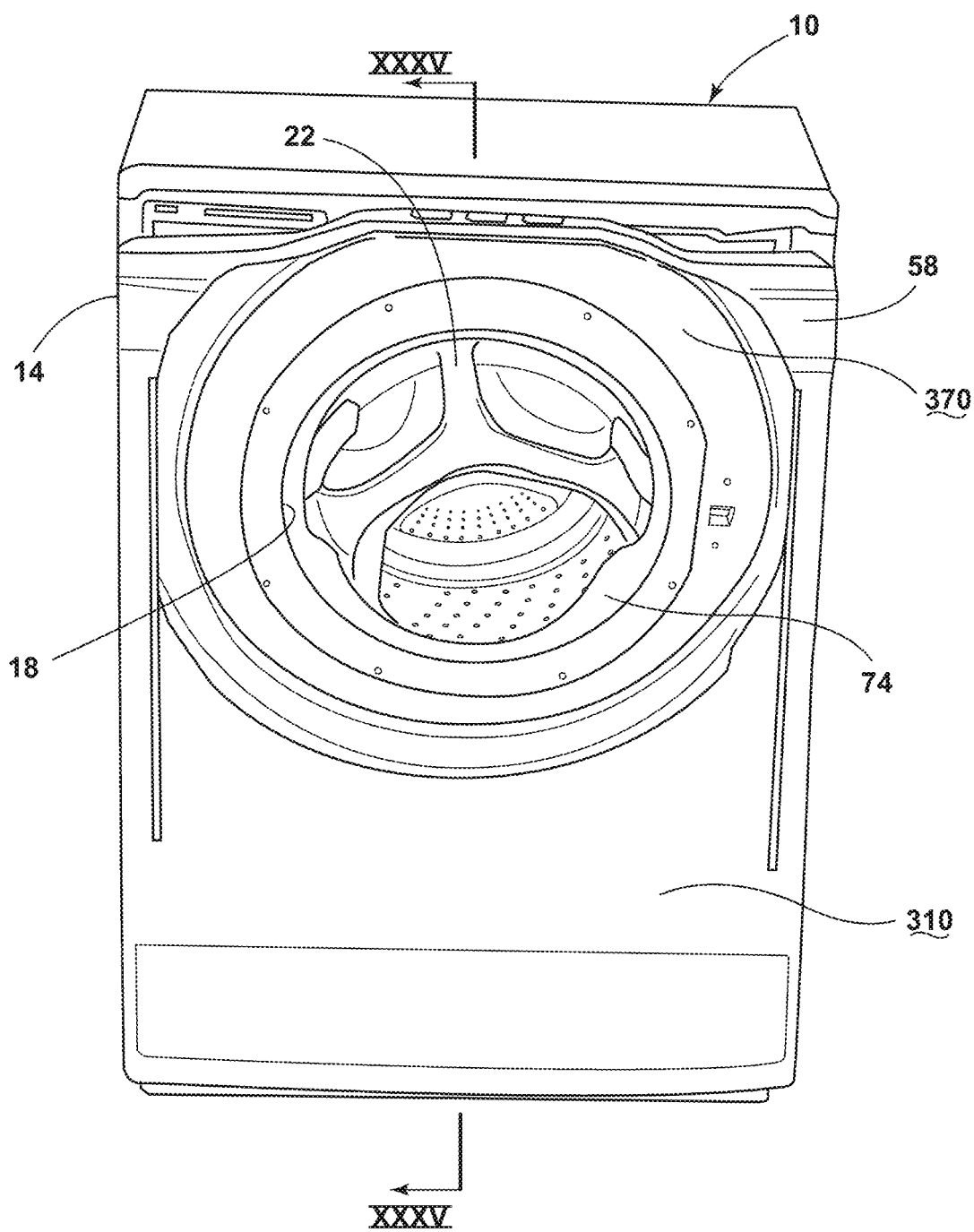
FIG. 28 is a front perspective view of a laundry appliance having a deflector with a portion of a door removed, according to one example.
Figure 29:
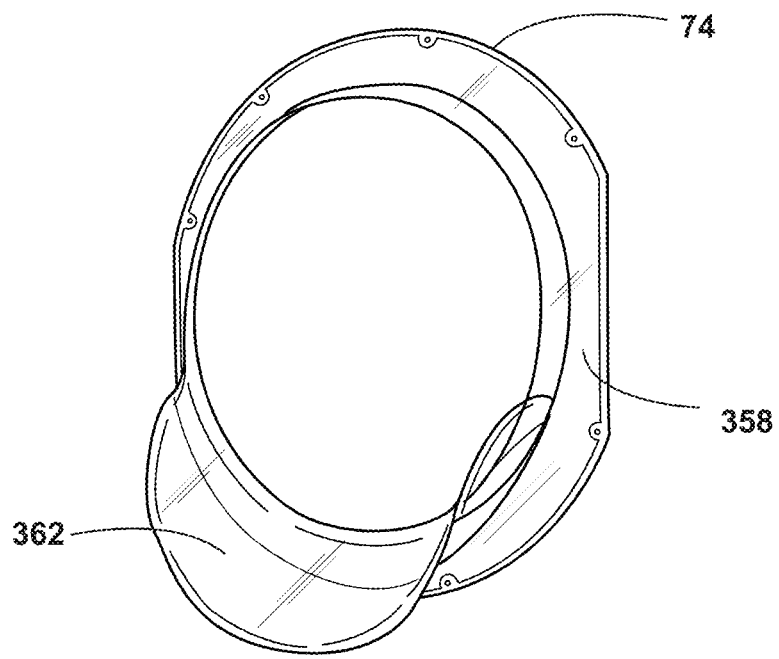
FIG. 29 is a side perspective view of a deflector for a laundry appliance, according to one example.
Figure 30:
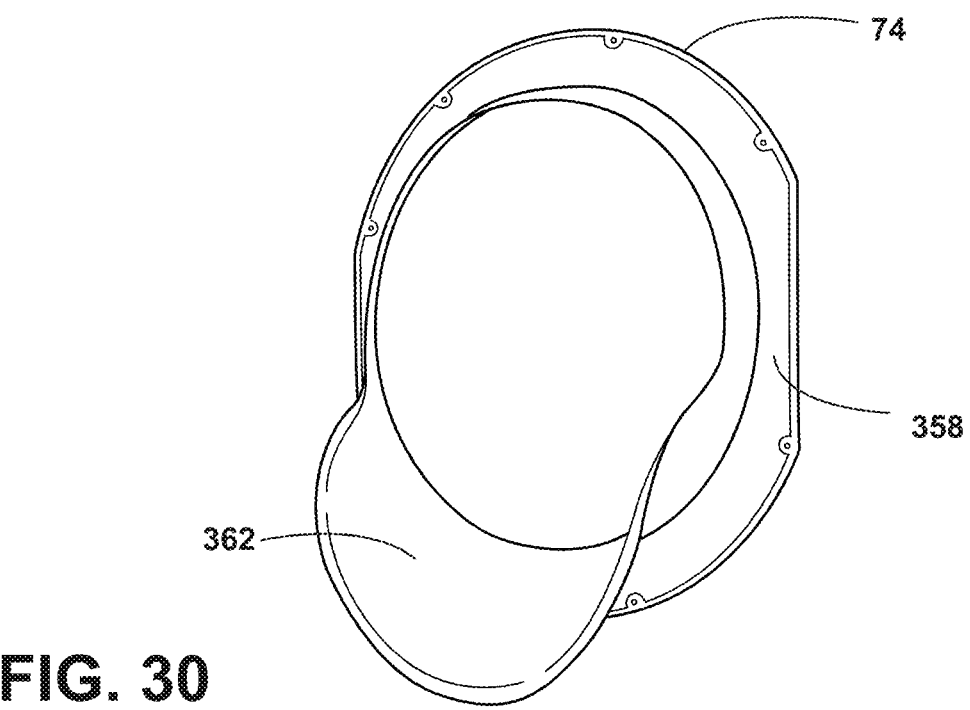
FIG. 30 is a side perspective view of a deflector for a laundry appliance, according to one example.

Referring to FIGS. 28-30, the laundry appliance 10 may include the deflector 74 to deflect laundry away from the bellows assembly 42. The deflector 74 includes a rim 358 and a chute 362. The deflector 74 is coupled to an interior surface 370 of the front panel 58. The rim 358 generally extends 360° around the front opening 18 of the cabinet 14. The rim 358 typically includes a portion abutting the front panel 58 and a portion extending therefrom to couple with the chute 362. Accordingly, the rim 358 may engage the front panel 58 and provide at least some deflection of laundry within the drum 22.

The chute 362 is coupled to the rim 358 and extends toward an interior of the drum 22. The chute 362 typically defines a curved or arcuate shape extending along a bottom portion of the rim 358. Accordingly, the deflector 74 extends around the perimeter of the front opening 18 with the chute 362 aligned with the bottom portion of the front opening 18. The chute 362 operates as a guide to facilitate loading and unloading laundry relative to the drum 22. Additionally or alternatively, the chute 362 is configured to deflect laundry away from the bellows assembly 42 during a laundry cycle.

The interface between the rim 358 and the chute 362 can have a variety of configurations. For example, as illustrated in FIG. 29, the interface between the chute 362 and the rim 358 defines a well-defined edge. As illustrated in FIG. 30, the chute 362 may have a smoother, more gradual interface to the rim 358. It is contemplated that the deflector 74 can be constructed of any practicable material such as, for example, plastic materials, metallic materials, combinations thereof, and/or other similarly rigid materials.

Figure 31:
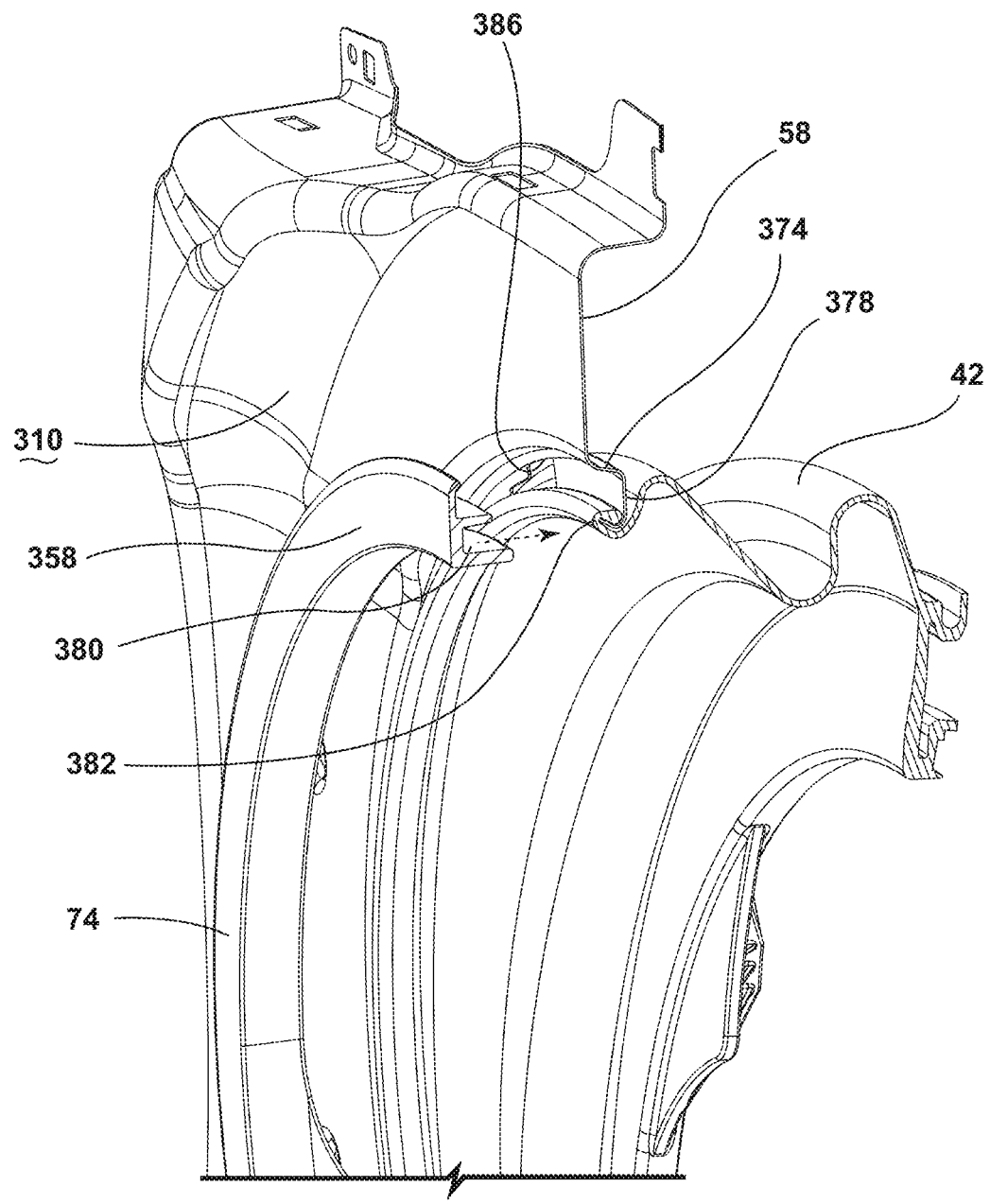
FIG. 31 is an enlarged partial cross-sectional view of an interface between a deflector and a bellows assembly of a laundry appliance, shown separated from one another, according to one example.
Figure 32:
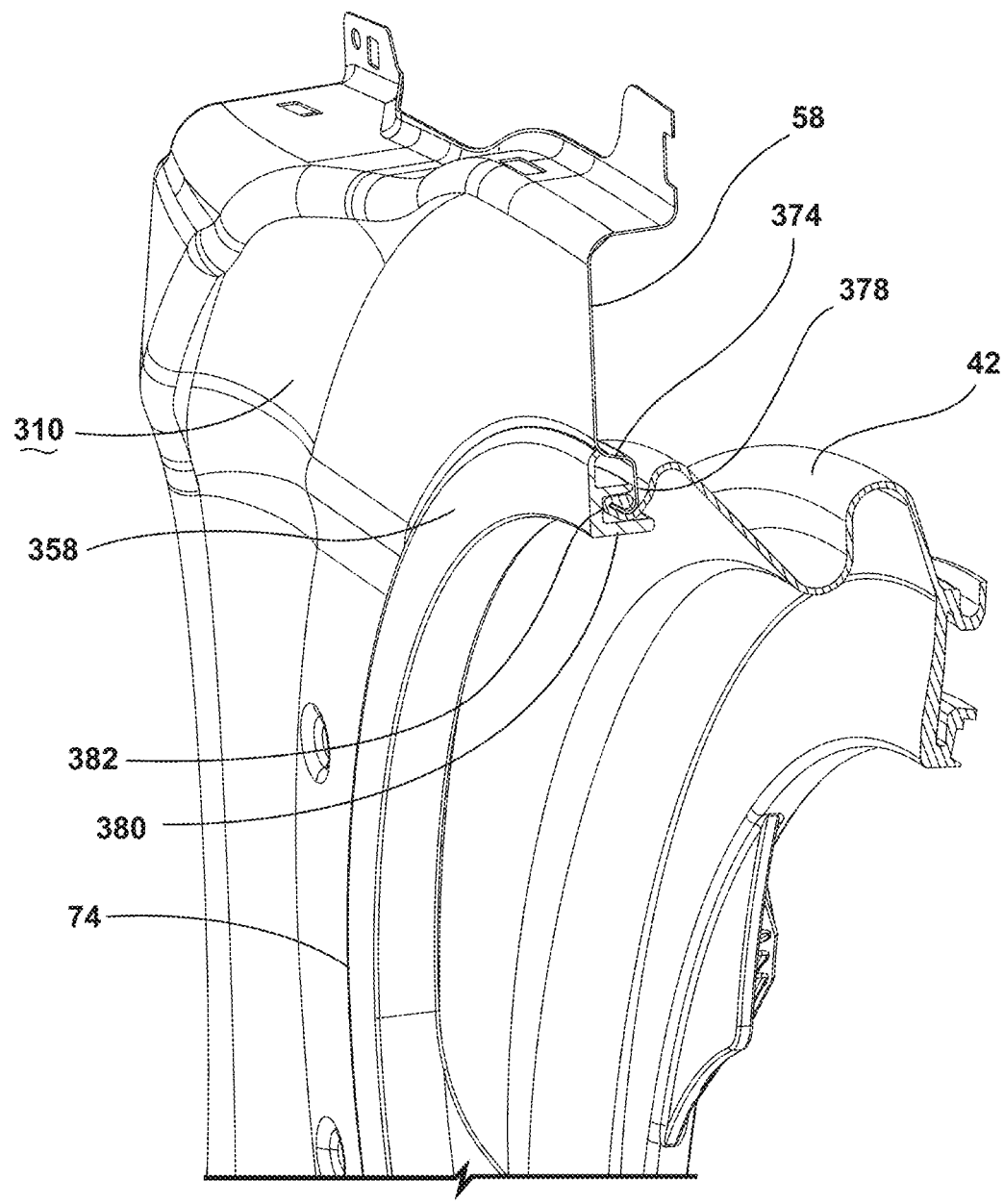
FIG. 32 an enlarged partial view of the interface between the deflector and the bellows assembly of FIG. 31, shown coupled together.

Referring to FIGS. 28, 31, and 32, the front opening 18 may be at least partially defined by a lip 374 having a curved edge 378. The lip 374 can have a variety of configurations. As illustrated, the lip 374 extends toward the bellows assembly 42 and then substantially parallel to the front surface 310 of the front panel. The lip 374 can be offset from the front surface 310 of the front panel 58 and oriented parallel to the front surface 310. In another non-limiting example, the lip 374 may extend substantially horizontally toward the drum 22 and oriented perpendicular to the front surface 310 of the front panel 58.

The curved edge 378 is typically offset from the front surface 310 of the front panel 58. The curved edge 378 extends 360° around the front opening 18. The curved edge 378 is coupled with the bellows assembly 42. The bellows assembly 42 defines a projection 382 configured to receive and extend around the curved edge 378 of the lip 374. The projection 382 is typically a single component extending 360° around the front opening 18 and over the curved edge 378. It is contemplated that the bellows assembly 42 may include a plurality of projections 382 spaced-apart along the bellows assembly 42. It is also contemplated that the curved edge 378 and the cooperating projection 382 may extend partially around the perimeter of the front opening 18.

The rim 358 of the deflector 74 is configured to snap-fit over the projection 382 to couple the deflector 74 with the bellows assembly 42. The rim 358 can define a connector 380 that is sized to friction snap over the projection 382 and retain the deflector 74 on the bellows assembly 42. As illustrated, the connector 380 includes two annular protrusions that extend around the rim 358 and extend on each side of the projection 382 of the bellows assembly 42. Other configurations of the connector 380 are contemplated without departing from the teachings herein. When disposed over the projection 382, the rim 358 extends over the curved edge 378 and the lip 374 to align with the front surface 310 of the front panel 58. Accordingly, the front surface 310 and the rim 358 form a continuous surface, having a minimal gap or seam. Additionally or alternatively, there may be a minimal gap or seam between the deflector 74 and the curved edge 378, which may be advantageous for reducing laundry materials from entering the space formed by the curved edge 378 of the lip 374.

Figure 33:
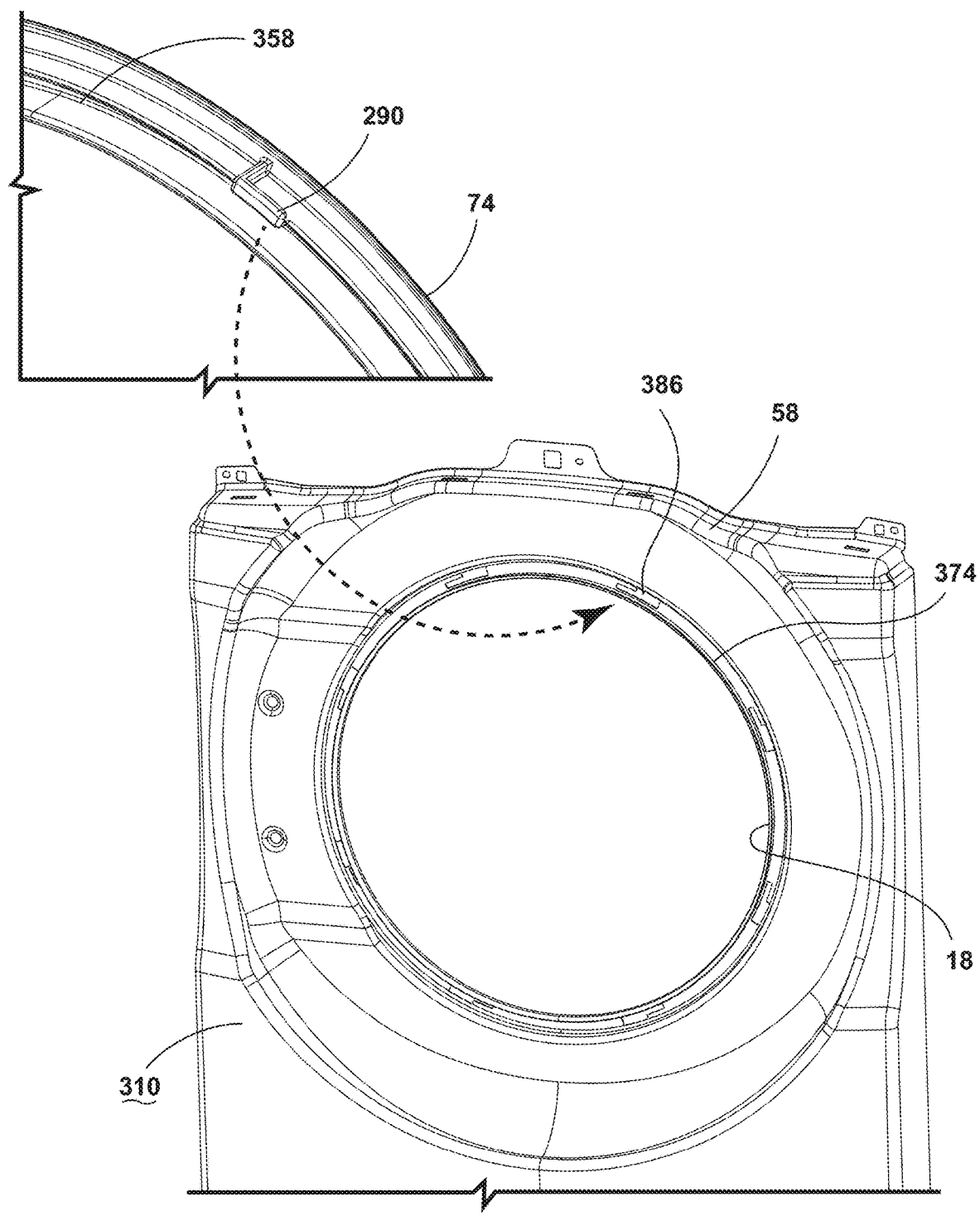
FIG. 33 is a detail schematic view of an interface between a deflector and a front panel of a laundry appliance, according to one example FIG. 34 an enlarged partial rear perspective view of the interface between the deflector and the front panel of FIG. 33.
Figure 34:
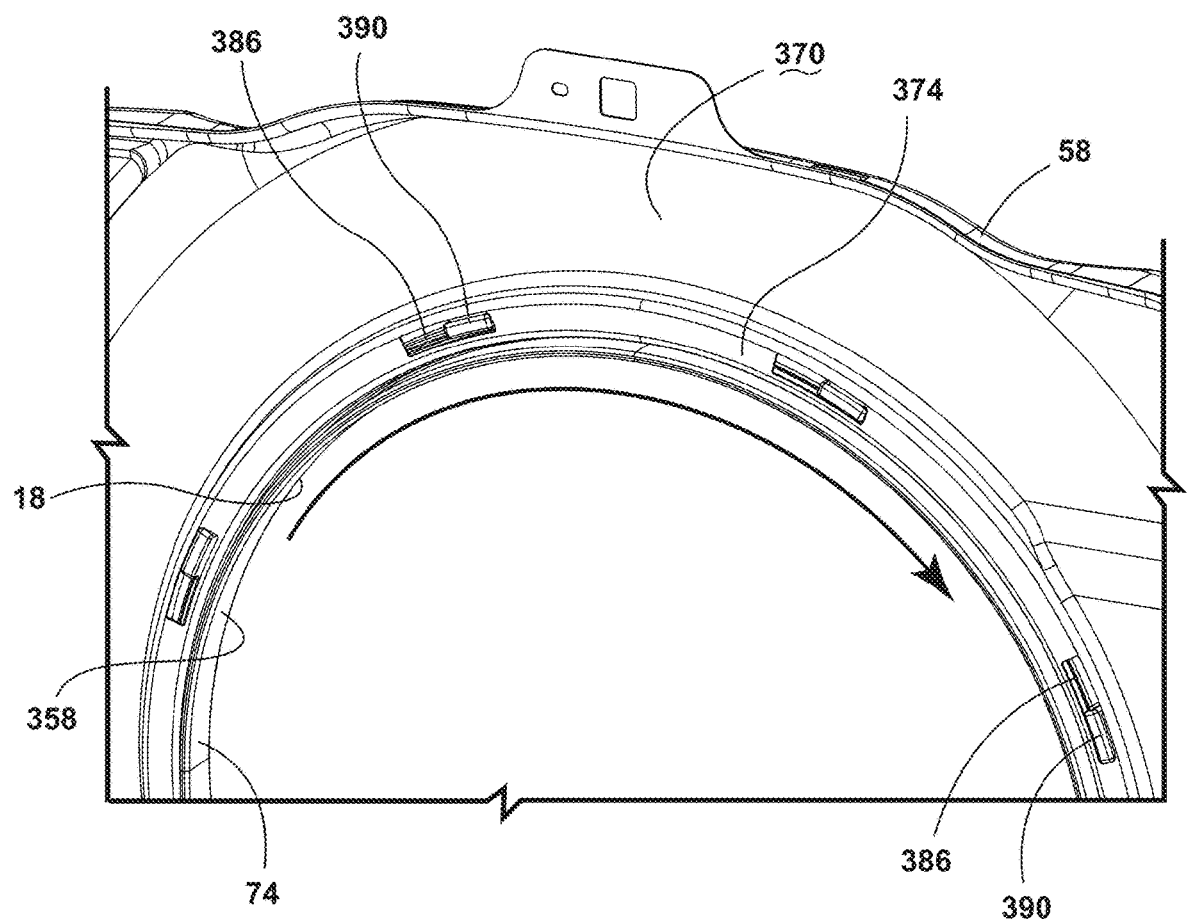

Referring to FIGS. 28, 33, and 34, the lip 374 defines a plurality of apertures 386 arranged around the front opening 18. The apertures 386 are typically spaced-apart from one another at substantially equidistant intervals. The deflector 74 includes a plurality of hooks 390 extending from the rim 358 and configured to engage the apertures 386. In certain aspects, the hooks 390 can be incorporated into the connector 380 of the deflector 74. The number of hooks 390 generally corresponds with the number of apertures 386. The hooks 390 are configured to extend through the apertures 386 and engage a surface of the lip 374 adjacent to the interior surface 370 of the front panel 58 upon rotation of the deflector 74 to interlock the deflector 74 to the cabinet 14.

Referring to FIGS. 28-34, to assemble the deflector 74 with the laundry appliance 10, the deflector 74 engages the front surface 310 of the front panel 58 and extends through the front opening 18. The rim 358 of the deflector 74 is snap-fit over the projection 382 of the bellows assembly 42. As the deflector 74 is moved over the projection 382, the hooks 390 are moved through the apertures 386 defined in the lip 374 of the front panel 58. The deflector 74 is then rotated, such that the hooks 390 interlock with the lip 374. The rim 358 is configured to slidably engage the projection 382 as the deflector 74 is rotated. The deflector 74 is rotated until the hooks 390 engage the lip 374 at an end of each aperture 386 with a portion of each hook 390 extending along the surface of the lip 374. It is contemplated that the cabinet 14 and/or the deflector 74 may include a locking feature, such as, for example, detents, interlocks, a lock screw or pin, or other fasteners to secure the deflector 74 into the final position. A locking feature may minimize accidental rotation and/or subsequent detachment of the deflector 74 from the cabinet 14. The deflector 74 can serve to hold the deflector 74 and the bellows assembly 74 in place via coupling to the front panel 58. It is also contemplated that the bellows assembly 42 can be coupled to the front panel 58 and be secured with a clamp and the deflector 74 can be coupled to the front panel 58 over the bellows assembly 78.

The projection 382 and the hooks 390 can allow for selective coupling of the deflector 74 to the laundry appliance 10 by the user. The selective engagement of the deflector 74 with the bellows assembly 42 and the cabinet 14 can enhance service or cleaning of the deflector 74 and/or the bellows assembly 42. This configuration of the deflector 74 may also increase the diameter of the front opening 18 that is not impinged by components of the laundry appliance 10 (e.g., the bellows assembly 42, the deflector 74, etc.). Further, the fastening mechanism (e.g., the projection 382, the hooks 390, etc.) can be substantially obscured from the view of the user. Moreover, this configuration can provide a watertight seal between the deflector 74 and each of the bellows assembly 42 and the lip 374 of the front panel 58.

Figure 35:
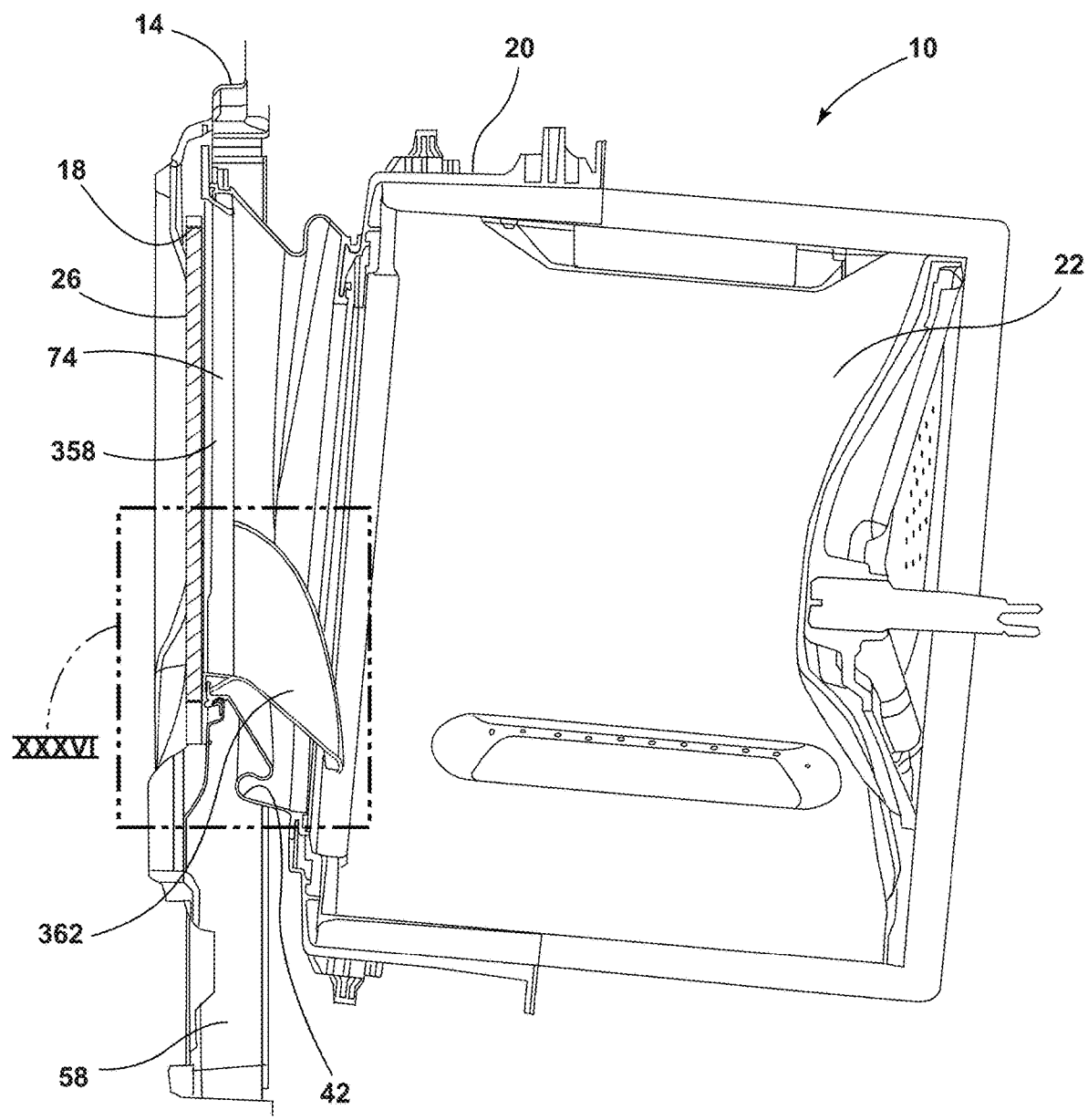
FIG. 35 is a partial cross-sectional view of the laundry appliance of FIG. 28 taken along line XXXV-XXXV, and illustrated with a front panel and a door, shown in a closed position.

Referring to FIG. 35, the chute 362 extends from the rim 358, over the bellows assembly 42, and towards the interior of the drum 22. The chute 362 is advantageous for deflecting laundry away from the bellows assembly 42. As illustrated in FIG. 35, the drum 22 can be offset relative to the front panel 58. Accordingly, the access aperture 90 of the drum 22 is offset from the front opening 18 of the cabinet 14. The bellows assembly 42 typically extends between the front opening 18 and the access opening 62 of the tub 20. Accordingly, the bellows assembly 42 is configured as an obliquely oriented bellows assembly 42 extending between the cabinet 14 and the tub 20. In a specific non-limiting example, the front panel 58 can be vertically adjusted by approximately 3.5 inches compared to the offset drum 22. The offset drum 22 and the obliquely oriented bellows assembly 42 provide a space between the deflector 74 and the bellows assembly 42.

Figure 36:
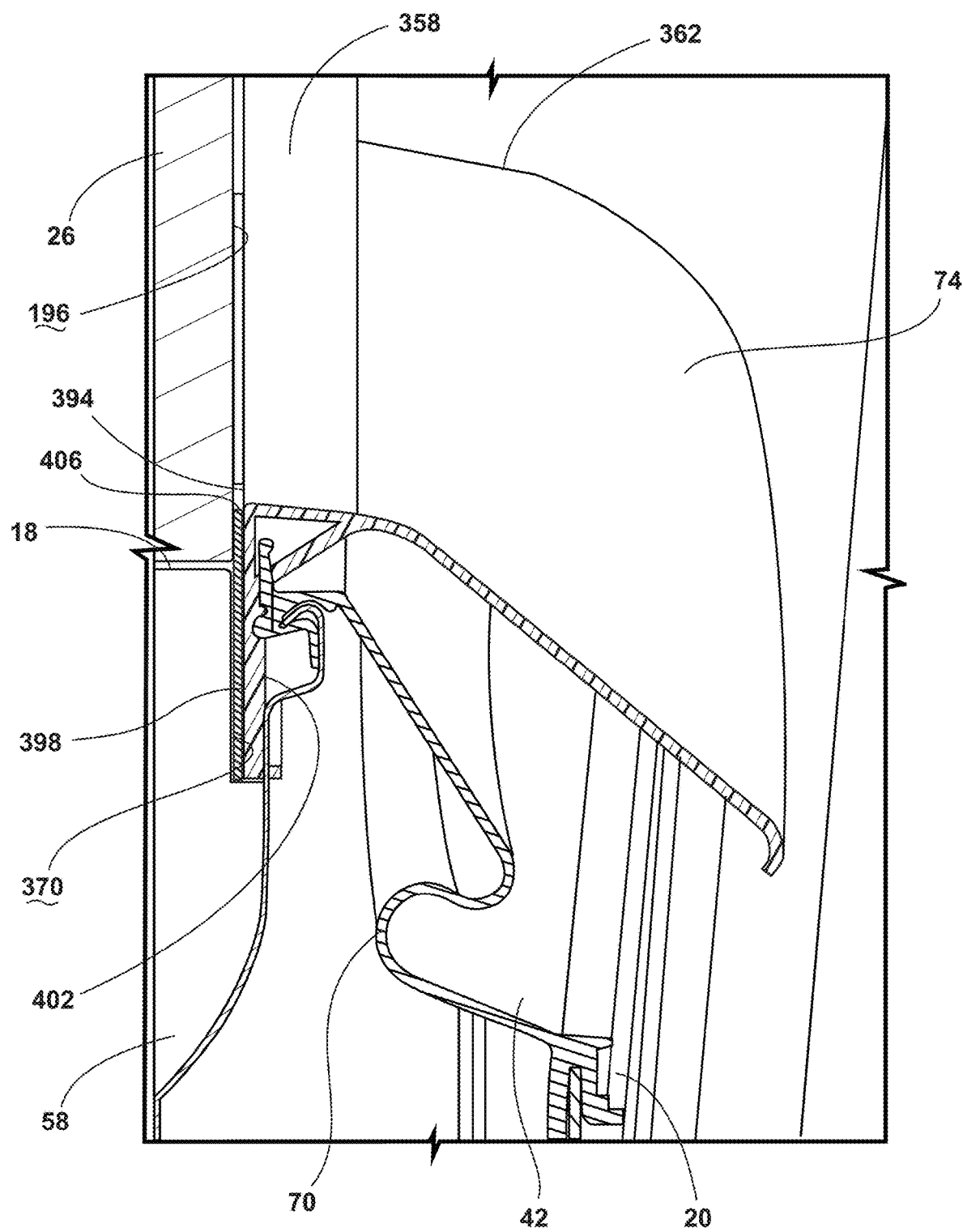
FIG. 36 is an enlarged view of an interface between a deflector, the front panel, and a bellows assembly of FIG. 35, taken at area XXXVI.

Referring to FIGS. 35 and 36, the deflector 74 may be coupled with the bellows assembly 42 and the interior surface 370 of the front panel 58. A front side 394 of the deflector 74 can include a seal 398 for providing a watertight seal between the deflector 74 and the front panel 58. Typically, the seal feature 398 is coupled to the rim 358 and configured to engage the interior surface 370 of the front panel 58. A rear side 402 of the deflector 74 (e.g., oriented toward the interior of the cabinet 14 and the tub 20) is coupled to the bellows assembly 42. The bellows assembly 42 may be coupled to one or both of the rim 358 and the chute 362. Accordingly, the watertight seal can be provided between the deflector 74 and the bellows assembly 42.

The seal 398 can include a sealing feature 406 that provides a watertight seal between the deflector 74 and the door 26 when the door 26 is in the closed position 34. The sealing feature 406 is typically coupled between the front side 394 of the deflector 74 and the inner surface 196 of the door 26 when the door 26 is in the closed position 34. The sealing feature 406 can extend at least a width of the front opening 18 to provide the watertight seal. In examples where the door 26 is configured as a hinged door, one or more shims may be disposed proximate a hinge and a door lock to provide a watertight seal between the door 26 and the deflector 74. It is contemplated that the seal 398 and the sealing feature 406 can be an integral seal component. Alternatively, the seal 398 and the sealing feature 406 can be separate components of the same sealing assembly. In configurations where the seal 398 and the sealing feature 406 are separate components, the sealing feature 406 can extend around a flat surface of the door 26 and engage the deflector 74 when the door 26 is in the closed position 34.

Figure 37:
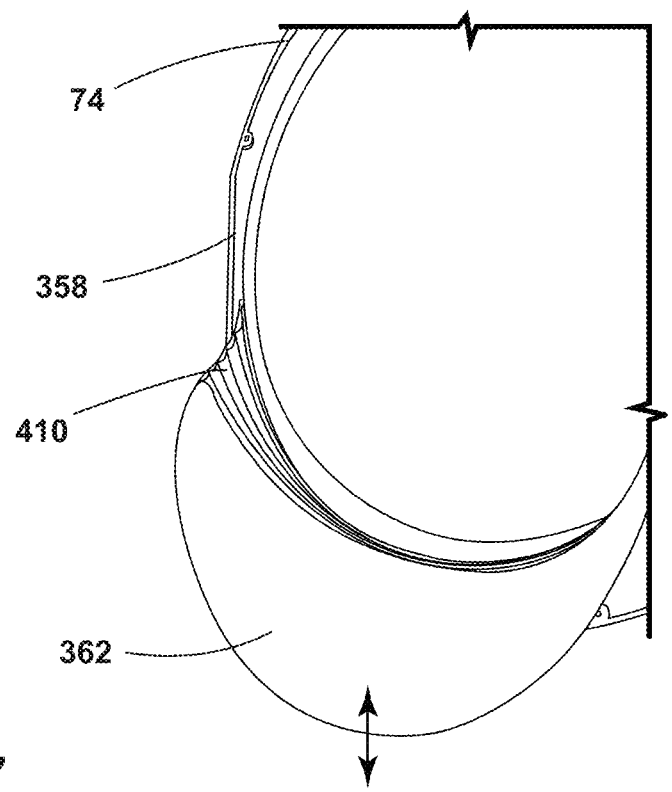
FIG. 37 is a partial front perspective view of a deflector for a laundry appliance having a chute coupled to a rim via a spring, according to one example.

Referring to FIG. 37, the chute 362 may be coupled to the rim 358 via a biasing feature or a spring 410. The spring 410 can extend along the width of the chute 362, or alternatively, one or more springs can extend between the chute 362 and the rim 358. The chute 362 is configured to move relative to the rim 358 in response to a predetermined force acting on the chute 362. For example, force can be applied to the chute 362 during the laundry loading and unloading processes. The chute 362 moves or adjusts via the spring 410 relative to the rim 358 in response to the force acting on the chute 362. Additionally or alternatively, laundry can contact the chute 362 during a laundry cycle and the chute 362 moves or adjusts in response to the force of the laundry, while deflecting laundry back into the drum 22. The deflector 74 can then return to its original position. The spring 410 allows the deflector 74 to resiliently deform or adjust to increase the longevity of the deflector 74.

It is contemplated that the deflector 74, including the rim 358 and/or the chute 362, can be constructed of, or include, one or more flexible materials. The flexible materials may be co-molded to the deflector 74 to allow the deflector 74 to elastically and resiliently deform in response to force acting upon the deflector 74. It is also contemplated that the interface between the rim 358 and the front panel 58 can be flexible, such that the rim 358 can adjust relative to the front panel 58 in response to force acting on the deflector 74. The movement of one or more aspects of the deflector 74 allows the deflector 74 to deflect laundry into the drum 22 while increasing the longevity of the deflector 74. It is contemplated that the spring 410 can be an "accordion" feature or a series of living hinges that are integral with the deflector 74. These integral features can allow for a resilient motion of the deflector 74.

Figure 38:
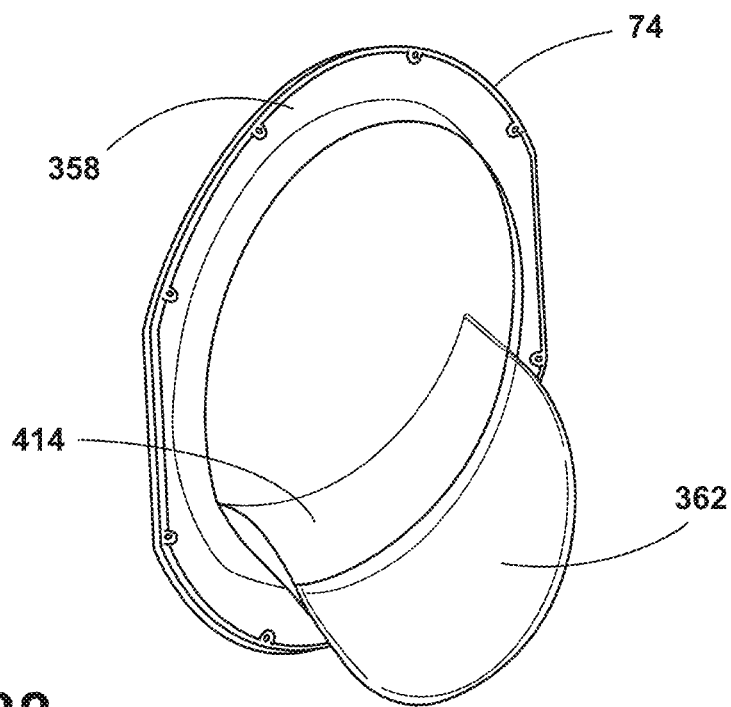
FIG. 38 is a side perspective view of a deflector for a laundry appliance having a telescoping guide member, according to one example.
Figure 39:
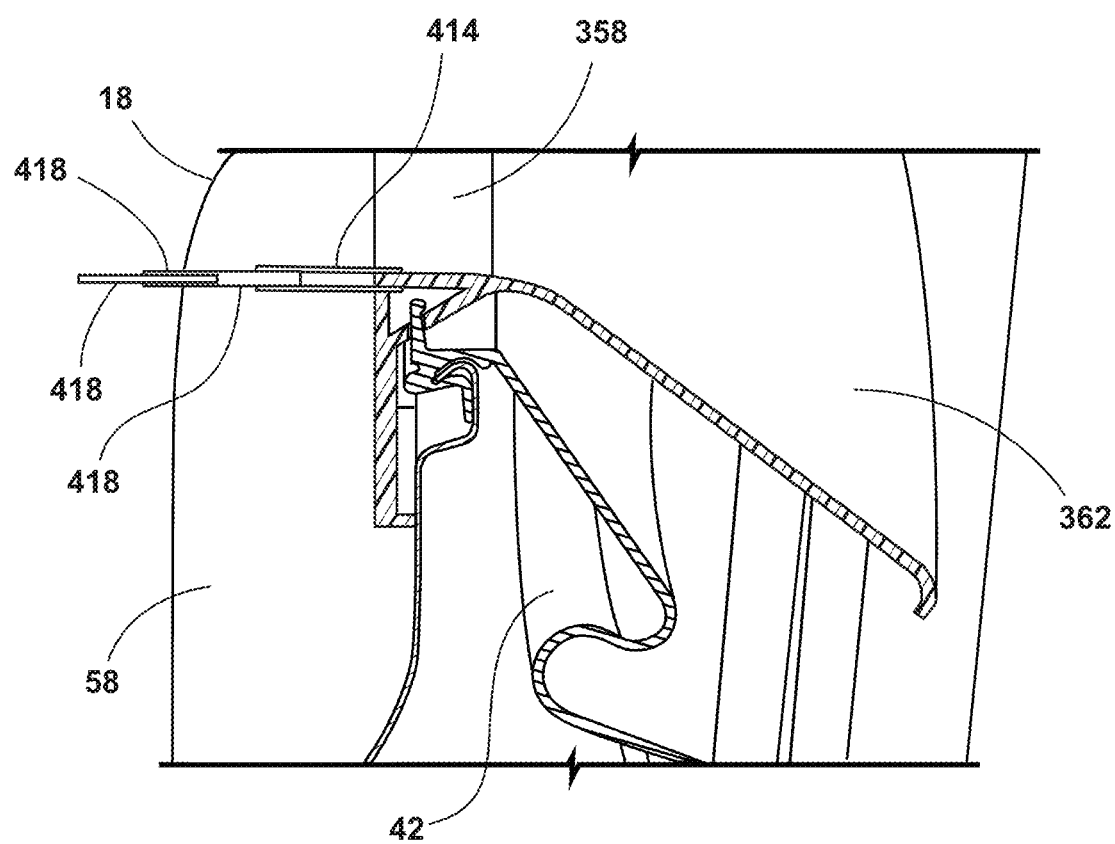
FIG. 39 is a partial cross-sectional view of an appliance incorporating the deflector of FIG. 38 and illustrating operation of the telescoping guide member extending through a front opening.

Referring to FIGS. 38 and 39, the deflector 74 may include a telescoping guide member 414. The telescoping guide member 414 is configured to extend in an opposing direction from the chute 362. Accordingly, the telescoping guide member 414 is configured to extend through the front opening 18 of the cabinet 14 and to an area outside of the cabinet 14 of the laundry appliance 10. As best illustrated in FIG. 38, the telescoping guide member 414 may have a substantially similar width and curvature as the chute 362, such that the telescoping guide member 414 operates as an extension of the chute 362. By extending outside the cabinet 14 and towards the user, the telescoping guide member 414 can facilitate an efficient and convenient surface for loading laundry.

The telescoping guide member 414 includes a plurality of segments 418 slidably engaged with one another to move between retracted and extended positions. The movement of the telescoping guide member 414 may be automatic or actuated manually by the user. One segment 418 is coupled directly to the rim 358 and the remaining segments 418 are directly coupled to the adjacent segments 418. The segment 418 directly coupled to the rim 358 typically has the greatest thickness and width, whereas the segment 418 furthest from the rim 358 when the telescoping guide member 414 is extended is typically the thinnest and narrowest. The smaller segments 418 can slide into thicker, wider segments 418 to the retracted position. Accordingly, the segments 418 may be nested when in the retracted position.

When in the retracted position, the telescoping guide member 414 is disposed within the cabinet 14 and does not extend through the front opening 18. Accordingly, the door 26 can be in the closed position 34 without interference from the telescoping guide member 414. The retracted position may have a variety of configurations, such that the telescoping guide member 414 can be disposed adjacent to the rim 358, disposed within an interior of the rim 358, or otherwise removed from the front opening 18. When in the extended position, the telescoping guide member 414 can extend substantially horizontal from the rim 358 or can extend at an angle depending on the configuration of the deflector 74. When disposed at an angle, the telescoping guide member 414 defines an extension of the sloped surface of the deflector 74, and thereby serves as an elongated slide for disposing laundry into the tub 22. The telescoping guide member 414 may be substantially flat or may have a similar arcuate shape as the chute 362.

Figure 40:
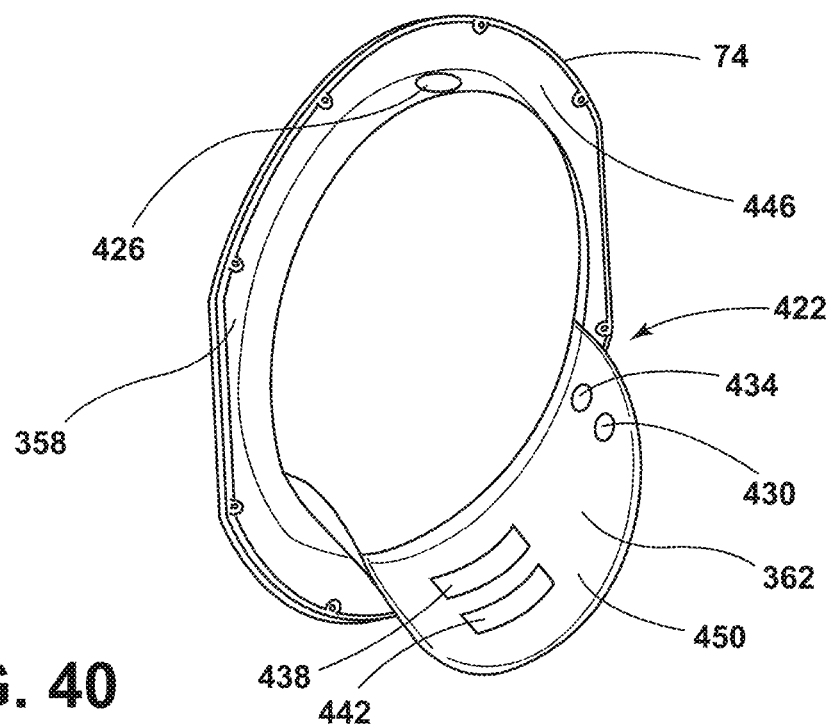
FIG. 40 is a side perspective view of a deflector for a laundry appliance having a sensor assembly, according to one example.

Referring to FIG. 40, the deflector 74 may include a sensor assembly 422. The sensor assembly 422 includes at least one of an imager 426, a temperature sensor 430, a humidity sensor 434, conductive strips 438, 442, and/or any combination thereof. The imager 426 is typically coupled to an upper portion 446 of the rim 358. The imager 426 defines a field of detection that extends into the drum 22 to obtain data regarding a condition (e.g., wetness or dryness) of the laundry within the drum 22. The imager 426 may be an image-based sensor, a charge-coupled device (CCD) or a complementary metal oxide semiconductor (CMOS) imager, or any type of color or black-and-white camera. The imager 426 can include motorized or automatic wipers to remove fluid from the imager 426. The imager 426 can also be associated with one or more nozzles configured to direct water onto the imager 426, which can remove laundry materials from the imager 426.

Figure 41:
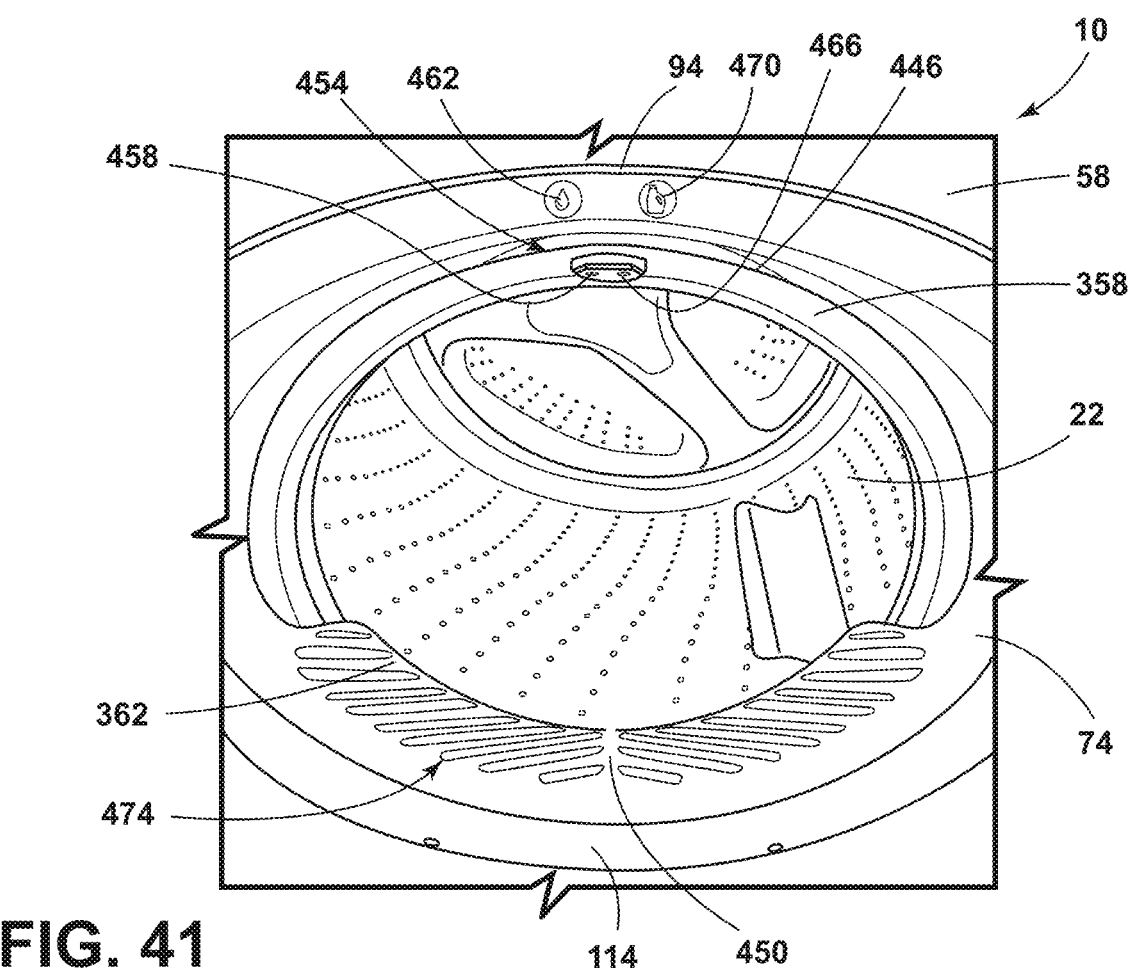
FIG. 41 is a front perspective view of a deflector in a laundry appliance associated with a pre-treat system, according to one example.

Additionally or alternatively, the deflector 74 may include a temperature sensor 430 coupled to the chute 362. As illustrated in FIG. 41, the temperature sensor 430 is coupled to a topside 450 of the chute 362. The temperature sensor 430 obtains data relating to the temperature within the drum 22 and/or the temperature of the laundry within the drum 22. The temperature data can be utilized to determine the condition of the laundry within the drum 22.

Referring still to FIG. 40, the humidity sensor 434 may be coupled to the chute 362, for example, on the topside 450 of the chute 362. The humidity sensor 434 may detect the moisture or humidity in the air within the drum 22. The detected moisture can correlate to the condition of the laundry within the drum 22.

The deflector 74 may additionally or alternatively include conductive strips 438, 442 on the topside 450 of the chute 362. Typically, each of the conductive strips 438, 442 is constructed of metal. The conductive strips 438, 442 form part of an electrical circuit, such that when a laundry item touches both conductive strips 438, 442, the laundry item closes the circuit, generating an electrical signal, which is registered by the controller 282. The controller 282 can monitor and/or analyze the frequency and duration of the generated electrical signals over time to assess the dryness of the laundry. As the laundry dries, the frequency and duration of the electrical signals typically lessen, as dry laundry is less conductive than wet laundry.

Referring to FIGS. 24 and 40, the sensor assembly 422 is in communication with the controller 282. Each of the imager 426, the temperature sensor 430, the humidity sensor 434, and the conductive strips 438, 442 communicate sensed data to the controller 282. The controller 282 typically includes one or more routines 294 for receiving the sensed data and utilizing the sensed data to determine the condition of the laundry within the laundry appliance 10. The controller 282 typically includes one or more routines 294 that adjust the operation of the laundry appliance 10 in response to the sensed data. For example, where the laundry appliance 10 is a dryer or a washer/dryer combination, the controller 282 can extend a drying time in response to the sensed information received from the sensor assembly 422. It is contemplated that the deflector 74 may include one, more than one, or all of the components of the sensor assembly 422, which can be arranged in any practicable configuration on the deflector 74.

The deflector 74 can provide a location within the laundry appliance 10 to detect the condition of the laundry. The deflector 74 is substantially stationary, which allows electrical connections to extend through the deflector 74 to the various components of the sensor assembly 422. The sensor assembly 422 is advantageous for determining the condition of the laundry with the laundry appliance 10. Additionally or alternatively, the sensor assembly 422 can be advantageous for sensing whether additional items or objects other than laundry items are disposed within the drum 22. When other items or objects are detected within the drum 22, the sensor assembly 422 can communicate a signal to the controller 282, which may alert the user via the user-interface 274, adjust the laundry cycle, and/or stop the laundry cycle.

Referring to FIG. 41, an aspect of the deflector 74 includes a pre-treat system 454 that provides a space for the user to pretreat laundry items for removing stains or otherwise treating the laundry prior to the laundry cycle. The pre-treat system 454 typically includes a water dispenser 458 configured to dispense water to the topside 450 of the chute 362. The water dispenser 458 is in fluid communication with a water source within the laundry appliance 10 or external to the laundry appliance 10. The water dispenser 458 is illustrated as being coupled to the deflector 74. The water dispenser 458 can also be coupled to the bellows assembly 42 and/or the front panel 58.

At least one of the deflector 74 and the front panel 58 includes a water dispensing button 462, allowing the user to activate the water dispenser 458. The user can engage the water dispensing button 462 to provide water to the topside 450 of the chute 362 by activating the water dispenser 458. The water dispenser 458 can remain active for a predetermined amount of time, dispense a predetermined amount of water, and/or dispense water for the duration that the user is engaging the water dispensing button 462.

Referring still to FIG. 41, the pre-treat system 454 may include a chemistry dispenser 466. The chemistry dispenser 466 is configured to supply a laundry chemistry to the topside 450 of the chute 362. The chemistry dispenser 466 is in fluid communication with a supply of laundry chemistry, for example, a bulk dispensing drawer of the laundry appliance 10. As illustrated in FIG. 41, the chemistry dispenser 466 is coupled to the deflector 74 adjacent to the water dispenser 458. However, it is contemplated that the chemistry dispenser 466 may be coupled to the bellows assembly 42 and/or the front panel 58 and may not be disposed adjacent to the water dispenser 458. One of the deflector 74 and the front panel 58 includes a chemistry dispensing button 470 that allows the user to activate the chemistry dispenser 466. The chemistry dispenser 466 may remain active for a predetermined amount of time, dispense a predetermined amount of laundry chemistry, and/or dispense laundry chemistry for the duration that the user is engaging the chemistry dispensing button 470.

As illustrated in FIG. 41, the water dispensing button 462 and the chemistry dispensing button 470 are disposed on the front panel 58 adjacent to the front opening 18 proximate the 12 o'clock position 94. The water dispenser 458 and the chemistry dispenser 466 are coupled directly to the deflector 74 proximate the 12 o'clock position 94. When activated, the water dispenser 458 can dispense water onto the topside 450 of the chute 362, and the chemistry dispenser 466 can dispense laundry chemistry in a similar manner.

Figure 42:
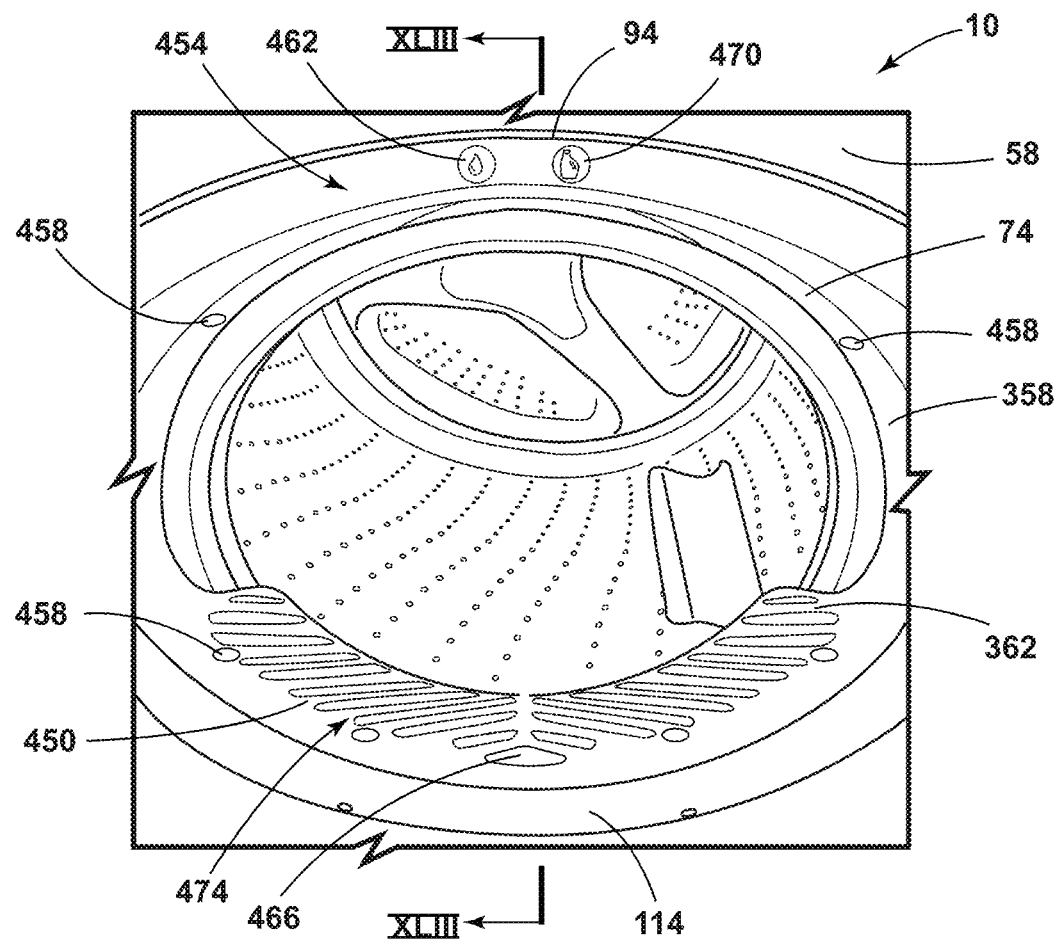
FIG. 42 is a partial front perspective view of an appliance incorporating a deflector for the pre-treat system, according to one example.

Referring to FIG. 42, an additional or alternative configuration of the pre-treat system 454 is illustrated. The water dispenser 458 may be configured as a plurality of dispensers arranged in multiple locations along the deflector 74. The water can be dispensed through the multiple locations of the water dispenser 458 directly onto the surface of the chute 362. It is contemplated that the water dispenser 458 may be disposed in a single location on the chute 362 or elsewhere on the deflector 74.

The chemistry dispenser 466 may be arranged on the rim 358 and/or the chute 362 proximate the 6 o'clock position 114. Accordingly, the chemistry dispenser 466 can be disposed in a single location on the deflector 74. In such configurations, the laundry chemistry is dispensed directly onto the topside 450 of the chute 362. It is contemplated that the chemistry dispenser 466 may be configured as a plurality of dispensers arranged in multiple locations along the deflector 74. It is contemplated that the pre-treat system 454 can include the water and chemistry dispensers 458, 466 proximate the 12 o'clock position 94 and the 6 o'clock position 114. In certain aspects, the locations of the various dispensers can be utilized during dedicated laundry operations or cycles. For example, the lower dispensers can be used for a pre-treat stage and the upper dispensers can be used for in-cycle dispensing during operation of a laundry cycle.

Referring to FIGS. 24, 41, and 42, in each of the configurations of the pre-treat system 454 disclosed herein, water and laundry chemistry can be directed onto the topside 450 of the chute 362 in selected dispenser locations. The pre-treat system 454 provides on-demand dispensing of water and/or laundry chemistry. The pre-treat system 454 is typically in communication with the controller 282. The user can press or touch the water dispensing button 462 and/or the chemistry dispensing button 470, which can be communicated to the controller 282. The controller 282 can then activate a pump or similar device to dispense water and/or laundry chemistry onto the chute 362. The water and laundry chemistry can be dispensed separately or simultaneously. It is contemplated that the user can also activate the pre-treat system 454 through the user-interface 274.

Figure 43:
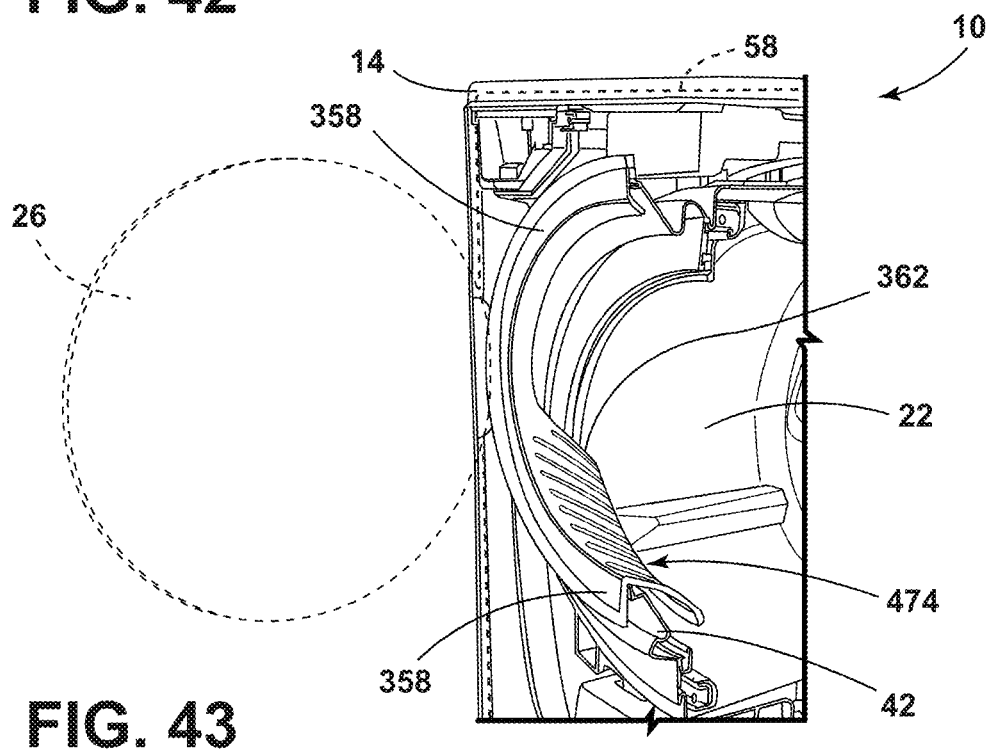
FIG. 43 is a partial cross-sectional view of the laundry appliance of FIG. 42, taken along line XLIII-XLIII, showing a door in an opened position.

Referring to FIGS. 41-43, the topside 450 of the chute 362 may define a raised pattern 474 configured to serve as a washboard. The raised pattern 474 is illustrated as ribs but may be any combination of ribs, bumps, protrusions, projections, etc. The raised pattern 474 is arranged on one or more portions of the topside 450 of the chute 362. The raised pattern 474 can be molded into the topside 450 of the deflector 74 or otherwise coupled to the chute 362.

As best illustrated in FIG. 43, the chute 362 defines a slope toward a bottom of the drum 22. The raised pattern 474 typically has a corresponding slope, allowing water to move through the raised pattern 474 into the tub 20 and/or drum 22. The slope of the chute 362 and the raised pattern 474 allows fluid to move along the topside 450 of the chute 362 and minimizes pooling of fluid on the deflector 74. It is contemplated that the deflector 74 may include the telescoping guide member 414, as illustrated in FIGS. 38 and 39, to provide increased surface area for the user to pre-treat the laundry items. In such configurations, the telescoping guide member 414 can include the raised pattern 474. The pre-treat system 454 provides a convenient area on the laundry appliance 10 for the user to pre-treat laundry items to aid in stain removal.

Figure 44:
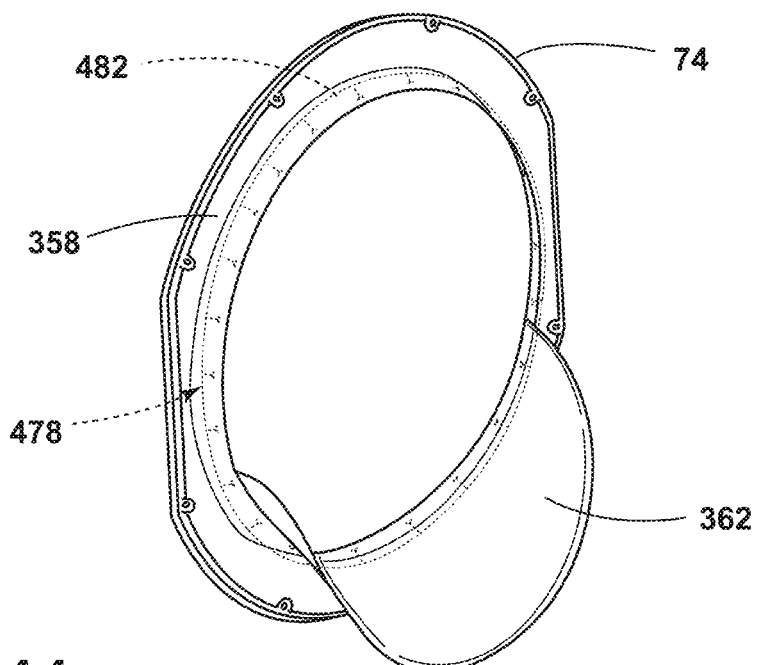
FIG. 44 is a side perspective view of a deflector for a laundry appliance having a plurality of lights arranged around a rim, according to one example.

Referring to FIG. 44, the deflector 74 may include a plurality of light sources 478. The plurality of light sources 478 are typically arranged at intervals around the rim 358 of the deflector 74. The light sources 478 can be coupled to or otherwise embedded in the deflector 74. Embedding the light sources 478 can be advantageous for protecting the light sources 478 from moisture or water. In certain aspects, the light sources 478 can be individual elements or can be coupled to one another via a light pipe 482 extending around the rim 358 of the deflector 74. The light pipe 482 is advantageous for transmitting and/or distributing light emitted by the light sources 478 around the rim 358 of the deflector 74, while using a single lighting element. The deflector 74 provides a stationary component in the interior of the laundry appliance 10 to support various components that utilize electrical connections (e.g., the light sources 478).

The light sources 478 are configured to emit visible light (e.g., having a wavelength in a range of from about 380 nm to about 740 nm). The light sources 478 are configured to emit light around the front opening 18 of the laundry appliance 10. A 360° lighting effect can be obtained with the light sources 478 and the light pipe 482. Accordingly, the light sources 478 can illuminate the interior of the drum 22.

Referring to FIGS. 24 and 44, each light source 478 is in communication with the controller 282. The controller 282 can selectively and independently activate each light source 478. The light sources 478 may be utilized to emit light and to communicate a visual message to the user of the laundry appliance 10. The visual message typically serves as feedback to the user relating to a status of the laundry cycle, an error message, or any other aspect of the laundry appliance 10. The controller 282 can control each light source 478 to provide the feedback to the user.

Figure 45:
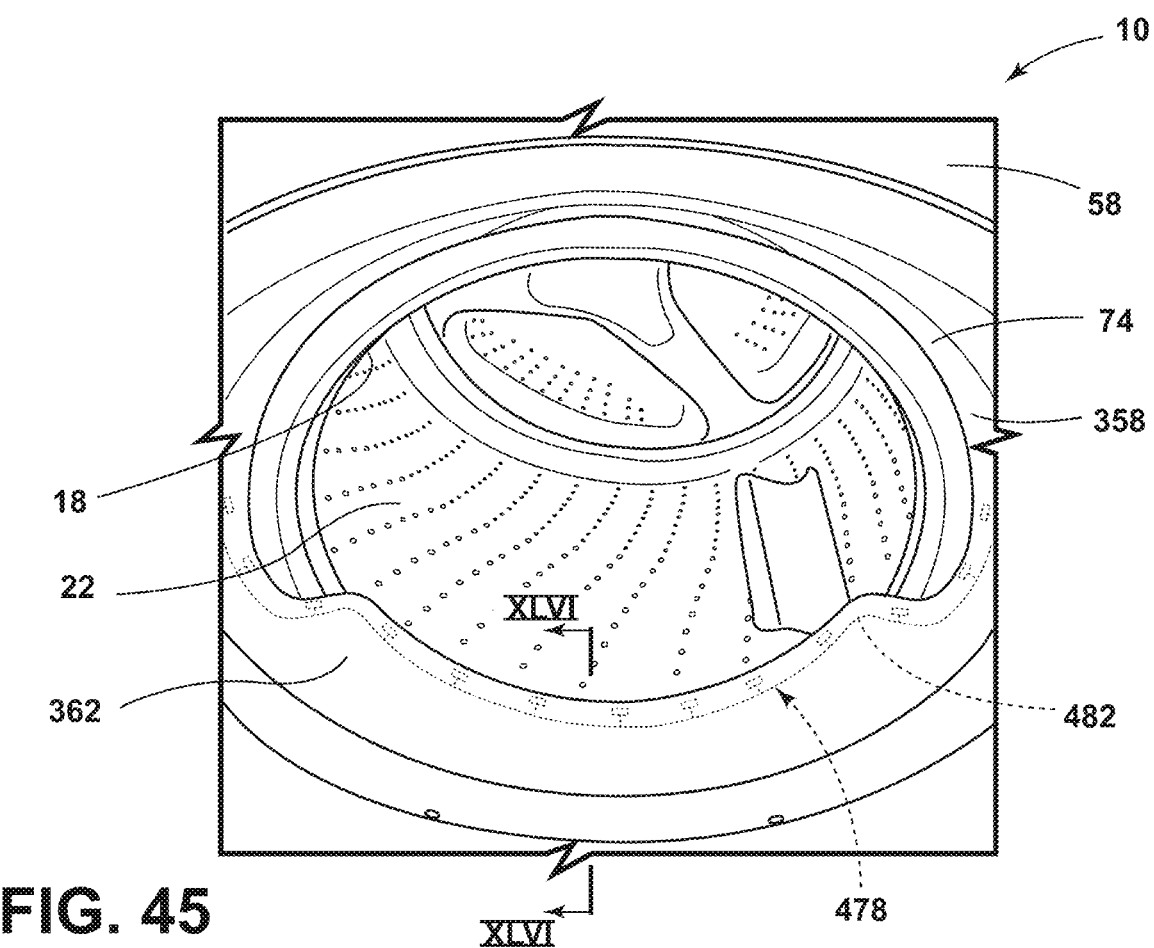
FIG. 45 is a partial front perspective view of a laundry appliance with a deflector having a plurality of light sources arranged along a chute, according to one example.
Figure 46:
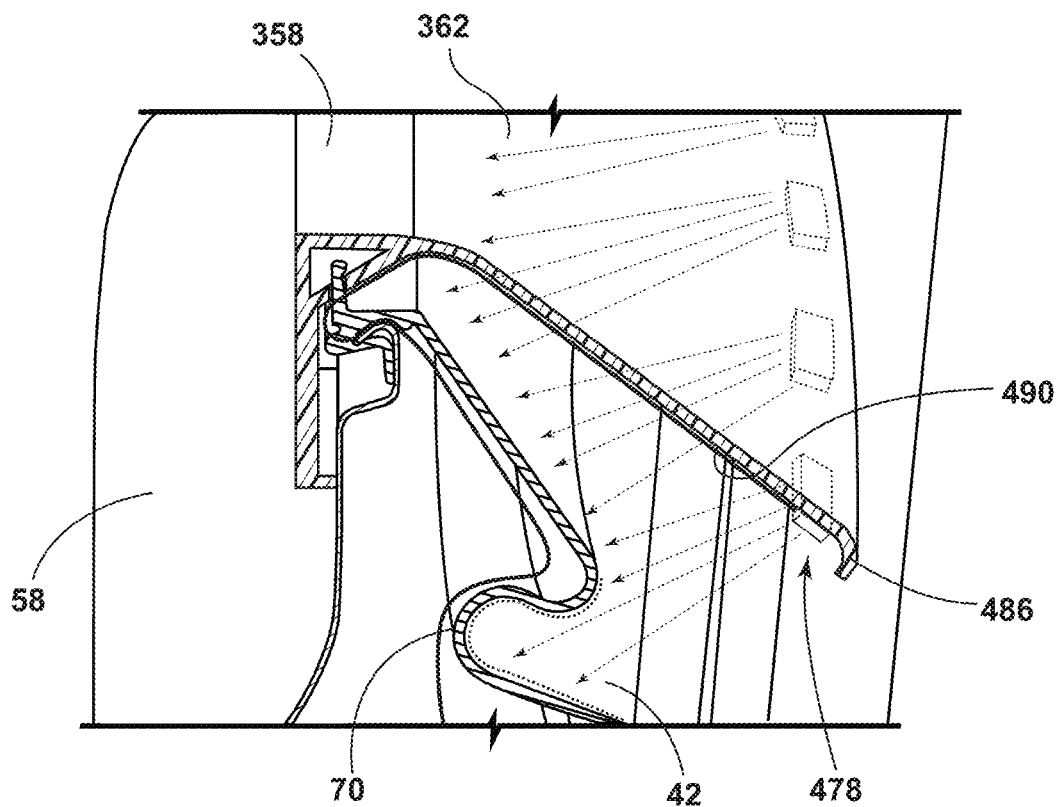
FIG. 46 is a partial schematic cross-sectional view of the deflector and the plurality of light sources of FIG. 45, taken along line XLVI-XLVI.

Referring to FIGS. 45 and 46, an additional or alternative configuration of the light sources 478 on the deflector 74 is illustrated. The plurality of light sources 478 may be arranged along an interior edge 486 of the chute 362. The light sources 478 can be coupled to or otherwise embedded in an underside 490 of the chute 362. Embedding the light sources 478 may be advantageous for protecting the light sources 478 from moisture or water. Additionally or alternatively, the interior edge 486, as best illustrated in FIG. 46, curves toward the bellows assembly 42, which can protect the light sources 478. The light sources 478 may be coupled to one another via the light pipe 482, as illustrated in FIG. 45, or may be separate from one another, as illustrated in FIG. 46.

In certain aspects of the device, the light sources 478 or a portion of the light sources 478 are configured to emit ultraviolet (UV) and/or blue light toward the bellows assembly 42. Typically, UV light produces electromagnetic energy that can inhibit the ability of microorganisms to reproduce and cause inactivation of microbes by causing mutations and/or cell death. Accordingly, the UV light can operate to sanitize and/or clean the bellows assembly 42 around and under the deflector 74. The light emitted by the light sources 478 may have a wavelength in a range of from about 100 nm to about 500 nm, which includes UV-A, UV-B, UV-C, and blue light. UV-A light (e.g., having a wavelength in a range of from about 320 nm to about 400 nm) and UV-B light (e.g., having a wavelength in a range of from about 280 nm to about 320 nm) generally cause oxidation of proteins and lipids resulting in cell death. UV-C light (e.g., having a wavelength in a range of from about 100 nm to about 280 nm) generally causes photochemical reactions in DNA and RNA, resulting in inactivation of microbes and failure to reproduce. Blue light (e.g., having a wavelength in a range of about 380 nm to about 500 nm) generally inhibits bacterial growth by prompting generation of reactive oxygen species, which are toxic to bacterial cells. The light sources 478 may emit any one or a combination of UV and blue light onto the bellows assembly 42.

Referring still to FIGS. 45 and 46, the light sources 478 can be angled to emit the UV and/or blue light onto the surface of the bellows assembly 42. The UV and/or blue light is advantageous for disinfecting the bellows assembly 42. In certain aspects, the bellows assembly 42 can include the plurality of folds 70 to define the sinusoidal shape. The folds 70 provide flexibility within the structure of the bellows assembly 42 during use and operation of the laundry appliance 10. The folds 70 are typically more difficult for the user to clean and disinfect. The light sources 478 can be arranged to direct the UV and/or blue light onto the plurality of folds 70 of the bellows assembly 42.

Referring to FIGS. 24, 45, and 46, the light sources 478 are in communication with the controller 282. The controller 282 can selectively and independently activate each light source 478. The controller 282 can activate the light sources 478 in response to a user command. Additionally or alternatively, the controller 282 may automatically activate the light sources 478 during non-wash periods.

Referring to FIGS. 44-46, the light sources 478 can include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid, and/or any other similar device. Any other form of lighting may be utilized within the deflector 74 without departing from the teachings herein. Further, various types of LEDs are suitable for use in the deflector 74, including, but not limited to, top-emitting LEDs, side-emitting LEDs, and others. Moreover, according to various examples, multicolored light sources such as Red, Green, and Blue (RGB) LEDs that employ red, green, blue LED packaging can be used to generate various desired colors of light outputs from a single light source, according to known light color mixing techniques.

Figure 47:
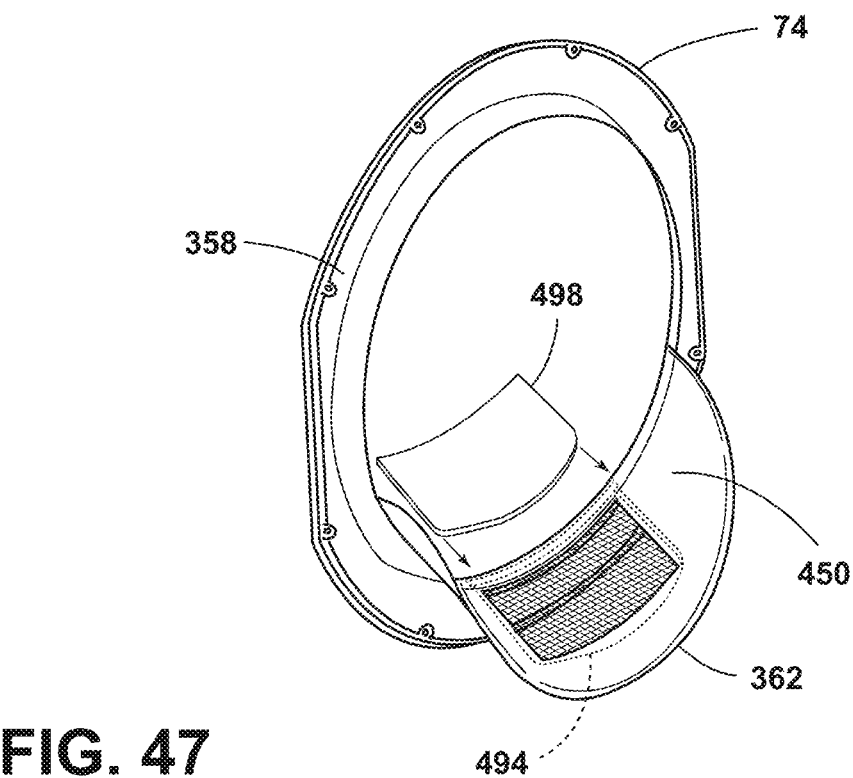
FIG. 47 is a side perspective view of a deflector for a laundry appliance having a channel for receiving a lint filter, according to one example.
Figure 48:
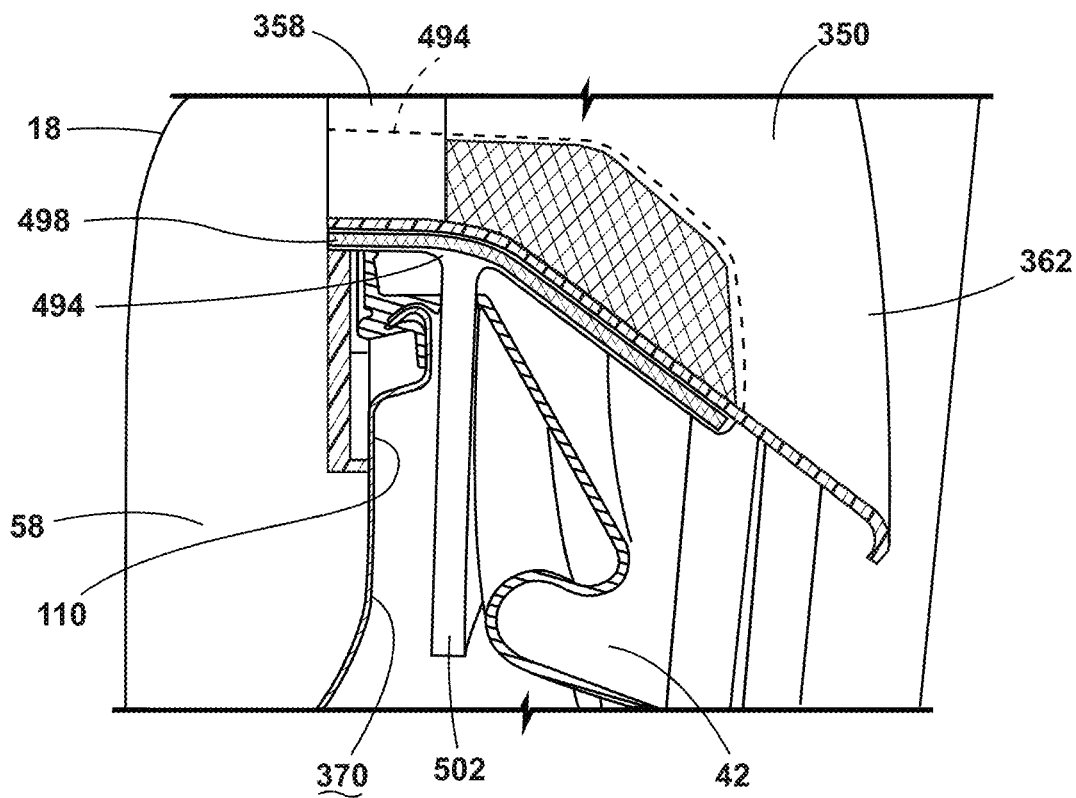
FIG. 48 is a partial cross-sectional view of an appliance incorporating the deflector of FIG. 47, and illustrating an aspect of the lint filter disposed within the channel.

Referring to FIGS. 47 and 48, the chute 362 may define a channel 494 for housing a lint filter 498. The lint filter 498 can be selectively disposed within the channel 494 by the user. The lint filter 498 can be accessible through the front opening 18, providing convenient access to the lint filter 498 for cleaning.

The chute 362 intersects with an airflow path of the laundry appliance 10 to catch lint within the airstream. Typically, heat exchangers of the heat pump system are positioned within an airflow path of the laundry appliance 10. The pump system serves to condition air within the airflow path for heating and cooling the air and extracting moisture and humidity from the air delivered to the drum 22. The lint filter 498 is positioned upstream of the heat exchangers and serves to remove lint from the air delivered to the heat exchangers within the airflow path. The lint filter 498 serves to capture lint within the airflow path so the lint does not adhere, or substantially does not adhere, to the heat exchanger of the heat pump system.

As best illustrated in FIG. 48, the deflector 74 typically defines an air passage 502 extending into the space 110 between the bellows assembly 42 and the front panel 58. The air passage 502 is in fluid communication with the channel 494 within the chute 362 and the space between the bellows assembly 42 and the front panel 58. The air passage 502 is typically in fluid communication with the airflow path of the laundry appliance 10, thereby allowing the chute 362 to intersect with the airflow path. A portion of the chute 362 aligning with the channel 494 may be permeable to allow air and lint to flow through the chute 362 and the lint to catch on the lint filter 498. The air passage 502 can be incorporated into the rim 358 and extend between the interior surface 370 of the front panel 58 and an interface between the rim 358 and the bellows assembly 42. Additionally or alternatively, the air passage 502 can extend through the bellows assembly 42 and extend into the space 110 between the bellows assembly 42 and the front panel 58.

Figure 49:
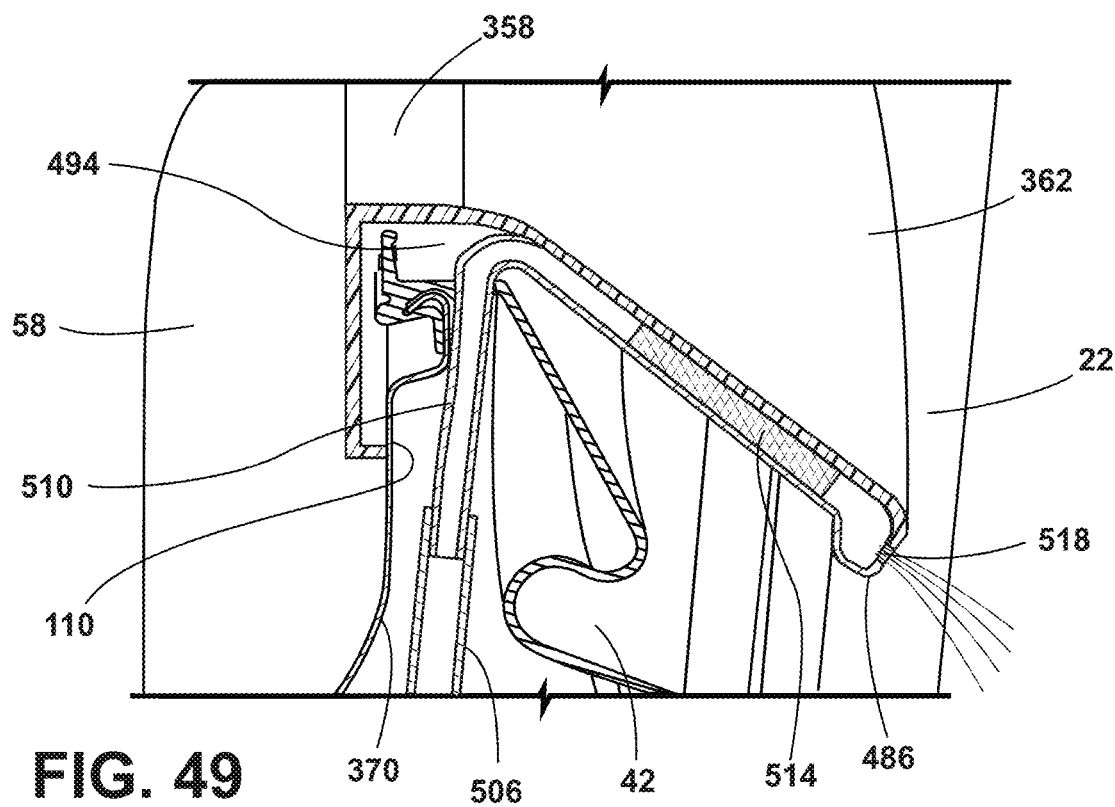
FIG. 49 is a partial schematic cross-sectional view of a deflector in a laundry appliance in fluid communication with a recirculation tube, according to one example.

Referring to FIG. 49, the laundry appliance 10 can include a recirculation tube 506 for recirculating fluids from the tub 20 into the drum 22. Use of the recirculation tube 506 can reduce the amount of fluids, including water and laundry chemistry, utilized during a laundry cycle. The recirculation tube 506 is typically in fluid communication with the channel 494 defined in the chute 362 of the deflector 74. Tubing 510 can extend through the channel 494 and be coupled with an end of the recirculation tube 506 to guide the fluid through the channel 494. The recirculation tube 506 and the tubing 510 generally extends through the space 110 between the deflector 74 and the front panel 58. It is contemplated that the tubing 510 can be incorporated into the rim 358 and extends between the interior surface 370 of the front panel 58 and an interface between the rim 358 and the bellows assembly 42. Additionally or alternatively, the tubing 510 and/or the recirculation tube 506 can extend through the bellows assembly 42 and extend into the space 110 between the bellows assembly 42 and the front panel 58.

A water filter 514 may be disposed within the channel 494. The water filter 514 may be any sort of filter, including, for example, a charcoal filter. In charcoal filter examples, the charcoal can remove chlorine and particles, such as sediment, volatile organic compounds, tastes, and odors from within the fluid. The water filter 514 may be selectively disposed within the channel 494 and may be removed from the deflector 74, in a manner similar to the lint filter 498, as illustrated in FIG. 48.

Referring still to FIG. 49, the fluids from the tub 20 can be redirected via the recirculation tube 506. The fluids can be moved via a pump or similar device as part of a recirculation system of the laundry appliance 10. The fluids typically travel through the recirculation tube 506, the tubing 510, and the water filter 514 disposed in the chute 362. The fluids can then be expelled through spray openings 518 defined in the interior edge 486 of the chute 362 into the interior of the drum 22. Accordingly, the deflector 74 may intersect with the recirculation system of the laundry appliance 10 to redirect fluids into the interior of the drum 22 from the tub 20.

Figure 50:
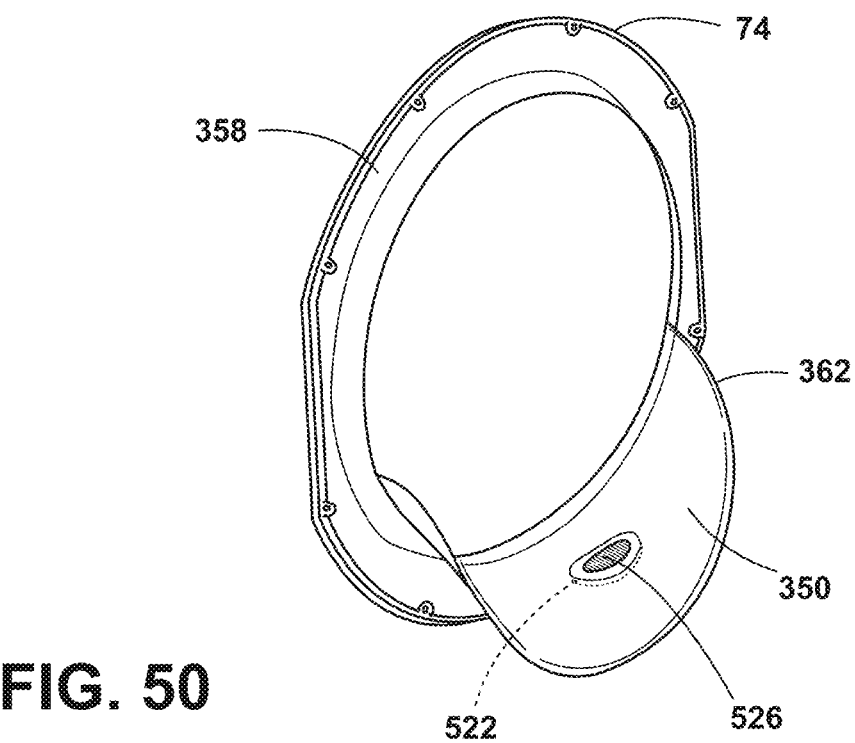
FIG. 50 is a side perspective view of a deflector for a laundry appliance having an odor substance in a recess defined in a chute, according to one example.

Referring to FIG. 50, the topside 450 of the chute 362 can define a recess 522. As illustrated, the recess 522 is defined in a central portion of the chute 362. It is contemplated that the chute 362 and/or the rim 358 may define additional recesses 522. An odor substance 526 is selectively disposed within the recess 522 to exude a scent into the drum 22 or otherwise into the laundry appliance 10. The odor substance 526 may be a powder, a liquid, a solid, or any other substance configured to exude a selected scent. In certain aspects, the recess 522 can be covered by a mesh, a film, or a cap configured to retain the odor substance 526 within the recess 522. The odor substance 526 is configured to exude a scent into the drum 22 to remove or mask smells the user may find unpleasant.

Additionally or alternatively, the deflector 74 can be at least partially constructed of materials that include anti-bacterial and/or anti-odor properties. It is contemplated that such materials, such as, for example, silver, may be coupled to or embedded in the deflector 74. Laundry appliances 10 may have a certain smell due to laundry materials left within the interior of the laundry appliance 10, and the odor substance 526 can exude a scent that masks or deodorizers the smell.

Figure 51:
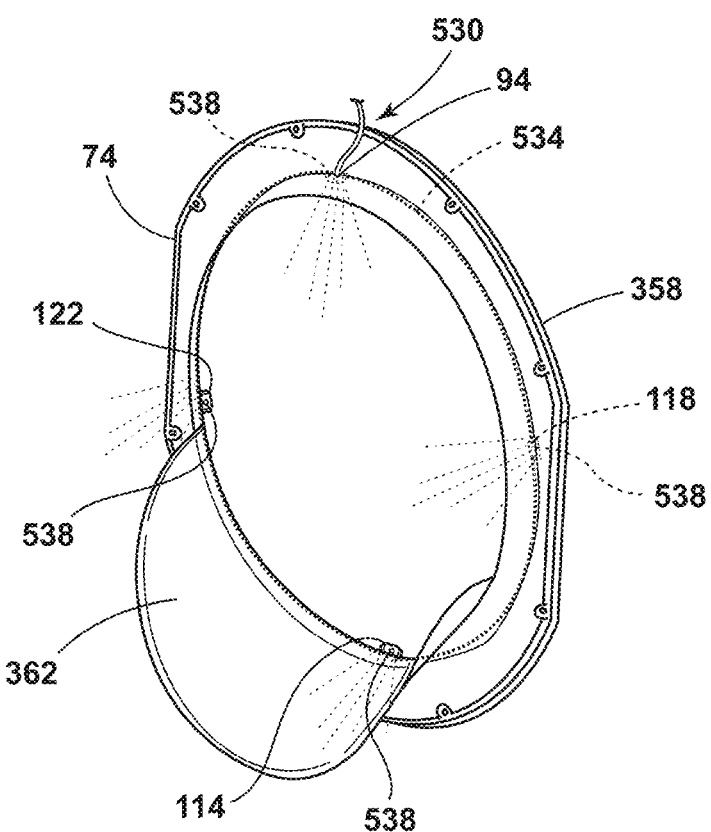
FIG. 51 is a side schematic view of a deflector for a laundry appliance having a water system, according to one example.

Referring to FIG. 51, a water system 530 can be coupled to or integrated in the deflector 74. The water system 530 typically includes a water manifold 534 extending along the rim 358 of the deflector 74. As illustrated, the water manifold 534 extends 360° around the rim 358; however, it is contemplated that the water manifold 534 can extend along any portion of the rim 358.

The water manifold 534 is in fluid communication with water inlets 538 arranged around the deflector 74. In the illustrated example of FIG. 51, the deflector 74 includes four water inlets 538 with a water inlet 538 disposed proximate each of the 12 o'clock position 94, the 6 o'clock position 114, the 3 o'clock position 118, and the 9 o'clock position 122. Other configurations of the water inlets 538 are contemplated without departing from the teachings herein.

The water manifold 534 is in fluid communication with a water source. The water system 530 serves to direct water into the drum 22 and onto the deflector 74. Water can be directed through the water inlets 538 to evenly coat laundry items quickly and more efficiently during a laundry cycle. The water inlets 538 may each include a nozzle, which can direct the water in a selected direction and which may be adjustable to different directions. The nozzles can be disposed within a protected area within the deflector 74, where the laundry obstructing the flow of the water or catching on the nozzles is minimized. The water system 530 can provide a 360° water fill along the deflector 74. It is contemplated that the water system 530 may be configured to direct other fluids into the drum 22 without departing from the teachings herein.

Figure 52:
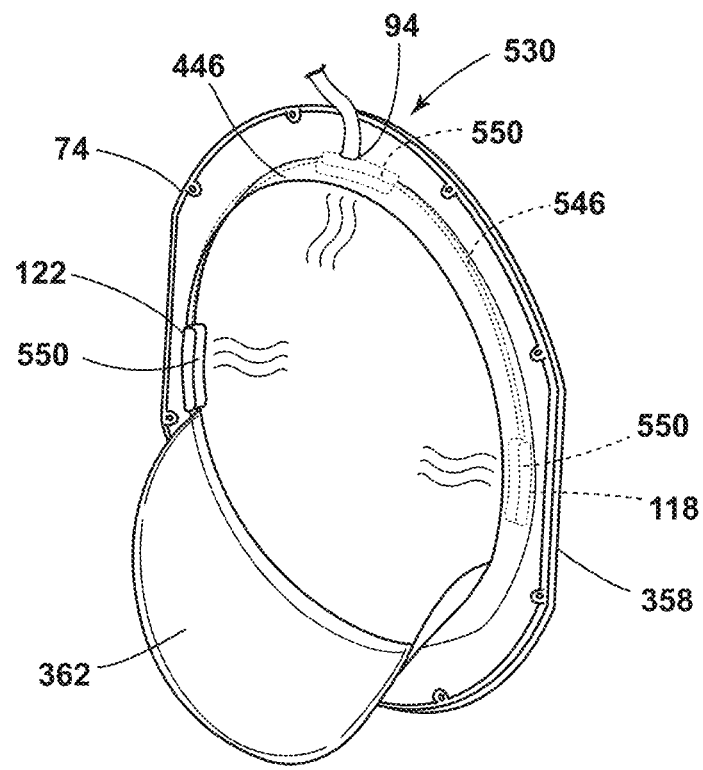
FIG. 52 is a side schematic view of a deflector for a laundry appliance having a heat system, according to one example.

Referring to FIG. 52, a heat system 542 can be coupled to or integrated in the deflector 74. The heat system 542 typically includes an air manifold 546, which extends along the rim 358 of the deflector 74. As illustrated in FIG. 52, the air manifold 546 extends around approximately 180° of the deflector 74. In the illustrated example, the air manifold 546 extends from proximate the 9 o'clock position 122 to the 3 o'clock position 118 around the upper portion 446 of the rim 358.

The heat system 542 includes air inlets 550 in fluid communication with the air manifold 546 for directing heated air into the drum 22 and onto the deflector 74. The air inlets 550, as illustrated, are disposed at the 12 o'clock position 94, the 3 o'clock position 118, and the 9 o'clock position 122. However, other configurations of the heat system 542 are contemplated without departing from the teachings herein. The air manifold 546 is in fluid communication with an air pathway of the laundry appliance 10 or another source of heated air. The air manifold 546 is constructed of materials that withstand higher temperatures compared to the materials of the bellows assembly 42. Accordingly, the heat system 542 can provide heated air to shorten cycle times for drying laundry items. The air manifold 546 provides an efficient introduction of air at higher temperatures into the drum 22.

Figure 53:
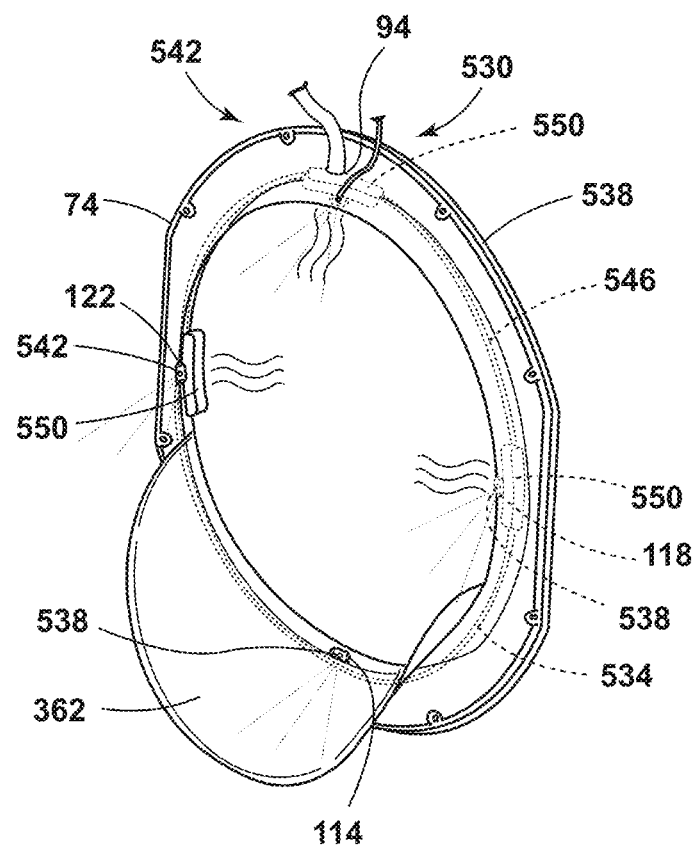
FIG. 53 is a side schematic view of a deflector for a laundry appliance having a water system and a heat system, according to one example.

Referring to FIGS. 51-53, the deflector 74 may be associated with both the water system 530 and the heat system 542, which can be advantageous when the laundry appliance 10 is a washer/dryer combination. The air inlets 550 typically align with three of the four water inlets 538. Both the water manifold 534 and the air manifold 546 extend around the rim 358 of the deflector 74. The water system 530 includes an extension to the water manifold 534 for coupling with a water source, which can extend from proximate the 12 o'clock position 94. Similarly, the heat system 542 can include an extension to the air manifold 546 for coupling with a source of heated air, which can extend from proximate the 12 o'clock position 94. Other configurations of the water system 530 and the heat system 542 on the deflector 74 are contemplated without departing from the teachings herein.

Referring to FIGS. 24 and 53, each of the water system 530 and the heat system 542 are in communication with the controller 282. The controller 282 includes one or more routines 294 for operating each of the water system 530 and heat system 542. The water system 530 and the heat system 542 can be used in conjunction with the sensor assembly 422 and can be activated based on the sensed condition of the laundry within the drum 22. The water system 530 may be advantageous for more efficiently providing water for a washing cycle and the heat system 542 may be advantageous in shortening a drying cycle.

Referring to FIGS. 24 and 29-53, the deflector 74 may include a variety of components as previously described herein. The deflector 74 may include one or more of the components depending on the configuration of the deflector 74 and the laundry appliance 10. Moreover, each of the configurations of the deflector 74 can be utilized in a washer, a dryer, a washer/dryer combination, and/or a combination thereof. Further, each configuration of the deflector 74 can be utilized in conjunction with any of the door 26 configurations described herein. It is contemplated that the configurations described herein are merely exemplary and are not considered to be limiting.

Referring to FIGS. 54-59, the door 26 can include a rotational function when the door 26 reaches the closed position 34. Accordingly, the door 26 can be configured as a sliding and rotating door. The rotational function of the door 26 can provide a work surface (e.g., the inner surface 196 of the door 26) for the user. The work surface can be advantageous for catching laundry that may fall during loading and unloading processes.

Figure 54:
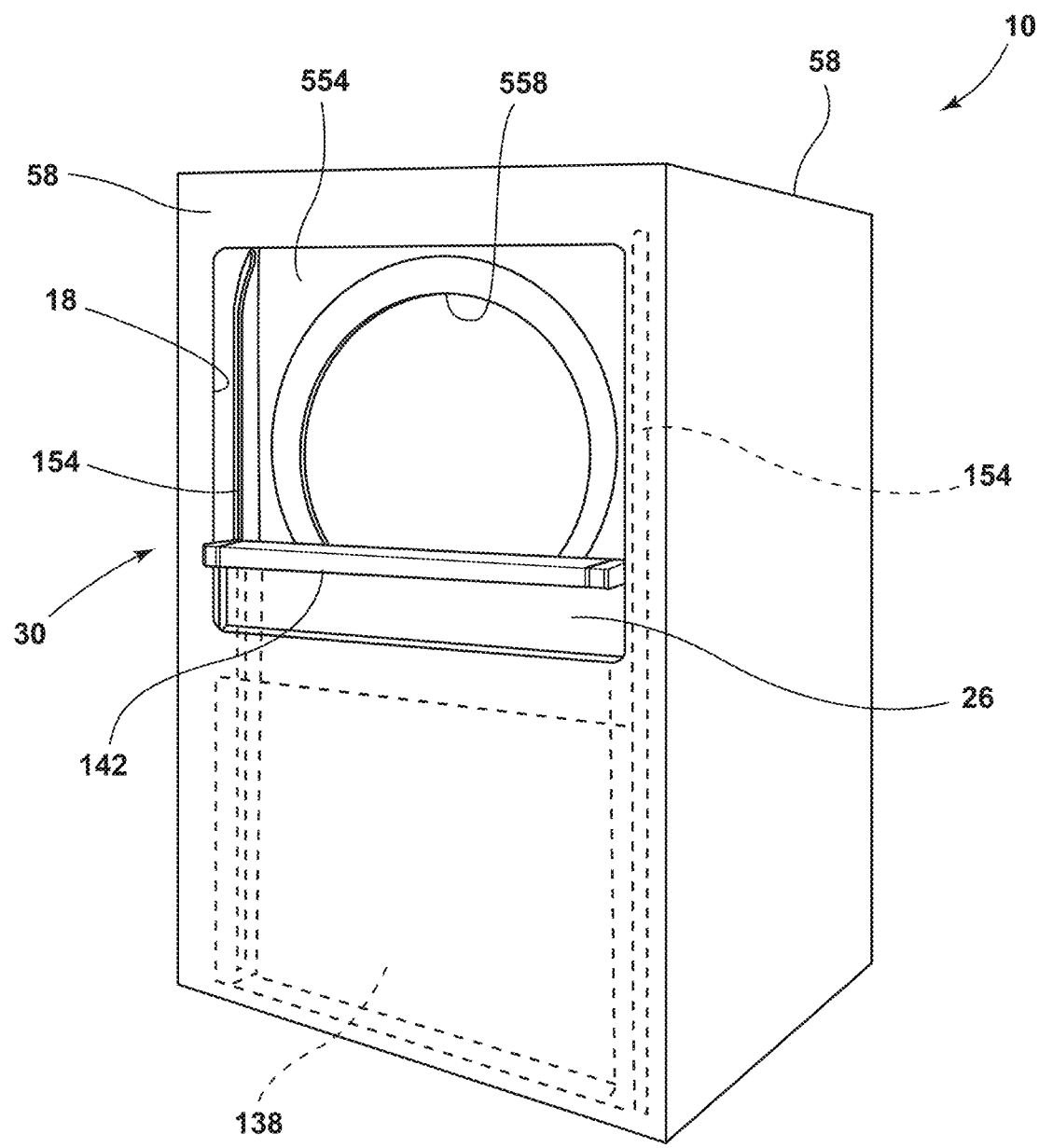
FIG. 54 is a front perspective view of a laundry appliance having a sliding door shown in an opened position, according to one example.
Figure 55:
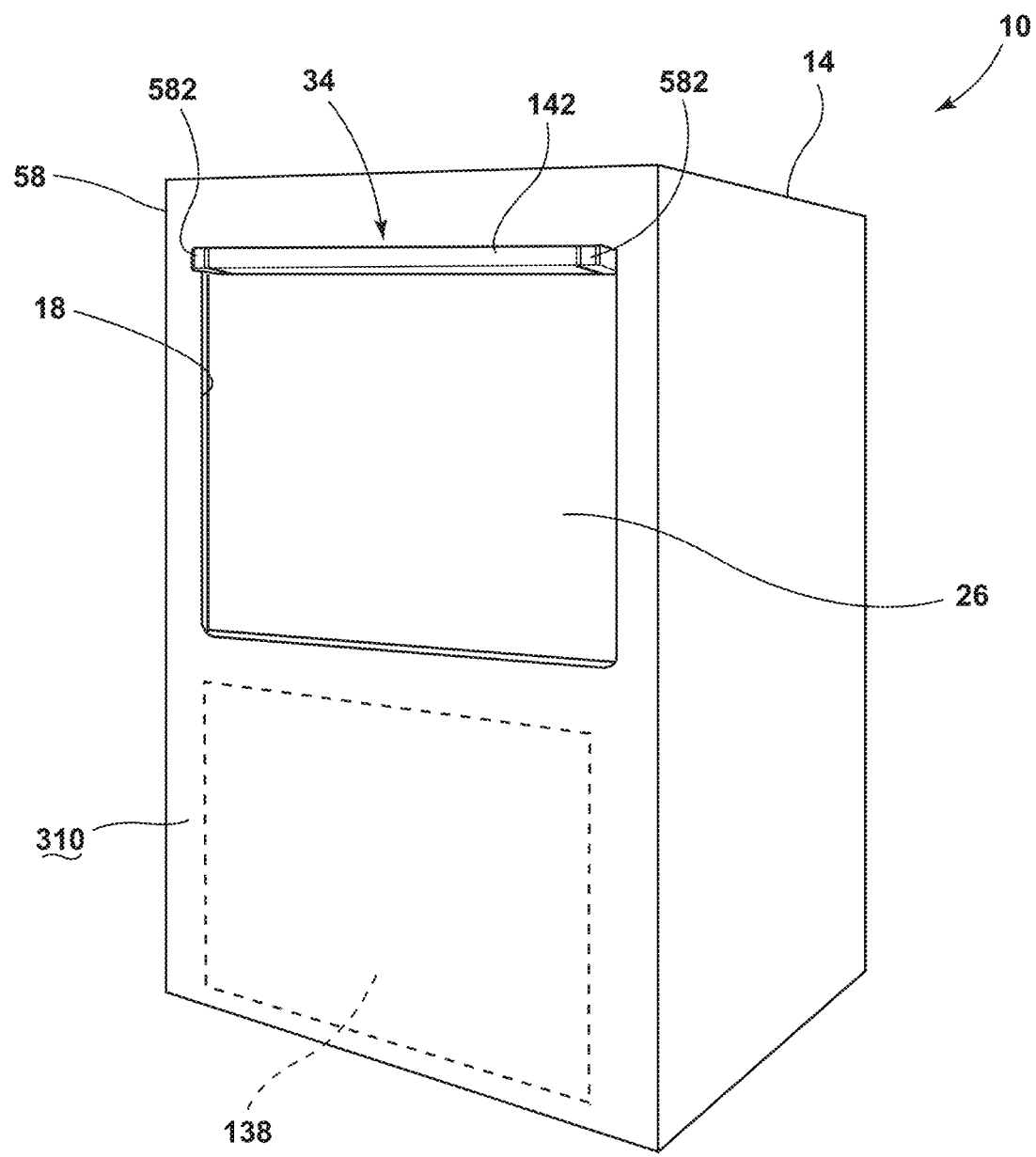
FIG. 55 is a front perspective view of the laundry appliance of FIG. 54 with the door in a closed position.

Referring to FIGS. 54 and 55, the front panel 58 defines the front opening 18, which has a substantially square configuration. The door 26 has a corresponding square configuration to cover and uncover the front opening 18. The laundry appliance 10 includes an inner panel 554 disposed within the cabinet 14 adjacent to the front panel 58. The inner panel 554 is visible within the front opening 18 when the door 26 is in the opened position 30 and substantially obscures internal components of the laundry appliance 10 from the view of the user. The inner panel 554 defines an access opening 558 for accessing the drum 22 of the laundry appliance 10.

The door 26 is configured to translate vertically along the rails 154 between the opened position 30 and the closed position 34. When in the opened position 30, the door 26 is lowered into the chamber 138 within the interior of the cabinet 14. The handle 142 is adjacent to an edge of the front panel 58 that defines the front opening 18 to be accessible to the user when the door 26 is in the opened position 30. The user can pull the handle 142 upwards to vertically move the door 26 out of the chamber 138

Figure 56:
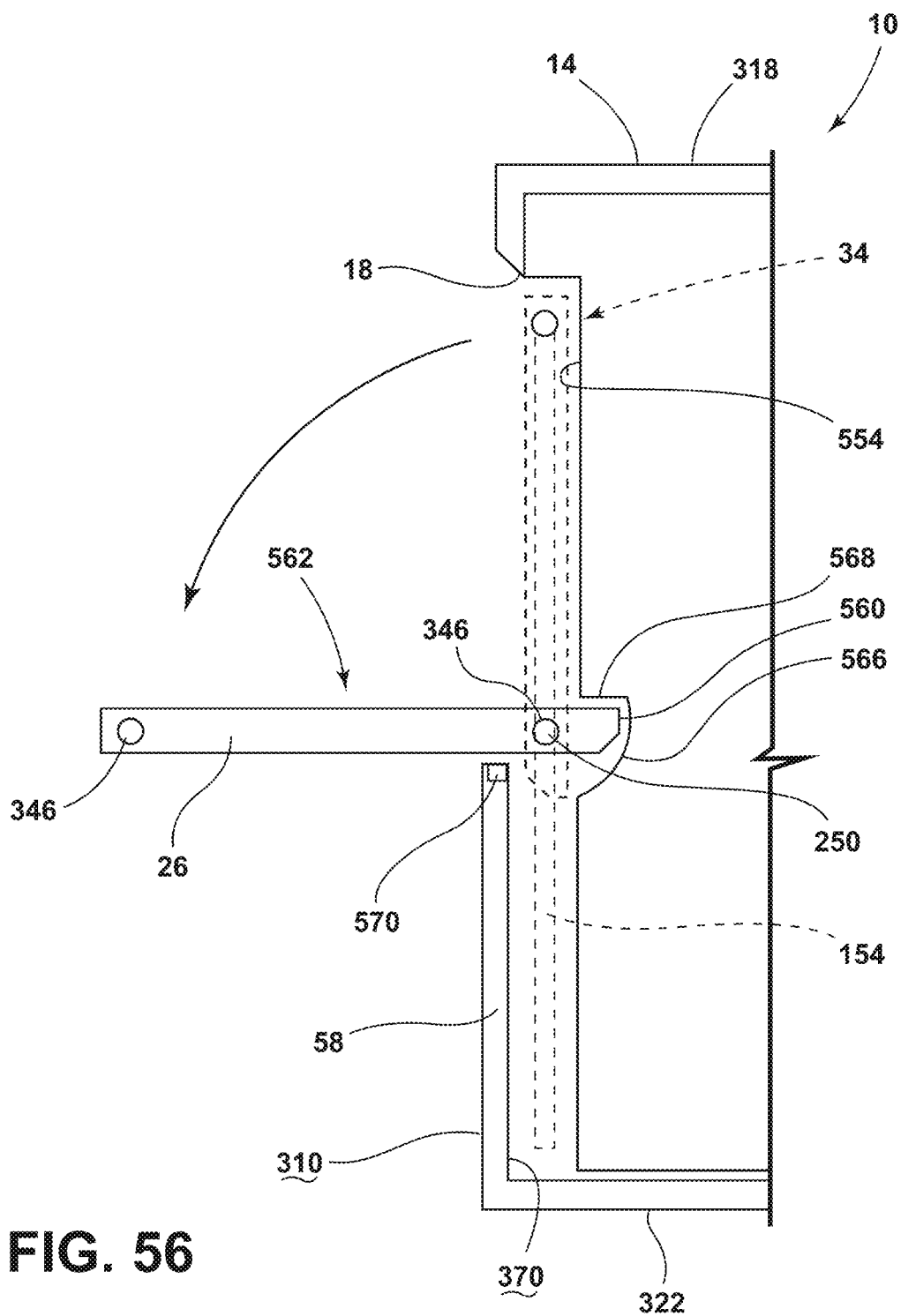
FIG. 56 is a side schematic view of the laundry appliance of FIG. 55 with a side panel removed, showing the door rotating from the closed position to a deployed position.
Figure 57:
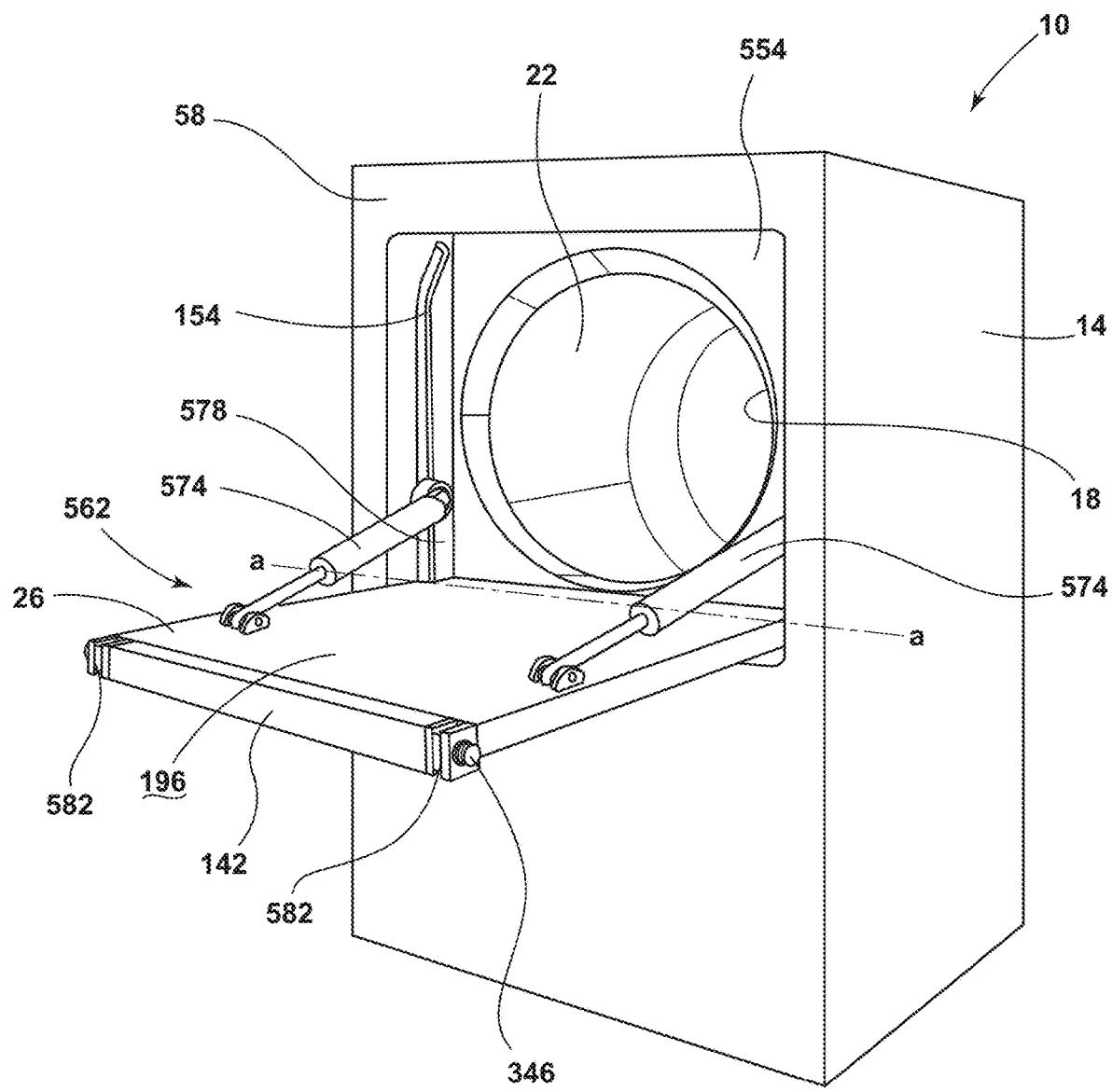
FIG. 57 is a front perspective view of a laundry appliance with a door in a deployed position, according to one example.

Referring to FIGS. 56 and 57, the rails 154 are generally disposed between the interior surface 370 of the front panel 58 and the inner panel 554. The rails 154 extend between the top 318 and the bottom 322 of the cabinet 14 to maximize the vertical translation of the door 26. The door 26 can include the guide features 346 for slidably engaging the rails 154. Typically, the door 26 has four guide features 346 for engaging the rails 346.

When the door 26 is in the closed position 34, the door 26 can be configured to rotate to a deployed position 562. The closed position 34 is an upright, substantially vertical position and typically matches the shape of the front panel 58. The deployed position 562 is a substantially horizontal position extending through the front opening 18. The door 26 is configured to rotate about the pivot points 250 proximate a bottom edge 560 of the door 26. The pivot points 250 are typically defined at the interface of the guide features 346 adjacent to the bottom edge 560 of the door 26 and the rails 154. The axis a of rotation extends between the pivot points 250. The axis a of rotation is a horizontal axis, which is typically an x-axis of the laundry appliance 10.

The inner panel 554 typically defines a recess 566 to accommodate the bottom edge 560 of the door 26 as the door 26 rotates to the deployed position 562. The inner panel 554 includes a stopping surface 568 configured to engage the bottom of the door 26 to stop the further rotation of the door 26 beyond the deployed position 562. Accordingly, the stopping surface 568 defines the deployed position 562 of the door.

The front panel 58 includes a bumper 570 disposed on an edge defining the front opening 18. The bumper 570 serves to assist in a soft stop of the door 26 in the deployed position 562. Accordingly, the door 26 can engage the bumper 570 when in the deployed position 562, such that the front panel 58 can provide support for the door 26 in the deployed position 562. As best illustrated in FIG. 58, the bumper 570 can extend across the width of the front opening 18.

Figure 58:
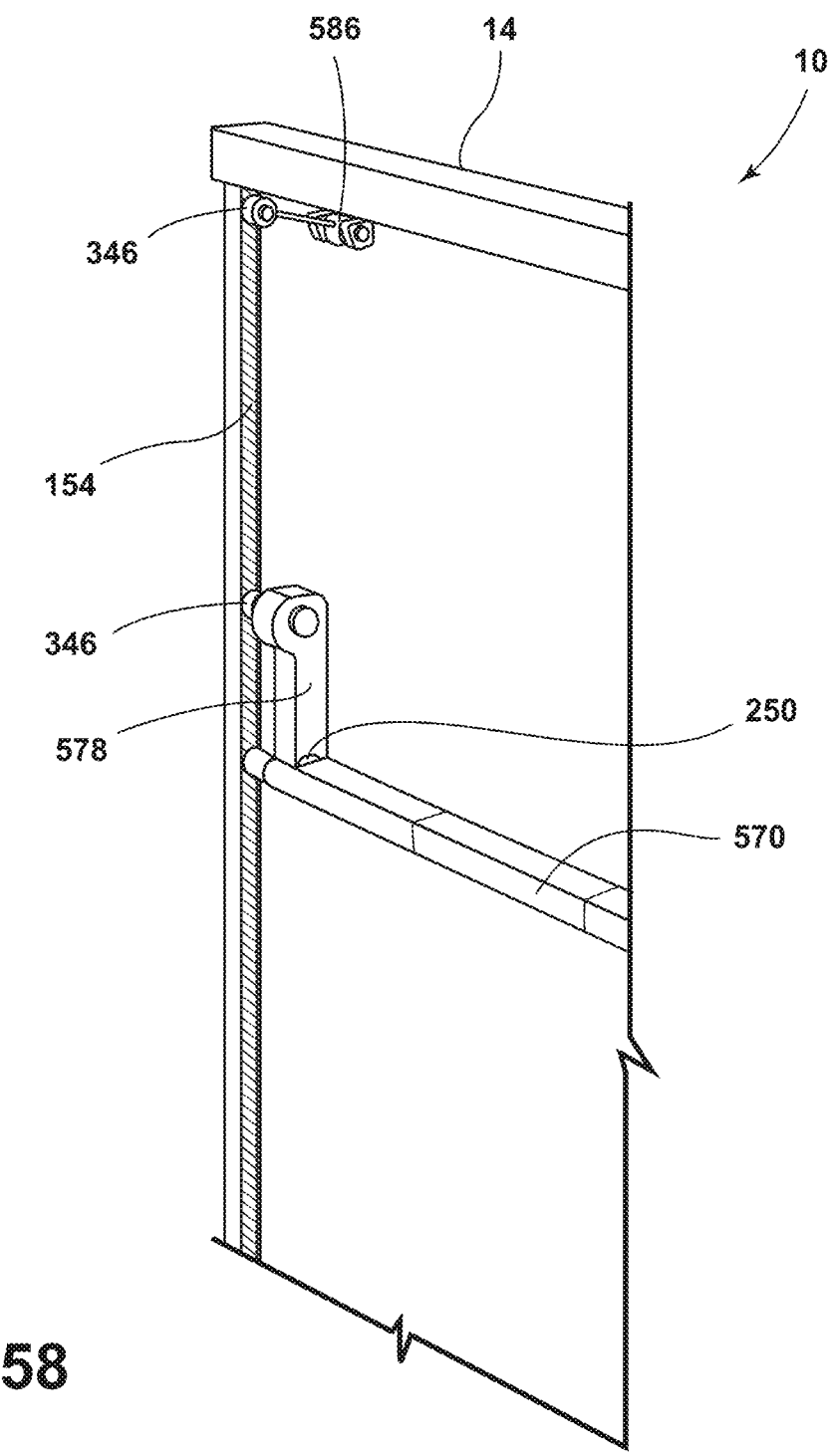
FIG. 58 is a partial front perspective view of a front panel of a laundry appliance with the door removed.

Referring to FIGS. 57 and 58, support features 274 can extend from the cabinet to couple to the inner surface 196 of the door 26 on opposing sides of the door 26. The support features 274 serve to slow the opening of the door 26 to the deployed position 562 and assist in retaining the door 26 in the deployed position 562. As illustrated in FIG. 57, the support features 274 are flap stay dampers that extend when the door 26 is rotating to the deployed position 562 and retract when the door 26 is rotating to the closed position 34.

Typically, the support features 574 are each coupled to a sliding bracket 578 configured to engage the rails 154. Accordingly, the support features 274 are pivotally coupled to both the sliding bracket 578 and the inner surface 196 of the door 26. Each support feature 274 is coupled to a first edge (e.g., an upper edge) of the sliding bracket 578 and the door 26 is pivotally coupled to a second edge (e.g., a lower edge) of each sliding bracket 578. In certain aspects, each sliding bracket 578 includes the guide feature 346 configured to slidably engage the rails 154. Additionally or alternatively, the sliding bracket 578 can define the pivot points 250 for the door to rotate between the closed position 34 and the deployed position 562.

Referring to FIGS. 54-58, the door 26 includes the guide features 346 configured to slidably engage the rails 154 as the door 26 translates vertically. The handle 142 includes a button 582 on each side for disengaging a top of the door 26 from the rails 154. The buttons 582 include a biasing feature 586 that engage the guide features 346. The buttons 582 are typically spring-loaded; however, any practicable type of biasing feature 586 is contemplated without departing from the teachings herein. The biasing features 586 bias the guide features 346 outward to engage the rails 154. The user can overcome the biasing force when engaging the buttons 582 to disengage the guide features 346 adjacent the top of the door 26 from the rails 154. When the guide features 346 are disengaged, the door 26 can rotate about the pivot points 250 to the deployed position 562. To re-engage the guide features 346 with the rails 154, the user can engage the buttons 582, move the door 26 fully to the closed position 34, and release the buttons 582 allowing the biasing force to move the guide features 346.

Referring to FIG. 59, an additional or alternative configuration of the door 26 is illustrated. The door 26 is pivotally coupled to a frame 590. The frame 590, with the door 26, is configured to translate vertically along the rails 154 between the opened position 30 and the closed position 34. In certain aspects, the frame 590 includes the guide features 346 configured to engage the rails 154. The frame 582 defines a door opening 594 for accessing the drum 22. When the door 26 is in the closed position 34, the door 26 conceals the door opening 594. When the door is in the deployed position 562, the door opening 586 is accessible by the user.

The door 26 is configured as a flat panel door that can rotate between the upright, closed position 34 and the horizontal, deployed position 562. As illustrated in FIG. 59, the support features 574 extend between the door 26 and the frame 582. The support features 574 assist in slowing the opening of the door 26 and retaining the door 26 in the deployed position 562. In the example illustrated in FIG. 59, the support features 574 are configured as a flap stay device that includes pivoting links or arms configured to extend when the door 26 is in the deployed position 562 and retract when the door 26 is in the closed position 34. The door 26 can define recesses for accommodating the support features 574 when the door 26 is in the closed position 20 34.

Referring still to FIG. 59, a latch assembly 598 serves to retain the door 26 in the closed position 34 against the frame 590. The latch assembly 598 includes a frame latch feature 602 and a door latch feature 606 configured to engage one another to retain the door 26 in the upright, closed position 34. Any type of latch assembly 598 may be included in the laundry appliance 10, without departing the teachings herein.

Referring to FIGS. 24 and 54-59, the movement of the door 26 can be automatic. The motor assembly 270 can be configured to translate the door 26 vertically between the opened position 30 and the closed position 34. Additionally, the motor assembly 270 can be configured to rotate the door 26 between the closed position 34 and the deployed position 562. A disengaging device 610 can be coupled to the door 26, the frame 590, and/or the cabinet 14. Depending on the configuration of the door 26, the disengaging device 610 can actuate the buttons 582 and the biasing feature 586 to release the top of the door 26 from the rails 154 and/or actuate the latch assembly 598 to release the door latch feature 606 from the frame latch feature 602. The disengaging device 610 can include, for example, a plunger, a key, a pin, a magnet, or any other actuator.

A user command can be input though the user-interface 274, including the sound sensor 278 and/or the remote device 298, and can be communicated to the controller 282. The controller 282 can communicate with the motor assembly 270 and/or the disengaging device 610 to move the door 26 to the selected position. The rotational function of the door 26 is advantageous for having the inner surface 196 of the door 26 to serve as a work surface for the user. The inner surface 196 can serve to catch laundry as the user loads and unloads the laundry from the laundry appliance 10.

Referring to FIGS. 1-59, the laundry appliance 10 may have a variety of configurations including one or any combination of the features described herein. For example, the laundry appliance 10 may include any one or more of the cabinet 14 with the front panel 58, the door 26, the sinusoidal-shaped bellows assembly 42, the bellows wash assembly 46, the sealing assembly 158, the deflector 74, and the user-interface 274. The front panel 58 can be angled. The door 26 can be configured to slide, rotate, and/or swing between the opened position 30, the closed position 34, and/or the deployed position 562 via any one or more of the rails 154, the bracket 242 with the pivot point 250 defining the axis a of rotation, the guide features 346 with the pivot points 250 defining the axis a of rotation, the track assembly 326, and a hinge, and may be associated with the motor assembly 270. The user-interface 274 can include one or more of the sound sensors 278, the remote device 298, the water dispensing button 462, and the chemistry dispensing button 470 of the pre-treat system 454. The deflector 74 may be coupled to the front panel 58 and/or the bellows assembly 42 and can include the rim 358 and the chute 362, as well as any one or more of the seal 398, the sealing feature 406, the spring 410, the telescoping guide member 414, the sensor assembly 422 (e.g., the imager 426, the temperature sensor 430, the humidity sensor 434, and/or the conductive strips 438, 442), the pre-treat system 454, the raised pattern 474, the light sources 478, the light pipe 482, the lint filter 498, the tubing 510 coupled to the recirculation tube 506, the water filter 514, the recess 522 with the odor substance 526, the water system 530, and the heat system 542.

Use of the present disclosure provides a variety of advantages. For example, the sinusoidal folds 70 of the bellows assembly 42 reduce self-contact of the bellows assembly 42, which reduces surface wear of the bellows assembly 42. Further, the sinusoidal folds 70 reduce contact between the bellows assembly 42 and the tub 20 and/or the cabinet 14 to reduce surface wear of the bellows assembly 42. Additionally, the bellows wash assembly 46 provides an automatic and/or ongoing washing function of the bellows assembly 42. The bellows wash assembly 46 removes laundry materials from the bellows assembly 42 that can result in premature wear of the bellows assembly 42. Moreover, the bellows wash assembly 46 can be used with or without the deflector 74 in the laundry appliance 10. Also, the laundry appliance 10 includes the sealing assembly 158 for providing a watertight seal in conjunction with the sliding door 26. The sealing assembly 158 can be a non-contact seal that reduces friction and, accordingly, reduces wear on the sealing assembly 158. Moreover, the door 26 can be configured to slide and rotate through a vertical plane.

Additionally, the laundry appliance 10 can include the deflector 74. The deflector 74 provides a stationary component in the interior of the laundry appliance 10 to support various components that utilize electrical connections. The deflector 74 may selectively couple to the bellows assembly 42 as well as the front panel 58. The deflector 74 can provide for use of the flat panel door 26, which can slidably engage with the front panel 58 and may be associated with the motor assembly 270. The deflector 74 may provide a variety of features to the inside of the laundry appliance 10 that can enhance the experience of using the laundry appliance 10 including features to sanitize, illuminate, provide more efficient laundry cycles, etc. Additionally, the deployed position 562 of the door 26 can serve as a work surface for the user. Additional benefits or advantages of using this device may also be realized and/or achieved.

The device disclosed herein is further summarized in the following paragraphs and is further characterized by combinations of any and all of the various aspects described therein.

According to one aspect of the present disclosure, a laundry appliance includes a cabinet that has a front panel. A tub is positioned within the cabinet. A door is coupled to the front panel of the cabinet. The door moves vertically between a closed position and an opened position. A bellows assembly is coupled to the front panel. The bellows assembly extends between the cabinet and the tub. A sealing assembly includes a first seal and a second seal that are each coupled to the bellows assembly.

According to another aspect, a door includes a gasket. The gasket is configured to align with a second seal when the door is in a closed position.

According to another aspect, a first seal includes a first mating interface. A gasket includes a second mating interface. The first and second mating interfaces align with one another when a door is in a closed position to form a watertight seal.

According to another aspect, a gasket is disposed on an inner surface of a door. The gasket includes opposing ends that extend beyond an outer edge of the door.

According to another aspect, a first seal is coupled to a cabinet and extends around a first portion of a front opening defined by a front panel. A second seal is coupled to the cabinet and extends around a second portion of the front opening.

According to another aspect, a bellows assembly defines a sinusoidal-shaped fold having a first fold portion and a second fold portion.

According to another aspect, a bellows wash assembly is disposed proximate an upper portion of the bellows assembly. The bellows wash assembly is configured to dispense water along an interior surface of the bellows assembly.

According to another aspect, a bracket is coupled to a front panel and a door. The door is configured to vertically rotate along a single plane between opened and closed positions.

According to another aspect of the present disclosure, a laundry appliance includes a cabinet that defines a front opening in a front panel thereof. A tub is disposed within the cabinet. A bracket is coupled to the front panel proximate the front opening. A door is rotatably coupled to the cabinet via the bracket. The door is operable along an arced path through a single plane between opened and closed positions. The single plane is parallel to the front panel.

According to another aspect, an arced path defines an opened position and a closed position. A door fully covers a front opening when in the closed position and is fully removed from the front opening when in the opened position.

According to another aspect, a door rotates about an axis of rotation. An axis of rotation is defined between a first tangent line and a second tangent line, the first and second tangent lines being perpendicular to one another.

According to another aspect, a first tangent line is tangent to an outer edge of a door when the door is in a closed position. A second tangent line is tangent to the outer edge of the door when the door is in the opened position.

According to another aspect, a cabinet defines a chamber. A door is at least partially disposed within the chamber when the door is in an opened position.

According to another aspect, a sealing assembly is coupled to a door and a cabinet. The sealing assembly is configured to form a watertight seal when the door is in a closed position.

According to another aspect, a sealing assembly includes a first seal coupled to the bellows assembly, a second seal coupled to the bellows assembly, and a gasket coupled to an inner surface of a door. The gasket is configured to mate with the first seal when the door is in a closed position.

According to another aspect, a bellows assembly defines a sinusoidal-shaped fold having a first fold portion and a second fold portion. The first fold portion and a cabinet define a space therebetween. The second fold portion and a tub define a gap therebetween.

According to another aspect of the present disclosure, a laundry appliance includes a cabinet. A tub is positioned within the cabinet. A bellows assembly extends between the cabinet and the tub. A bellows wash assembly is disposed proximate an upper portion of the bellows assembly. The bellows wash assembly is configured to dispense water on an interior surface of the bellows assembly.

According to another aspect, a gasket is coupled to an inner surface of a door. A bellows assembly defines a seal in a lower portion thereof configured to mate with the gasket when the door is in a closed position.

According to another aspect, a door is at least one of a sliding panel door and a rotating panel door.

According to another aspect, a drum disposed within a tub. A bottom portion of a bellows assembly defines a sloping surface to direct liquid into a drum.

According to one aspect of the present disclosure, a laundry appliance includes a cabinet defining a front opening in a front panel thereof. The front opening is defined by a lip having a curved edge and wherein the lip defines a plurality of apertures spaced-part around the front opening. A drum is disposed within the tub. A bellows assembly extends between the cabinet and the tub. The bellows assembly includes a projection coupled to the curved edge of the cabinet. A deflector has a rim and a chute where the chute extends toward the drum and the rim is configured to snap-fit over the projection of the bellows assembly. The rim includes a plurality of hooks where each hook is configured to extend through an aperture and interlock with the cabinet.

According to another aspect, a deflector includes a telescoping guide member coupled to a rim. The telescoping guide member is configured to extend through a front opening of a cabinet.

According to another aspect, a deflector includes a sensor assembly for sensing a condition of laundry within a drum. The sensor assembly includes at least one of conductive strips, an imager, a temperature sensor, and a humidity sensor.

According to another aspect, an imager is coupled to an upper portion of a deflector. Conductive strips, a humidity sensor, and a temperature sensor are coupled to a topside of a chute of the deflector.

According to another aspect, a topside of a chute defines a raised pattern. The chute defines a slope to direct water toward a drum.

According to another aspect, a lint filter disposed within a channel defined by a chute of a deflector. The chute intersects with an airflow path of a laundry appliance.

According to another aspect, a chute is coupled to a rim via a spring. The chute is configured to move relative to the rim in response to a predetermined force acting on the chute.

According to another aspect, a deflector includes a manifold coupled to a rim. The manifold is in fluid communication with inlets defined by a deflector to provide fluid to the deflector.

According to another aspect, a deflector includes an air manifold in fluid communication with an air inlet to provide hot air onto the deflector.

According to another aspect, a deflector includes a water manifold in fluid communication with a water inlet to provide water to the deflector.

According to another aspect, a topside of a chute defines a recess. An odor substance is selectively disposed within the recess and configured to exude a scent into a drum.

According to another aspect, a recirculation tube in fluid communication with a deflector. A water filter disposed within a channel defined by a chute. Fluid is directed through the recirculation tube and the water filter.

According to another aspect, a plurality of light sources are coupled to an underside of a chute. The light sources are configured to emit ultraviolet light towards a bellows assembly.

According to another aspect, a cabinet has a front panel. The front panel defines a track and a front opening. A sealing gasket is coupled to the cabinet proximate the front opening. A tub is disposed within the cabinet. The tub defines an access opening that aligns with the front opening. A bellows assembly extends between the cabinet and the tub. A panel door is configured to translate vertically along a front surface of the front panel between an opened position and a closed position. The panel door includes a guide feature configured to engage the track. The track guides the door vertically toward the tub to contact the sealing gasket coupled to the cabinet when in the closed position.

According to another aspect, a depth of a top of a cabinet is less than a depth of a bottom of the cabinet.

According to another aspect, a deflector coupled to a front panel. A rear side of the deflector is coupled to a bellows assembly. A front side of the deflector includes a seal for providing a watertight seal between the deflector and the front panel.

According to another aspect, a seal includes a sealing feature for providing a watertight seal between a deflector and a panel door.

According to another aspect, a seal is coupled to a deflector and a sealing feature is coupled to a panel door.

According to another aspect, a deflector is coupled to an interior surface of a front panel.

According to another aspect, a motor assembly is in communication with a door. The motor assembly is configured to translate the door in response to a voice command.

According to another aspect, a cabinet defines a front opening in a front panel thereof. A door is configured to slide vertically between an opened position and a closed position. A motor assembly is operably coupled to the door and configured to move the door between the opened and closed positions. A sound sensor is configured to receive a voice command. A controller is in communication with the sound sensor and the motor assembly. The controller is configured to activate the motor assembly in response to the voice command received by the sound sensor.

According to another aspect, a deflector coupled to an interior surface of a front panel. The deflector includes a rim and a chute.

According to another aspect, a water dispenser is coupled to a deflector. The water dispenser is configured to supply water to a topside of a chute. A chemistry dispenser is coupled to the deflector. The chemistry dispenser is configured to supply laundry chemistry to the topside of the chute.

According to another aspect, a deflector includes a plurality of light sources extending around a rim. The plurality of light sources are coupled to one another via a light pipe. The plurality of light sources are configured to emit light to provide feedback to a user.

According to another aspect, emitted light from a plurality of light sources provides feedback to a user of a status of a laundry cycle.

According to another aspect, a front panel of a cabinet is disposed at an angle. A depth of a top of the cabinet is less than a depth of a bottom of the cabinet.

According to another aspect, a laundry appliance include a cabinet having a front panel that defines a front opening. A door is operable between an opened position and a closed position via a rail. The door is disposed within a chamber defined by the cabinet when in the opened position. The door is configured to rotate about a horizontal axis from the closed position to a deployed position.

According to another aspect, a bottom of a door remains engaged with a rail when the door is in the deployed position and a top of the door is disengaged from the rail when the door is in the deployed position.

According to another aspect, a top of a door includes spring-biased buttons to selectively engage the top of the door to a rail.

According to another aspect, a sliding bracket engages a rail. A door is pivotally coupled to the sliding bracket.

According to another aspect, a support feature extends between a sliding bracket and a door. The support feature is configured to extend as the door moves to a deployed position and retract as the door moves to a closed position.

According to another aspect, a frame is configured to engage a rail. A door is pivotally coupled to the frame. A bottom of the door remains engaged with the frame when the door is in a deployed position and a top of the door is disengaged from the frame when the door is in the deployed position.

According to another aspect, a support feature extends between a frame and a door. The support feature is configured to extend as the door moves to a deployed position and retract as the door moves to a closed position.

According to another aspect, a latch assembly is configured to retain a door in a closed position abutting a frame.

According to another aspect, a front panel includes a bumper configured to engage a door when the door is in a deployed position.

According to another aspect, an inner panel is disposed within a cabinet and adjacent to a front panel. The inner panel defines a recess to accommodate a bottom of a door as the door rotates between a closed position and a deployed position.

According to another aspect, an inner panel includes a stopping surface configured to engage a bottom of a door when the door is in a deployed position.

According to another aspect, a disengaging device is configured to disengage a top of a door from at least one of a rail and a frame in response to a signal received from a controller.

According to another aspect, an inner surface of a door is oriented upwards when the door is in a deployed position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance, comprising:
   a cabinet defining a front opening in a front panel thereof, wherein the front opening is defined by a lip having a curved edge, and wherein the lip defines a plurality of apertures spaced-apart around the front opening;
   a tub disposed within the cabinet, the tub defining an access opening aligned with the front opening;
   a drum disposed within the tub;
   a bellows assembly extending between the cabinet and the tub, wherein the bellows assembly includes a projection coupled to the curved edge of the cabinet; and
   a deflector having a rim and a chute, the chute extending toward the drum, wherein the rim is configured to snap-fit over the projection of the bellows assembly, and wherein the rim includes a plurality of hooks, each hook configured to extend through an aperture and interlock with the cabinet.

2. The laundry appliance of claim 1, wherein the deflector includes a telescoping guide member coupled to the rim, and wherein the telescoping guide member is configured to extend through the front opening of the cabinet.

3. The laundry appliance of claim 1, wherein the deflector includes a sensor assembly for sensing a condition of laundry within the drum, and wherein the sensor assembly includes at least one of conductive strips, an imager, a temperature sensor, and a humidity sensor.

4. The laundry appliance of claim 1, wherein a topside of the chute defines a raised pattern, and wherein the chute defines a slope to direct water toward the drum.

5. The laundry appliance of claim 1, further comprising:
   a lint filter disposed within a channel defined by the chute of the deflector, wherein the chute intersects with an airflow path of said laundry appliance.

6. The laundry appliance of claim 1, wherein the chute is coupled to the rim via a spring, and wherein the chute is configured to move relative to the rim in response to a predetermined force acting on the chute.

7. The laundry appliance of claim 1, wherein the deflector includes a manifold coupled to the rim, and wherein the manifold is in fluid communication with inlets defined by the deflector to provide fluid to the deflector.

8. The laundry appliance of claim 1, wherein a topside of the chute defines a recess, and wherein an odor substance is selectively disposed within the recess and configured to exude a scent into the drum.

9. The laundry appliance of claim 1, further comprising:
   a recirculation tube in fluid communication with the deflector; and
   a water filter disposed within a channel defined by the chute, wherein fluid is directed through the recirculation tube and the water filter.

10. The laundry appliance of claim 1, further comprising:
    a plurality of light sources coupled to an underside of the chute, wherein the plurality of light sources are configured to emit ultraviolet light towards the bellows assembly.

* * * * *